(12) United States Patent
Zhang et al.

(10) Patent No.: US 12,135,976 B2
(45) Date of Patent: Nov. 5, 2024

(54) SCREEN DISPLAY METHOD AND ELECTRONIC DEVICE

(71) Applicant: Huawei Technologies Co., Ltd., Shenzhen (CN)

(72) Inventors: Yanan Zhang, Shenzhen (CN); Zhihao Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/848,939

(22) Filed: Jun. 24, 2022

(65) Prior Publication Data

US 2022/0318036 A1 Oct. 6, 2022

Related U.S. Application Data

(63) Continuation of application No. PCT/CN2020/133114, filed on Dec. 1, 2020.

(30) Foreign Application Priority Data

Dec. 25, 2019 (CN) .......................... 201911354756.5

(51) Int. Cl.
*G06F 9/451* (2018.01)
*G06F 3/04812* (2022.01)
*G06F 3/0488* (2022.01)

(52) U.S. Cl.
CPC .......... *G06F 9/451* (2018.02); *G06F 3/04812* (2013.01); *G06F 3/0488* (2013.01); *G06F 2203/04803* (2013.01)

(58) Field of Classification Search
CPC ............... G06F 3/04812; G06F 3/0488; G06F 3/04803; G06F 9/451; G06F 2203/04803
See application file for complete search history.

(56) References Cited

U.S. PATENT DOCUMENTS

| | | | |
|---|---|---|---|
| 9,928,028 B2 * | 3/2018 | Jung | G06F 3/04845 |
| 10,261,591 B2 * | 4/2019 | Choi | G06F 3/0486 |
| 11,126,334 B2 * | 9/2021 | Fan | G06F 3/04847 |
| 11,347,685 B2 * | 5/2022 | Zeng | G06F 16/13 |
| 11,513,671 B2 * | 11/2022 | Wu | G06F 3/04883 |
| 11,698,706 B2 * | 7/2023 | Kim | G06F 3/0488 |
| | | | 715/768 |

(Continued)

FOREIGN PATENT DOCUMENTS

| | | |
|---|---|---|
| CN | 103729156 A | 4/2014 |
| CN | 105468437 A | 4/2016 |

(Continued)

*Primary Examiner* — Tadesse Hailu
(74) *Attorney, Agent, or Firm* — Slater Matsil, LLP

(57) ABSTRACT

A screen display method and an electronic device. The method includes: displaying interfaces of at least two applications, including a first interface of a first application and a second interface of a second application, where the first interface is an interface displayed in full screen mode, and the second interface is a floating window displayed in the first interface; receiving a first operation performed on the first interface; and automatically displaying the second interface in a minimized state in the first interface in response to the first operation, where the second interface in the minimized state is any one of a floating ball, an icon of the second application, a contact avatar, and a video pop-up window.

27 Claims, 53 Drawing Sheets

2101 — Display a first interface of a first application and a second interface of a second application in parallel on a screen of an electronic device, where there is no overlapping area between the first interface and the second interface 2103 — Receive a first operation performed on the first interface 2105 — Display the first interface in full screen mode, minimize the second interface, and display the second interface in a minimized state in the first interface displayed in full screen mode, in response to the first operation

(56) References Cited

U.S. PATENT DOCUMENTS

| | | | |
|---|---|---|---|
| 2006/0075359 A1 | 4/2006 | Bauchot et al. | |
| 2010/0037165 A1* | 2/2010 | Correl | G09G 5/14 715/768 |
| 2012/0146955 A1* | 6/2012 | Martin-Cocher | G06F 3/04886 345/176 |
| 2013/0120295 A1* | 5/2013 | Kim | G06F 3/0486 345/173 |
| 2014/0229888 A1* | 8/2014 | Ko | G06F 3/0481 715/783 |
| 2014/0237378 A1* | 8/2014 | Gonen | H04M 1/724 715/745 |
| 2015/0169099 A1 | 6/2015 | Lavallee | |
| 2015/0185980 A1* | 7/2015 | An | G06F 3/0484 715/803 |
| 2015/0326921 A1 | 11/2015 | Makovetsky et al. | |
| 2016/0085438 A1* | 3/2016 | Doan | G06F 3/04883 715/863 |
| 2016/0170605 A1* | 6/2016 | Yue | G06F 3/0488 715/771 |
| 2016/0188196 A1* | 6/2016 | Panchapakesan | G06F 9/451 715/716 |
| 2016/0313877 A1* | 10/2016 | Ha | G06F 3/04842 |
| 2016/0370864 A1* | 12/2016 | Choi | G06F 3/0481 |
| 2017/0054663 A1* | 2/2017 | Geiger | H04L 51/10 |
| 2017/0075563 A1 | 3/2017 | Bauer et al. | |
| 2017/0357416 A1* | 12/2017 | Jing | H04M 19/04 |
| 2018/0150208 A1* | 5/2018 | Song | G06F 3/04845 |
| 2018/0217727 A1* | 8/2018 | Girard | G06F 3/04845 |
| 2018/0284948 A1* | 10/2018 | Hao | G06F 3/0481 |
| 2018/0335939 A1* | 11/2018 | Karunamuni | G06F 3/0481 |
| 2019/0278431 A1* | 9/2019 | Dunning | G06Q 10/06315 |
| 2019/0332232 A1* | 10/2019 | Lu | G06F 3/0484 |
| 2020/0057555 A1* | 2/2020 | Walkin | G06F 3/0483 |
| 2020/0326839 A1* | 10/2020 | Walkin | G06F 3/0482 |
| 2020/0333994 A1* | 10/2020 | Sepulveda | G06F 3/04847 |
| 2021/0064191 A1* | 3/2021 | Liao | G06F 3/04845 |

FOREIGN PATENT DOCUMENTS

| | | |
|---|---|---|
| CN | 107037949 A | 8/2017 |
| CN | 107368361 A | 11/2017 |
| CN | 108540646 A | 9/2018 |
| CN | 109445572 A | 3/2019 |
| CN | 109871253 A | 6/2019 |
| CN | 110569474 A | 12/2019 |
| CN | 111176506 A | 5/2020 |
| IN | 107315518 A | 11/2017 |
| JP | 2014164718 A | 9/2014 |

* cited by examiner

During input in WeChat, the WeChat dialog is automatically displayed in full screen mode, and the Taobao page is automatically minimized to a floating ball

SCREEN DISPLAY METHOD AND ELECTRONIC DEVICE

CROSS-REFERENCE TO RELATED APPLICATIONS

This application is a continuation of International Application No. PCT/CN2020/133114, filed on Dec. 1, 2020, which claims priority to Chinese Patent Application No. 201911354756.5, filed on Dec. 25, 2019. The disclosures of the aforementioned applications are hereby incorporated by reference in their entireties.

TECHNICAL FIELD

This application relates to the field of electronic device technologies, and in particular, to a screen display method and an electronic device.

BACKGROUND

In daily life, a user sometimes needs to use an electronic device to run a plurality of applications (APPs) to perform a plurality of tasks. For example, the user chats with a friend by using an instant messaging application while watching a video by using a video application.

The screen may simultaneously display running interfaces of a plurality of applications, to facilitate the user to switch between applications to enter an interface on which an operation is expected to be performed. Due to a limitation of a size of the screen of the electronic device, when the plurality of applications are simultaneously opened, the running interfaces of the plurality of applications may block each other and interfere with each other, resulting in an inconvenient user operation and a poor viewing effect.

SUMMARY

Embodiments of this application provide a screen display method. When displaying a plurality of interfaces, in response to an operation performed on one interface, an electronic device may automatically minimize another interface, and display the another interface in a minimized state, to improve user operation experience.

According to a first aspect, an embodiment of this application provides a screen display method. The method includes: displaying interfaces of at least two applications, including a first interface of a first application and a second interface of a second application, where the first interface is an interface displayed in full screen mode, and the second interface is a floating window displayed in the first interface; receiving a first operation performed on the first interface; and automatically displaying the second interface in a minimized state in the first interface in response to the first operation, where the second interface in the minimized state is any one of a floating ball, an icon of the second application, a contact avatar, and a video pop-up window.

To be specific, according to the screen display method provided in this embodiment of this application, when an electronic device displays interfaces of a plurality of applications, a user may perform an operation on an interface of one of the applications, so that the electronic device can automatically minimize an interface of another application, and display the interface that is of the another application and that is in a minimized state, to improve user operation experience.

In a possible implementation, the first interface includes a first edit box, and the first operation is an operation performed on the first edit box; and the automatically displaying the second interface in a minimized state in the first interface in response to the first operation is specifically: generating a focus obtaining event in the first edit box in response to the first operation; and automatically displaying the second interface in the minimized state in the first interface in response to the focus obtaining event in the first edit box.

It may be understood that, when detecting the focus obtaining event in the edit box in the first interface, the electronic device may learn that the user expects to enter content into the edit box in the first interface. To be specific, in this implementation, when learning that the user expects to enter the content into the edit box in the first interface, the electronic device automatically minimizes the second interface, to facilitate user input, and improve user operation experience.

In a possible implementation, the screen display method provided in this embodiment of this application further includes: generating a focus loss event in the first edit box in the first interface in response to a second operation; and automatically restoring the second interface in the minimized state to a floating window in response to the focus loss event in the first edit box.

It may be understood that, when detecting the focus loss event in the edit box in the first interface, the electronic device may learn that the user has completed input into the edit box. To be specific, in this implementation, when learning that the user completes the input into the edit box, the electronic device automatically restores the second interface to the floating window, so that the user can conveniently view the second interface, to improve user operation experience.

In a possible implementation, the screen display method provided in this embodiment of this application further includes: obtaining a cursor location in the first edit box in the first interface; and determining a first location whose distance from the cursor location is greater than a first threshold; and the displaying the second interface in the minimized state in the first interface includes: displaying the second interface in the minimized state at the first location.

To be specific, in this implementation, the second interface in the minimized state may be displayed at a location away from the cursor location in the first edit box, so that impact of the second interface in the minimized state on user input can be reduced, and user input experience is further improved.

In a possible implementation, the screen display method provided in this embodiment of this application further includes: receiving a third operation performed on the second interface in a floating window state; displaying the second interface in full screen mode, and minimizing the first interface, in response to the third operation; and displaying the first interface in a minimized state in the second interface.

To be specific, in this implementation, when maximizing the second interface, the electronic device automatically minimizes the first interface, and displays the first interface in the minimized state in the second interface, to improve user operation experience.

In a possible implementation, the second interface includes a second edit box, and the third operation performed on the second interface in the floating window state is an operation performed on the second edit box; and the displaying the second interface in full screen mode, and minimizing the first interface, in response to the third operation includes: generating a focus obtaining event in the second edit box in response to the third operation; and automatically displaying the second interface in full screen mode, and minimizing the first interface, in response to the focus obtaining event in the second edit box.

To be specific, in this implementation, when learning that the user expects to enter content into the second interface, the electronic device may automatically display the second interface in full screen mode, and automatically minimize the first interface, to facilitate user input, and improve user operation experience.

In a possible implementation, the interfaces of the at least two applications further include a third interface of a third application, and the third interface is a floating window displayed in the first interface.

To be specific, in this implementation, the electronic device may display two or more floating windows in the first interface displayed in full screen mode.

In a possible implementation, the screen display method provided in this embodiment of this application further includes: receiving a fourth operation performed on the second interface in a floating window state; and automatically minimizing at least the third interface in response to the fourth operation.

To be specific, in this implementation, the electronic device may automatically minimize another floating window in response to an operation performed on one floating window, to improve user operation experience.

In a possible implementation, the automatically minimizing at least the third interface in response to the fourth operation includes: displaying the second interface in full screen mode, and minimizing the first interface and the third interface, in response to the fourth operation; and displaying the first interface in a minimized state and the third interface in a minimized state in the second interface.

To be specific, in this implementation, in response to an operation performed on one floating window, the electronic device may display the floating window in full screen mode, and automatically minimize an interface originally displayed in full screen mode and another floating window, to improve user operation experience.

In a possible implementation, the automatically displaying the second interface in a minimized state in the first interface in response to the first operation is specifically: automatically displaying the second interface in the minimized state and the third interface in a minimized state in the first interface in response to the first operation.

To be specific, in this implementation, in response to an operation performed on the interface displayed in full screen mode, the electronic device may automatically minimize all floating windows in the interface displayed in full screen mode, to improve user operation experience.

According to a second aspect, an embodiment of this application provides a screen display method, applied to an electronic device. The method includes: displaying a first interface of a first application and a second interface of a second application side by side on a screen of the electronic device, where there is no overlapping area between the first interface and the second interface; receiving a first operation performed on the first interface; and displaying the first interface in full screen mode, minimizing the second interface, and displaying the second interface in a minimized state in the first interface displayed in full screen mode, in response to the first operation, where the second interface in the minimized state is any one of a floating ball, an icon of the second application, a contact avatar, and a video pop-up window.

To be specific, according to the screen display method provided in this embodiment of this application, interfaces of two applications may be displayed side by side on the screen, and there is no overlapping area between the interfaces of the two applications that are displayed side by side, so that the user can conveniently view the interfaces of the two applications. When an operation performed on one of the two interfaces displayed side by side is detected, the interface may be automatically displayed in full screen mode, the other interface may be automatically minimized, and the interface in a minimized state may be displayed in the interface displayed in full screen mode, to improve user operation experience.

In a possible implementation, the first interface includes a first edit box, and the first operation is an operation performed on the first edit box; and the displaying the first interface in full screen mode, minimizing the second interface, and displaying the second interface in a minimized state in the first interface displayed in full screen mode, in response to the first operation is specifically: generating a focus obtaining event in the first edit box in response to the first operation; and displaying the first interface in full screen mode, minimizing the second interface, and displaying the second interface in the minimized state in the first interface displayed in full screen mode, in response to the focus obtaining event in the first edit box.

It may be understood that, when detecting the focus obtaining event in the edit box in the first interface, the electronic device may learn that the user expects to enter content into the edit box in the first interface. To be specific, in this implementation, when learning that the user expects to enter the content into the first interface, the electronic device may automatically display the first interface in full screen mode, and automatically minimize the second interface, to facilitate user input, and improve user operation experience.

In a possible implementation, the screen display method provided in this embodiment of this application further includes: receiving a second operation; generating a focus loss event in the first edit box in response to the second operation; and displaying the first interface and the second interface side by side again in response to the focus loss event.

It may be understood that, when detecting the focus loss event in the edit box in the first interface, the electronic device may learn that the user has completed input into the edit box. To be specific, in this implementation, when learning that the user completes the input into the first interface, the electronic device may display the first interface and the second interface in split-screen mode again, so that the user simultaneously views the first interface and the second interface, to improve user operation experience.

In a possible implementation, the screen display method provided in this embodiment of this application further includes: obtaining a cursor location in the first edit box; and determining a first location whose distance from the cursor location is greater than a first threshold; and the displaying the second interface in the minimized state in the first interface includes: displaying the second interface in the minimized state at the first location.

To be specific, in this implementation, the second interface in the minimized state may be displayed at a location away from the cursor location in the first edit box, so that impact of the second interface in the minimized state on user input can be reduced, and user input experience is further improved.

In a possible implementation, the first interface includes a maximization function option, and the first operation is an operation on the maximization function option.

To be specific, in this implementation, when the electronic device displays two interfaces in split-screen mode, in response to an operation performed on one of the two interfaces, the electronic device may display the interface in full screen mode, and automatically minimize the other interface.

In a possible implementation, the screen display method provided in this embodiment of this application further includes: receiving a third operation performed on the second interface in the minimized state; and displaying the first interface and the second interface side by side again in response to the third operation.

To be specific, in this implementation, after one of the two interfaces displayed in split-screen mode enters a minimized state, the user may perform an operation on the interface in the minimized state to display the two interfaces in-split screen mode again, so as to improve user operation experience.

According to a third aspect, an embodiment of this application provides a screen display apparatus. The apparatus includes: a display unit, configured to display interfaces of at least two applications, including a first interface of a first application and a second interface of a second application, where the first interface is an interface displayed in full screen mode, and the second interface is a floating window displayed in the first interface; a receiving unit, configured to receive a first operation performed on the first interface; and an interface adjustment unit, configured to automatically display the second interface in a minimized state in the first interface in response to the first operation, where the second interface in the minimized state is one of a floating ball, an icon of the second application, a contact avatar, and a video pop-up window.

It may be understood that the screen display apparatus according to the third aspect is configured to perform the corresponding method according to the first aspect. Therefore, for beneficial effects that can be achieved by the screen display apparatus, refer to beneficial effects in the corresponding method according to the first aspect. Details are not described herein again.

According to a fourth aspect, an embodiment of this application provides a screen display apparatus. The apparatus includes: a display unit, configured to display a first interface of a first application and a second interface of a second application side by side on a screen, where there is no overlapping area between the first interface and the second interface; a receiving unit, configured to receive a first operation performed on the first interface; and an interface adjustment unit, configured to: display the first interface in full screen mode, minimize the second interface, and display the second interface in a minimized state in the first interface displayed in full screen mode, in response to the first operation, where the second interface in the minimized state is one of a floating ball, an icon of the second application, a contact avatar, and a video pop-up window.

It may be understood that the screen display apparatus according to the fourth aspect is configured to perform the corresponding method according to the second aspect. Therefore, for beneficial effects that can be achieved by the screen display apparatus, refer to beneficial effects in the corresponding method according to the second aspect. Details are not described herein again.

According to a fifth aspect, an embodiment of this application provides an electronic device, including a processor, a memory, and a display. The memory is configured to store computer executable instructions; and when the electronic device runs, the processor executes the computer executable instructions, so that the electronic device performs the following operations: displaying interfaces of at least two applications, including a first interface of a first application and a second interface of a second application, where the first interface is an interface displayed in full screen mode, and the second interface is a floating window displayed in the first interface; receiving a first operation performed on the first interface; and automatically displaying the second interface in a minimized state in the first interface in response to the first operation, where the second interface in the minimized state is any one of a floating ball, an icon of the second application, a contact avatar, and a video pop-up window.

In a possible implementation, the first interface includes a first edit box, and the first operation is an operation performed on the first edit box; and the processor executes the computer instructions, so that the electronic device further performs the following operations: generating a focus obtaining event in the first edit box in response to the first operation; and automatically displaying the second interface in the minimized state in the first interface in response to the focus obtaining event in the first edit box.

In a possible implementation, the processor executes the computer instructions, so that the electronic device further performs the following operations: generating a focus loss event in the first edit box in response to a second operation; and automatically restoring the second interface in the minimized state to a floating window in response to the focus loss event in the first edit box.

In a possible implementation, the processor executes the computer instructions, so that the electronic device further performs the following operations: obtaining a cursor location in the first edit box; determining a first location whose distance from the cursor location is greater than a first threshold; and displaying the second interface in the minimized state at the first location.

In a possible implementation, the processor executes the computer instructions, so that the electronic device further performs the following operations: receiving a third operation performed on the second interface in a floating window state; displaying the second interface in full screen mode, and minimizing the first interface, in response to the third operation; and displaying the first interface in a minimized state in the second interface.

In a possible implementation, the second interface includes a second edit box, and the third operation is an operation performed on the second edit box; and the processor executes the computer instructions, so that the electronic device further performs the following operations: generating a focus obtaining event in the second edit box in response to the third operation; and automatically displaying the second interface in full screen mode, and minimizing the first interface, in response to the focus obtaining event in the second edit box.

In a possible implementation, the interfaces of the at least two applications further include a third interface of a third application, and the third interface is a floating window displayed in the first interface.

In a possible implementation, the processor executes the computer instructions, so that the electronic device further performs the following operations: receiving a fourth operation performed on the second interface in a floating window state; and automatically minimizing at least the third interface in response to the fourth operation.

In a possible implementation, the processor executes the computer instructions, so that the electronic device further performs the following operations: displaying the second interface in full screen mode, and minimizing the first interface and the third interface, in response to the fourth operation; and displaying the first interface in a minimized state and the third interface in a minimized state in the second interface.

In a possible implementation, the processor executes the computer instructions, so that the electronic device further performs the following operation: automatically displaying the second interface in the minimized state and the third interface in a minimized state in the first interface in response to the first operation.

It may be understood that the electronic device according to the fifth aspect is configured to perform the corresponding method according to the first aspect. Therefore, for beneficial effects that can be achieved by the electronic device, refer to beneficial effects in the corresponding method according to the first aspect. Details are not described herein again.

According to a sixth aspect, an embodiment of this application provides an electronic device, including a processor, a memory, and a display. The memory is configured to store computer executable instructions; and when the electronic device runs, the processor executes the computer executable instructions, so that the electronic device performs the following operations: displaying a first interface of a first application and a second interface of a second application side by side on the display of the electronic device, where there is no overlapping area between the first interface and the second interface; receiving a first operation performed on the first interface; and displaying the first interface in full screen mode, minimizing the second interface, and displaying the second interface in a minimized state in the first interface displayed in full screen mode, in response to the first operation, where the second interface in the minimized state is any one of a floating ball, an icon of the second application, a contact avatar, and a video pop-up window.

In a possible implementation, the first interface includes a first edit box, and the first operation is an operation performed on the first edit box; and the processor executes the computer instructions, so that the electronic device further performs the following operations: generating a focus obtaining event in the first edit box in response to the first operation; and displaying the first interface in full screen mode, minimizing the second interface, and displaying the second interface in the minimized state in the first interface displayed in full screen mode, in response to the focus obtaining event in the first edit box.

In a possible implementation, the processor executes the computer instructions, so that the electronic device further performs the following operations: receiving a second operation; generating a focus loss event in the first edit box in response to the second operation; and displaying the first interface and the second interface side by side again in response to the focus loss event.

In a possible implementation, the processor executes the computer instructions, so that the electronic device further performs the following operations: obtaining a cursor location in the first edit box; determining a first location whose distance from the cursor location is greater than a first threshold; and displaying the second interface in the minimized state at the first location.

In a possible implementation, the first interface includes a maximization function option, and the first operation is an operation on the maximization function option.

In a possible implementation, the processor executes the computer instructions, so that the electronic device further performs the following operations: receiving a third operation performed on the second interface in the minimized state; and displaying the first interface and the second interface side by side again in response to the third operation.

It may be understood that the electronic device according to the sixth aspect is configured to perform the corresponding method according to the second aspect. Therefore, for beneficial effects that can be achieved by the electronic device, refer to beneficial effects in the corresponding method according to the second aspect. Details are not described herein again.

According to a seventh aspect, an embodiment of this application provides a computer storage medium. The computer storage medium includes computer instructions. When the computer instructions are run on an electronic device, the electronic device is enabled to perform the method according to the first aspect.

It may be understood that the computer storage medium according to the seventh aspect is configured to perform the corresponding method according to the first aspect. Therefore, for beneficial effects that can be achieved by the computer storage medium, refer to beneficial effects in the corresponding method according to the first aspect. Details are not described herein again.

According to an eighth aspect, an embodiment of this application provides a computer storage medium. The computer storage medium includes computer instructions, and when the computer instructions are run on a router, the router is enabled to perform the method according to the second aspect.

It may be understood that the computer storage medium according to the eighth aspect is configured to perform the corresponding method according to the second aspect. Therefore, for beneficial effects that can be achieved by the computer storage medium, refer to beneficial effects in the corresponding method according to the second aspect. Details are not described herein again.

According to a ninth aspect, an embodiment of this application provides a computer program product. When program code included in the computer program product is executed by a processor in an electronic device, the method according to the first aspect is implemented.

It may be understood that the computer program product according to the ninth aspect is configured to perform the corresponding method according to the first aspect. Therefore, for beneficial effects that can be achieved by the computer program product, refer to beneficial effects in the corresponding method according to the first aspect. Details are not described herein again.

According to a tenth aspect, an embodiment of this application provides a computer program product. When program code included in the computer program product is executed by a processor in an electronic device, the method according to the second aspect is implemented.

It may be understood that the computer program product according to the tenth aspect is configured to perform the corresponding method according to the second aspect. Therefore, for beneficial effects that can be achieved by the computer program product, refer to beneficial effects in the corresponding method according to the second aspect. Details are not described herein again.

According to the solutions provided in embodiments of this application, when displaying interfaces of a plurality of applications, the electronic device may automatically minimize an interface of another application in response to an operation performed on an interface of one application. This simplifies an operation of minimizing the interface of the another application by a user, and provides better user experience.

DETAILED DESCRIPTION OF ILLUSTRATIVE EMBODIMENTS

The following describes technical solutions in embodiments of the present invention with reference to accompanying drawings. It is clear that the described embodiments are merely some but not all of embodiments of this application.

In the descriptions of this specification, "an embodiment", "some embodiments", or the like indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner.

In the descriptions of this specification, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions in embodiments of this application, "a plurality of" means two or more.

The terms "first" and "second" in the descriptions of this specification are merely intended for a purpose of description, and shall not be understood as an indication or implication of relative importance or implicit indication of a quantity of indicated technical features. Therefore, a feature limited by "first" or "second" may explicitly indicate or implicitly include one or more such features. The terms "include", "have", and their variants all mean "include but are not limited to", unless otherwise specifically emphasized in another manner.

A screen display method provided in embodiments of this application may be applied to an electronic device 100.

Figure 1:
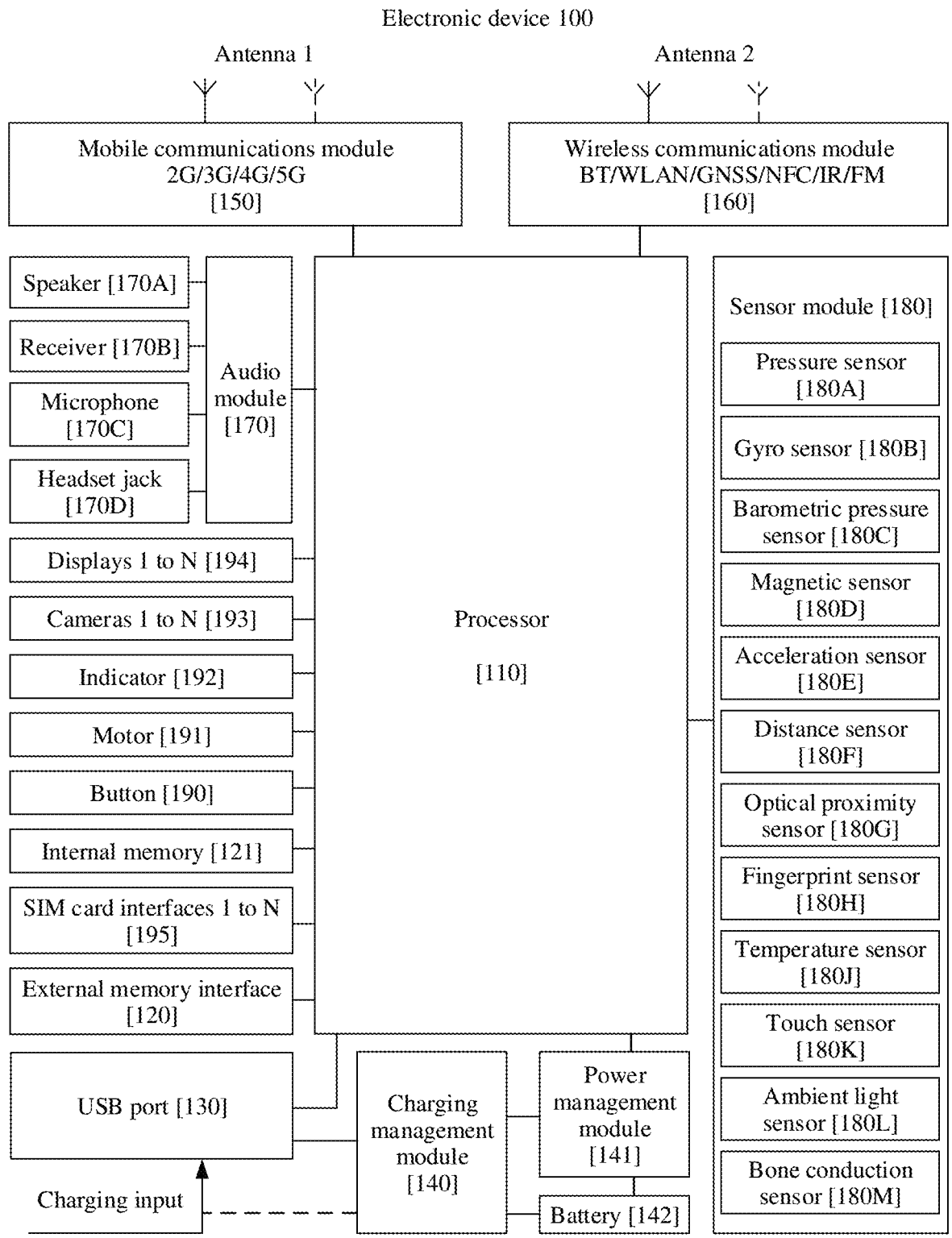
FIG. 1 is a schematic diagram of a hardware structure of an electronic device according to some embodiments of this application.

FIG. 1 is a schematic diagram of a hardware structure of an electronic device 100.

The electronic device 100 may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, combine some components, split some components, or have different component arrangements. The components shown in the figure may be implemented in hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on an instruction operation code and a time sequence signal, to control instruction reading and instruction execution.

A memory may be further disposed in the processor 110, and is configured to store instructions and data. In some embodiments, the memory in the processor 110 is a cache. The memory may store instructions or data that has been just used or is cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) port, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash, the camera 193, and the like through different I2C interfaces. For example, the processor 110 may be coupled to the touch sensor 180K through an I2C interface, so that the processor 110 communicates with the touch sensor 180K through the I2C interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call by using a Bluetooth headset.

The PCM interface may also be used for audio communication, and analog signal sampling, quantization, and coding. In some embodiments, the audio module 170 may be coupled to the wireless communications module 160 through a PCM interface. In some embodiments, the audio module 170 may alternatively transfer an audio signal to the wireless communications module 160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB port 130 is an interface that conforms to a USB standard specification, and may be specifically a mini USB port, a micro USB port, a USB Type-C port, or the like. The USB port 130 may be configured to connect to a charger to charge the electronic device 100, or may be configured to transmit data between the electronic device 100 and a peripheral device, or may be configured to connect to a headset, to play audio through the headset. Alternatively, the port may be configured to connect to another electronic device, for example, an AR device.

It may be understood that an interface connection relationship between the modules that is shown in this embodiment of the present invention is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the electronic device 100 may be configured to cover one or more communication bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 and at least some modules of the processor no may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits a processed signal to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another functional module.

The wireless communications module 160 may provide a wireless communication solution that includes a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, or the like and that is applied to the electronic device 100. The wireless communications module 160 may be one or more components integrating at least one communications processor module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-CDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or satellite based augmentation systems (SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to: compress or decompress a digital video. The electronic device 100 may support one or more video codecs. Therefore, the electronic device 100 may play or record videos in a plurality of coding formats, for example, moving picture experts group (MPEG)-1, MPEG-2, MPEG-3, and MPEG-4.

The NPU is a neural-network (NN) computing processor. The NPU quickly processes input information with reference to a structure of a biological neural network, for example, a transfer mode between human brain neurons, and may further continuously perform self-learning. Applications such as intelligent cognition of the electronic device 100, for example, image recognition, facial recognition, speech recognition, and text understanding, may be implemented through the NPU.

The external memory interface 120 may be used to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (such as audio data and an address book) and the like that are created during use of the electronic device 100. In addition, the internal memory 121 may include a high-speed random access memory, or may include a nonvolatile memory, for example, at least one magnetic disk storage device, a flash memory device, or a universal flash storage (UFS). The processor 110 runs instructions stored in the internal memory 121 and/or instructions stored in the memory disposed in the processor, to perform various function applications and data processing of the electronic device 100.

The electronic device 100 may implement an audio function such as music playing and recording through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an electrical audio signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, identify a sound source, implement a directional recording function, and the like.

The headset jack 170D is configured to connect to a wired headset. The headset jack 170D may be the USB port 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on the Messages icon, an instruction for creating a new SMS message is executed.

The gyro sensor 180B may be configured to determine a motion posture of the electronic device 100. In some embodiments, an angular velocity of the electronic device 100 around three axes (that is, axes x, y, and z) may be determined by using the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may be further used in a navigation scenario and a motion-sensing game scenario.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a flip phone, the electronic device 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between landscape mode and portrait mode or a pedometer.

The distance sensor 180F is configured to measure a distance. The electronic device 100 may measure a distance in an infrared manner or a laser manner. In some embodiments, in a photographing scenario, the electronic device 100 may measure a distance by using the distance sensor 180F, to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 18J. For example, when the temperature reported by the temperature sensor 180J exceeds a threshold, the electronic device 100 degrades performance of a processor near the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown due to a low temperature.

The touch sensor 180K is also referred to as a "touch component". The touch sensor 180K may be disposed on the display 194. The touch sensor 180K and the display 194 constitute a touchscreen. The touch sensor 180K is configured to detect a touch operation performed on or near the touch sensor 180K. The touch sensor may transfer the detected touch operation to the application processor, to determine a type of a touch event. The display 194 may provide a visual output related to the touch operation. In some other embodiments, the touch sensor 180K may alternatively be disposed on a surface of the electronic device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in the headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a key signal input related to a user setting and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. For touch operations performed on different areas of the display 194, the motor 191 may also correspond to different vibration feedback effects. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible with different types of SIM cards. The SIM card interface 195 is also compatible to an external storage card. The electronic device 100 interacts with a network through the SIM card, to implement functions such as calling and data communication. In some embodiments, the electronic device 100 uses an eSIM, that is, an embedded SIM card. The eSIM card may be embedded into the electronic device 100, and cannot be separated from the electronic device 100.

Then, an Android system of a layered architecture is used as an example to describe a software structure of the electronic device.

A software system of the electronic device 100 may use a layered architecture, an event-driven architecture, a microkernel architecture, a micro service architecture, or a cloud architecture. In this embodiment of the present invention, an Android system of a layered architecture is used as an example to describe the software structure of the electronic device 100.

Figure 2:
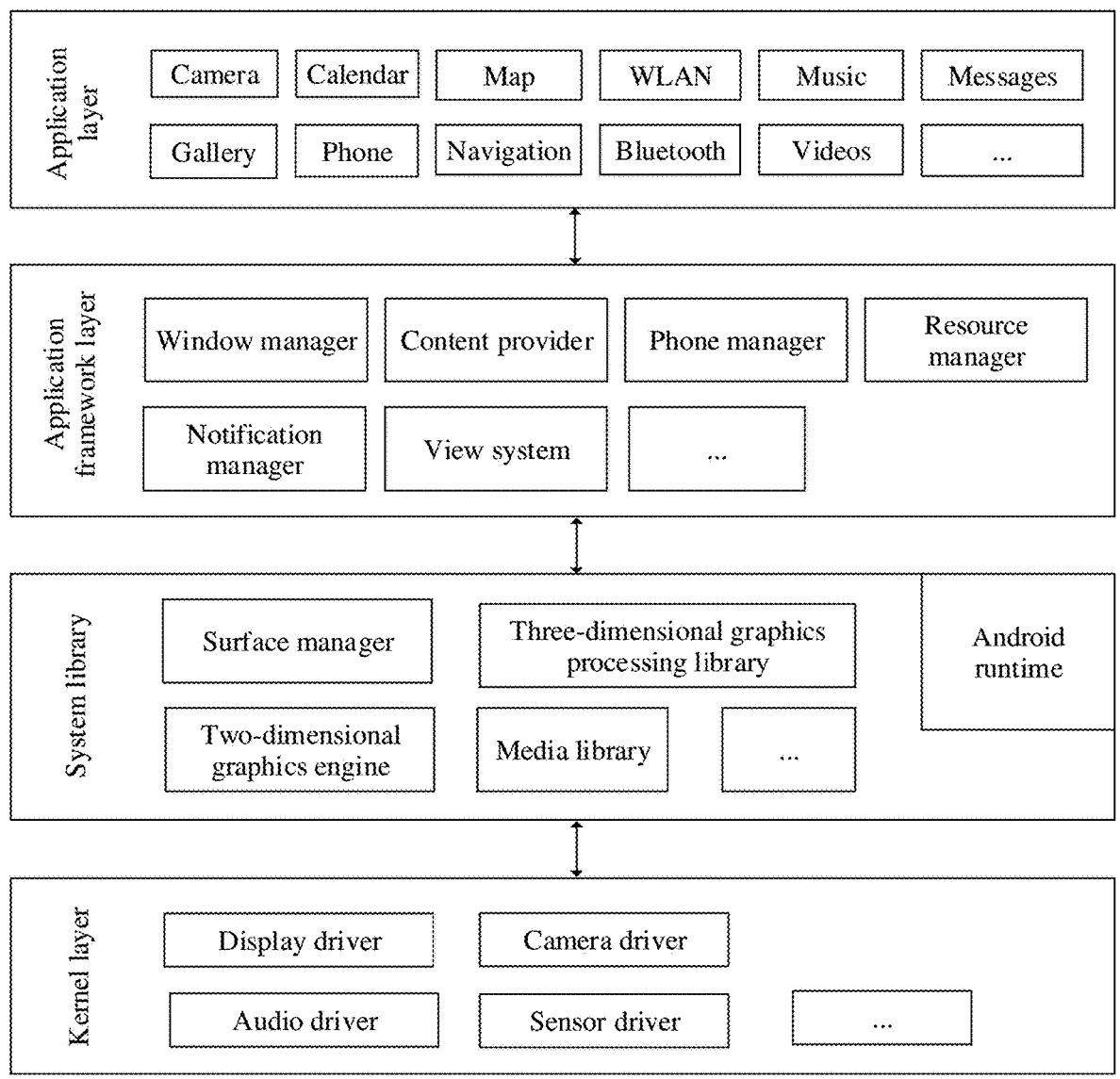
FIG. 2 is a schematic block diagram of software of an electronic device according to some embodiments of this application.

FIG. 2 is a block diagram of a software structure of the electronic device 100 according to an embodiment of the present invention.

In the layered architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom.

The application layer may include a series of application packages.

As shown in FIG. 2, the application packages may include applications such as Camera, Gallery, Calendar, Phone, Map, Navigation, WLAN, Bluetooth, Music, Videos, and Messages.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

The content provider is configured to: store and obtain data, and enable the data to be accessed by an application. The data may include a video, an image, audio, calls that are made and received, a browsing history and a bookmark, an address book, and the like.

The view system includes visual controls, such as a control for displaying a text and a control for displaying a picture. The view system can be configured to construct an application. A display interface may include one or more views. For example, a display interface including an SMS message notification icon may include a text display view and an image display view.

The phone manager is configured to provide a communication function of the electronic device 100, for example, management of a call status (including answering, declining, or the like).

The resource manager provides various resources such as a localized character string, an icon, a picture, a layout file, and a video file for an application.

The notification manager enables an application to display notification information in a status bar, and may be configured to convey a notification type message. The displayed notification information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an alert sound is played, the electronic device vibrates, or an indicator light blinks.

The Android runtime includes a core library and a virtual machine. The Android runtime is responsible for scheduling and management of the Android system.

The core library includes two parts: a function that needs to be invoked in Java language and a core library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording in a plurality of commonly used audio and video formats, static image files, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes examples of working procedures of software and hardware of the electronic device 100 with reference to a photographing scenario.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a single-tap operation and a control corresponding to the single-tap operation is a control of a camera application icon. A camera application invokes an interface at the application framework layer, so that the camera application is opened. Then, the camera driver is started by invoking the kernel layer, and a static image or a video is captured by using the camera 193.

The following describes examples of working procedures of software and hardware of the electronic device 100 with reference to a scenario in which an interface is displayed in a floating manner.

When the touch sensor 180K receives a touch operation that enables an interface to be displayed in a floating manner, a corresponding hardware interruption is sent to the kernel layer. The kernel layer processes the touch operation into an original input event (including information such as touch coordinates and a timestamp of the touch operation). The original input event is stored at the kernel layer. The window manager at the application framework layer may obtain the original input event from the kernel layer, and identify a window manager object corresponding to the input event, that is, an interface corresponding to the input event. The window manager adjusts a parameter in WindowManager.LayoutParams to control a size, a location, and a supported function (maximization, minimization, closing, moving, or the like) of the interface corresponding to the input event, so that the interface is displayed in a floating manner.

The following describes examples of working procedures of software and hardware of the electronic device 100 with reference to a scenario in which an interface A enters an input state and another interface is minimized.

When the touch sensor 180K receives a touch operation on an edit box in a first interface, a corresponding hardware interruption is sent to the kernel layer. The kernel layer processes the touch operation into an original input event (including information such as touch coordinates and a timestamp of the touch operation). The original input event is stored at the kernel layer. The window manager at the application framework layer may obtain the original input event from the kernel layer, and identify an interface A corresponding to the input event. The window manager adjusts a parameter in WindowManager.LayoutParams to minimize an interface other than the interface A currently displayed on the display, so that the interface other than the interface A is minimized.

The electronic device may simultaneously display interfaces of a plurality of applications, so that the user performs different tasks. For example, the electronic device may display a text input interface of a notepad application and a chat window of an instant messaging application, where the chat window may be displayed in the text input interface as a floating window. When the user needs to enter text content in the text input interface, user input is inconvenient due to blocking by the chat window. A solution is as follows: first tapping a minimization function option of the chat window to minimize the chat window, and then tapping the text input interface, so that the text input interface obtains an input focus, to facilitate user input. In this solution, the user needs to perform at least two operations, and the operations are complex. Particularly, because the minimization function option is small, that is, a tap target for the user is small, according to the Fitts' law, an operation of tapping the minimization function option requires a long time, and user experience is poor.

Embodiments of this application provide a screen display method. When displaying a plurality of interfaces, an electronic device may automatically minimize another interface in response to an operation performed by a user on one interface. That the electronic device displays a text input interface of a notepad application and a chat window of an instant messaging application is still used as an example. The electronic device may automatically minimize the chat window in response to an operation performed on the text input interface. To be specific, a user does not need to perform an operation of tapping a minimization function option of the chat window, and the chat window can be automatically minimized by performing an operation of tapping the text input interface by the user. This simplifies an operation of minimizing the chat window, and improves user experience.

In some embodiments, application of the screen display method provided in embodiments of this application to a scenario is described with reference to FIG. 3A, FIG. 3B, and FIG. 3C.

Figure 3A:
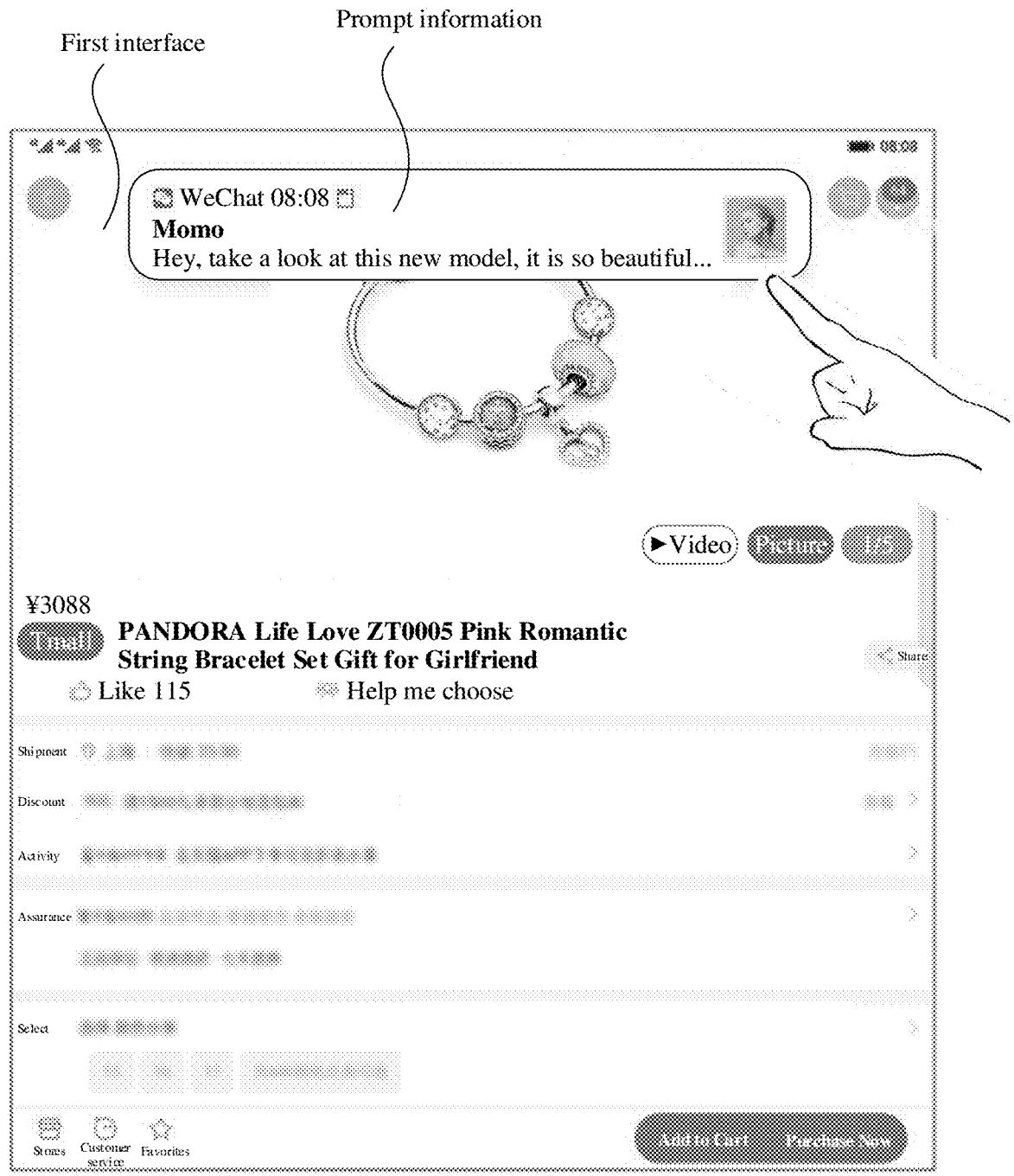
FIG. 3A, FIG. 3B, and FIG. 3C are diagrams of examples of screen display effects according to some embodiments of this application.

Refer to FIG. 3A. An electronic device may display a first interface in full screen mode. The first interface may be a running interface of an application A.

The application A may be a notepad application, for example, Youdao Cloud Notes. The application A may alternatively be a shopping application, for example, Taobao or Jingdong. The application A may alternatively be a reading application, for example, Huawei Reader or QQ Reader. Correspondingly, the running interface of the application A may be a text or picture display interface. The application A may alternatively be a video playback application, for example, Huawei Video or Tencent Video. Correspondingly, the running interface of the application A may be a video image. The application A may be a picture playback application, for example, a picture browser or Meitu. Correspondingly, the running interface of the application A may be a picture. Other examples are not enumerated one by one herein.

In an illustrative example, as shown in FIG. 3A, the application A may be a shopping application (for example, Taobao or Jingdong), and the electronic device may display a running interface (for example, a commodity introduction page) of the shopping application in full screen mode. The running interface may be referred to as a first interface.

The electronic device may display the first interface in full screen mode in a display area of a display of the electronic device, where the display area of the display is an area in a lit state in the display.

In an illustrative example, the display area of the display may be an entire displayable area of the display, or may be a partial displayable area of the display area. For example, the display may be a curved screen. The display area of the display may include a front display area and a side display area of the display, or the display area of the display may include only a front display area of the display. For another example, the display may be a foldable screen. The display area of the display may include a bendable area of the foldable screen and non-bendable areas on two sides of the bendable area, the display area of the display may include a bendable area of the foldable screen and a non-bendable area on one side of the bendable area, or the display area of the display may include only a non-bendable area on one side of the foldable screen.

In an illustrative example, displaying the first interface in full screen mode means that when the first interface is displayed in the display area of the display, a system-level interface element may also be displayed. For example, a status bar may be displayed at the top of the display area and/or a virtual key may be displayed at the bottom of the display area. The status bar may include an operator name (for example, China Mobile), a signal bar indicating signal strength, a remaining battery level, and the like. The virtual key may include a virtual back key, a virtual home key, and the like.

In an illustrative example, displaying the first interface in full screen mode means that the first interface occupies an entire display area of the display. In other words, the display area of the display displays only the first interface, and does not display other content such as an interface element in a system interface.

Still refer to FIG. 1A. When receiving a new message from an application B, the electronic device may output and display the new message in a floating manner in the first interface. The application B may be different from the application A. For example, the application B may be an instant messaging application or a Messages application.

As shown in FIG. 3A, for example, the electronic device receives a new message from WeChat. WeChat installed on the electronic device may be set to be in a background running state. When receiving a new message from a WeChat friend Momo, the electronic device may output and display prompt information of the new message in a floating manner in the first interface. The prompt information may include all or a part of content of the new message, and may further include an avatar of the WeChat friend.

Figure 3B:

Refer to FIG. 3B. A user may perform an operation (tap, touch, or the like) in a screen area in which the prompt information is displayed. In response to the operation, the electronic device may display a dialog box between the user and the WeChat friend Momo in a floating window state in the first interface displayed in full screen mode, so that the user converses with the WeChat friend Momo of the user. The dialog box between the user and the WeChat friend Momo is a running interface of the WeChat application, and may be referred to as a second interface.

For ease of description, the second interface displayed in a floating window state may be referred to as a floating window.

A size of the floating window is less than a size of the first interface displayed in full screen mode.

In an illustrative example, a size, a location, and a shape of the floating window may be default settings of the electronic device at delivery. For example, the floating window may be a rectangle with a fixed size, and may be located at an upper right-side location of the display area of the display, so that the user performs a related operation on the second interface with a right hand.

In an illustrative example, the electronic device may be a device, such as a tablet computer or a notebook computer, provided with a display with a large size, for example, may be a tablet computer provided with an 8-inch display or a 9-inch display. A size of the floating window may be a size of a display of a conventional mobile phone, for example, 4.8 inches or 5.5 inches, so that experience of viewing content in the floating window by the user can be improved.

In an illustrative example, a shape of the floating window may be a shape of an area obtained by scaling down the display area of the display at a same proportion, or may be a shape selected or customized by the user.

In an illustrative example, the user may select a shape of the floating window in advance from a setting menu that includes a plurality of settable shapes. The plurality of settable shapes may include a circle, a diamond, a hexagon, and the like. In an example, the user may customize a shape of the floating window in advance on a setting page on which a shape customized by the user can be received. For example, the user may draw the shape of the floating window in a customized floating window.

In an illustrative example, the floating window may be located in any area such as an upper right-side area, an upper left-side area, a central area, a top-side area, a lower left-side area, or a lower right-side area of the display area of the display.

In an illustrative example, the user may move a location of the floating window. For example, the user may press an edge of the floating window, for example, a top edge, a left edge, or a right edge of the floating window, and drag the floating window to a target location. In this process, the electronic device may place the floating window at the target location for display based on a track of the drag operation in response to the press operation and the drag operation that are initiated by the user on the floating window.

In an illustrative example, the electronic device may record the target location, and when displaying the floating window again, the electronic device may display the floating window at the target location.

In an illustrative example, the floating window may be transparent, and the user may see, through the floating window, content displayed on the display blocked by the floating window, that is, the user may see, through the floating window, the first interface blocked by the floating window.

In an illustrative example, the floating window may not be transparent, and the user cannot see content displayed on the display blocked by the floating window.

In an illustrative example, the electronic device may adjust an interface element in the second interface and/or an arrangement manner of the interface element based on the size of the floating window, to adapt to the floating window.

In an example, before displaying the floating window, the electronic device may obtain interface elements in the second interface in a full-screen display state and a spacing between the interface elements. Then, the electronic device may scale down the interface elements and the spacing between the interface elements at a same proportion based on a size of the second interface in the full-screen display state and the size of the floating window, and then display the interface elements and the spacing between the interface elements in the floating window. To be specific, the second interface displayed in a floating window state may be obtained by scaling down the second interface in the full-screen display state at a same proportion. Specifically, a WeChat dialog box is used as an example. The WeChat dialog box displayed in a floating window state is obtained by scaling down the WeChat dialog box in a full-screen display state at a same proportion.

In an illustrative example, before displaying the floating window, the electronic device may obtain interface elements in the second interface in a full-screen display state. Then, the electronic device displays, in the floating window, some interface elements in the second interface in the full-screen display state or a part of an area of the second interface. In other words, the second interface displayed in a floating window state displays some interface elements in the second interface in the full-screen display state or the part of the area of the second interface.

In an example of this example, when the floating window displays some interface elements in the second interface in the full-screen display state or the part of the area of the second interface, the user may change, by performing an operation such as sliding, the interface elements or the area displayed in the floating window. In other words, the user may change content in the floating window by performing an operation such as sliding.

In another example of this example, when the floating window displays some interface elements in the second interface in the full-screen display state or the part of the area of the second interface, a scroll bar may be displayed on a side of the floating window. For example, scroll bars may be displayed on a right side and a bottom side of the floating window, so that the user can conveniently adjust the interface elements or the area displayed in the floating window.

In an illustrative example, before displaying the floating window, the electronic device may obtain interface elements in the second interface in a full-screen display state. Then, the electronic device recombines the interface elements in the second interface in the full-screen display state, and then displays the interface elements in the floating window. In this example, the floating window may be referred to as a floating card.

Figure 3C:
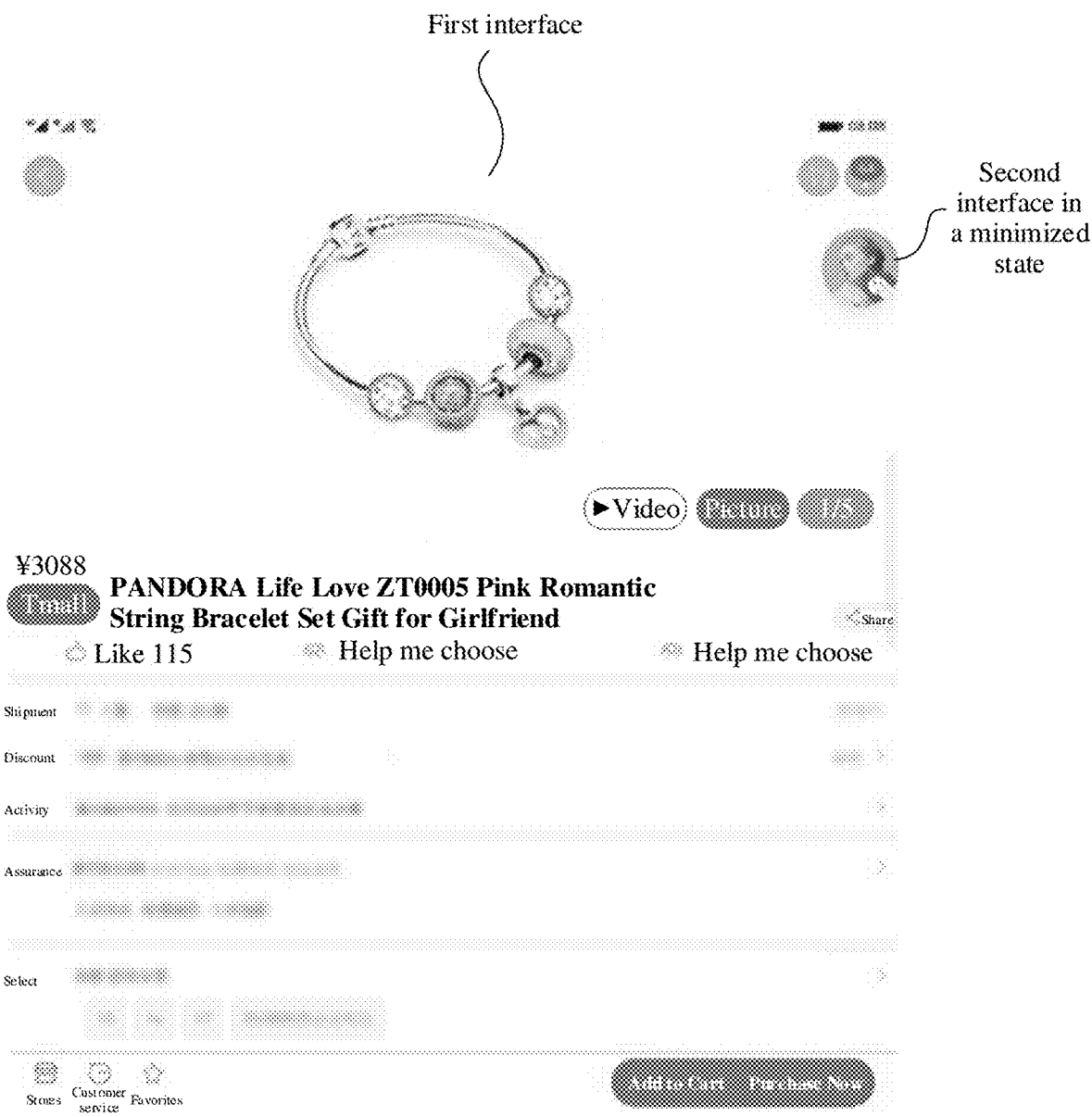

Refer to FIG. 3C. In response to an operation on the first interface (for example, a running interface of a shopping application), the electronic device may automatically minimize the second interface, and display the second interface in a minimized state in the first interface displayed in full screen mode. The operation on the first interface is an operation performed on the first interface. The operation performed on the first interface is specifically an operation performed on an area in the first interface other than an area blocked by the second interface.

The operation on the first interface may enable the first interface to enter a first state, and the operation may also be referred to as an operation of enabling the first interface to enter the first state. The user may perform an operation in an area that is in the first interface displayed in full screen mode and that is not blocked by the floating window. It is easily understood that a size of the floating window is less than a size of the first interface displayed in full screen mode. Therefore, the user may perform an operation, for example, a tap operation or a touch operation, in an area other than the floating window in the first interface.

In an illustrative example, the operation on the first interface may enable the first interface to enter a focus obtaining state. The focus obtaining state may be referred to as a first state. In this embodiment of this application, an interface on which a last operation initiated by the user is or is performed may be defined as a focus obtaining interface, that is, the interface enters the focus obtaining state. The operation may be a contact operation such as tapping or touching, or may be another type of operation (a floating gesture, a voice instruction, or the like). In other words, the operation on the first interface is the last operation initiated by the user, the interface on which the operation is performed is the first interface, and the operation enables the first interface to enter the focus obtaining state.

In this example, the electronic device may automatically minimize the second interface in response to the operation performed by the user on the first interface. To be specific, the user performs an operation, so that the first interface obtains a focus and the second interface is minimized, to improve user operation experience.

In an illustrative example, the first interface may include at least one edit box (Edit Box). The edit box is a window that can receive, accommodate, or edit text content or a picture in response to an input operation of the user after an input focus is obtained. The edit box may be specifically an input box, a text box, a picture box, an address bar, a search box, an editable page (a word page, a notepad, or the like), a table (an excel table or the like) that can accommodate input text content, or the like. It should be noted that the descriptions herein are merely examples for description rather than exhaustive enumeration of the edit box.

After obtaining an input focus, the edit box may enter an input state. When the user enters text or picture information, the edit box in the input state receives or accommodates the text or picture information entered by the user. More specifically, that an edit box displayed by an electronic device, such as a mobile phone or a tablet computer, provided with a touchscreen enters an input state may mean that the edit box obtains an input focus and displays a virtual keyboard. That an edit box displayed by an electronic device, such as a notebook computer or a desktop computer, provided with a physical keyboard enters an input state may mean that the edit box obtains an input focus and can receive content generated by operating the keyboard or content corresponding to a pasting operation.

In this example, if the operation performed on the first interface is not an operation of enabling the edit box in the first interface to enter the input state, that is, the operation enables the first interface to obtain the focus, but does not enable the edit box in the first interface to enter the input state, the operation does not trigger the electronic device to automatically minimize the second interface. When the user needs to enter content in the edit box in the first interface, the second interface blocks the first interface, and therefore user input is inconvenient. For the foregoing case, in this example, when determining that the user needs to enter the content in the edit box in the first interface, the electronic device may automatically minimize the second interface. To be specific, not all operations performed on the first interface may trigger the electronic device to automatically minimize the second interface. Therefore, the electronic device can determine that the edit box in the first interface needs to receive an operation entered by the user, and the electronic device can be triggered to minimize the second interface. Details are as follows:

The electronic device may automatically minimize the second interface in response to the operation of enabling the edit box in the first interface to enter the input state. The operation of enabling the edit box in the first interface to enter the input state may be an operation (for example, an operation such as single-tap, double-tap, or touch) performed on the edit box. For example, when or after receiving the operation performed on the edit box in the first interface, the electronic device may generate a focus obtaining (focus obtaining) event in the edit box in response to the operation, so that the edit box enters an input state, and the second interface is minimized.

In this example, when the operation performed on the first interface enables the first interface to obtain the focus, but does not enable the edit box in the first interface to enter the input state, the second interface is still displayed in a floating window state in the first interface. When detecting that the user expects to enter content in the edit box in the first interface, for example, when detecting a focus obtaining event in the edit box in the first interface, the electronic device automatically minimizes the second interface, so that it is convenient for the user to enter the content in the edit box in the first interface, and a case in which the second interface is minimized because the user accidentally touches the first interface can be avoided.

In an illustrative example, the second interface in the minimized state may be a floating ball, the floating ball may include a name of an application to which the second interface belongs or some text of the name, and the some text may be a first text of the name. For example, the second interface is a WeChat dialog box, and a floating ball corresponding to the WeChat dialog box may include "WeChat" or "We".

In an illustrative example, the second interface in the minimized state may be an application icon of an application to which the second interface belongs.

In an illustrative example, the second interface in the minimized state may be an interface icon of the minimized second interface. The interface icon may include identification information of the second interface. In an example, the second interface may be a dialog box of an instant messaging application or a Messages application, and the second interface in the minimized state may be a contact avatar. Specifically, the WeChat dialog box between the user and the WeChat friend (that is, a contact) Momo is used as an example. Refer to FIG. 3C. An icon of the minimized running interface may include an avatar of the WeChat friend Momo and a small WeChat icon, or the icon of the minimized running interface may include only an avatar of the WeChat friend Momo. In an example, the second interface is a content display interface of a reading application, and the interface icon may include a title of content included in the content display interface. For example, the second interface may be a content display interface of news, and the interface icon may include a title of the news. For another example, the second interface is a content display interface of any chapter in an ebook, and the interface icon may include a title of the chapter. In an example, the second interface may be a commodity display interface of a shopping application, and the interface icon may include a name or an image of a commodity.

In an illustrative example, if the second interface is a video playback interface, the second interface in the minimized state may alternatively be a scaled-down video playback interface, and the scaled-down video playback interface may be referred to as a video pop-up window. Specifically, a size of the video playback interface in the minimized state is less than a size of the video playback interface displayed in a floating window state. For example, the video playback interface in the minimized state may be a minimized picture-in-picture (picture-in-picture, PiP) interface.

In an illustrative example, a size, a location, and a shape of the interface in the minimized state may be default settings of the electronic device at delivery. For example, the interface in the minimized state may be a circular floating ball with a fixed diameter, and may be located at an upper right-side location of the display area of the display, so that the user performs an operation on the interface in the minimized state with a right hand.

In an illustrative example, the electronic device is an electronic device provided with a curved screen. The interface in the minimized state may be displayed on a side of the curved screen by default, to facilitate a user operation and reduce blocking of content displayed in a middle area of the curved screen.

In an illustrative example, the electronic device is an electronic device provided with a foldable screen. When the foldable screen is in a folded form, the interface in the minimized state may be displayed in a bent area of the foldable screen by default, to facilitate a user operation and reduce blocking of content displayed in a flat area of the foldable screen.

In an illustrative example, a size, a location, and a shape of the interface in the minimized state may be selected or customized by the user. For a manner of selecting or customizing the interface in the minimized state by the user, refer to the foregoing description of selecting or customizing the floating window by the user. Details are not described herein again.

In an illustrative example, that the first interface enters the first state is that the edit box in the first interface enters the input state. In this case, a display location of the second interface in the minimized state is away from a cursor location in the edit box in the input state. In this example, the electronic device may obtain the cursor location in the edit box in the input state in the first interface, and determine the display location of the second interface in the minimized state based on the cursor location. For example, any one of a plurality of locations whose distances from the cursor location are greater than a threshold or a location close to a side may be used as the display location. The threshold may be preset, for example, 10 mm or 14 mm. In this way, the display location of the second interface in the minimized state can be away from the cursor location, to avoid or reduce impact of the displayed interface in the minimized state on user input.

In an illustrative example, the electronic device may automatically hide the floating window in response to the operation on the first interface. In an example of this example, the operation on the first interface includes an operation of enabling any edit box in the first interface to enter an input state.

In an illustrative example, in response to the operation on the first interface, the electronic device may automatically minimize the second interface, and hide the second interface in the minimized state.

In an illustrative example, in response to the operation on the first interface, the electronic device may automatically minimize the second interface, and set the second interface in the minimized state as a completely transparent interface.

In an illustrative example, refer to FIG. 3B. There may be closing, minimization, and maximization function options on the top of the floating window (the second interface). In response to an operation (which may be referred to as an operation of minimizing the second interface) initiated by the user on the minimization function option, the electronic device may minimize the second interface, and display the second interface in the minimized state in the first interface. For the second interface in the minimized state, refer to the foregoing descriptions. Details are not described herein again.

When the electronic device displays the first interface in full screen mode and displays the second interface in the minimized state in the first interface, if the electronic device detects an operation of enabling the first interface to exit the first state, or detects an operation on the second interface in the minimized state, the electronic device may automatically restore the second interface in the minimized state to the second interface displayed in the floating window state.

In an illustrative example, the operation of enabling the first interface to exit the first state may be an operation (for example, tap or touch) on a system-level back key, so that the first interface exits the first state, that is, the first interface loses a focus. In response to an operation initiated by the user on the system-level back key, the electronic device may automatically restore the second interface in the minimized state to the floating window displayed in the first interface.

In an illustrative example, the operation of enabling the first interface to exit the first state may be an operation of enabling the edit box in the input state in the first interface to exit the input state, for example, may be a tap or touch operation performed in an area other than the edit box in the input state in the first interface. For example, the electronic device may generate a focus loss event in the edit box in response to the operation of enabling the edit box in the input state to exit the input state. In response to the focus loss event, the electronic device may automatically restore the second interface in the minimized state to the floating window displayed in the first interface.

In an illustrative example, the user may perform an operation (for example, tap or touch) in a screen area in which the second interface in the minimized state is displayed, so that the second interface obtains a focus. In response to the operation, the electronic device may automatically restore the second interface in the minimized state to the second interface displayed in the floating window state in the first interface.

The user may perform a related operation in a screen area in which the second interface is displayed in the floating window state, to perform a related task in the second interface. For example, the second interface is a WeChat dialog box. The user performs a text input task, a voice input task, or the like in the WeChat dialog box, and may further make a video call or perform a voice playing task.

It should be noted that, when a task is performed in the second interface, a task in the first interface may not be stopped. For example, the first interface is a video playback interface (for example, a commodity display video playback interface of a shopping application), and the second interface is a WeChat dialog box. When a voice playing task from a WeChat friend is performed in the second interface, a video playing task in the first interface may continue to be performed, that is, a video may continue to be played.

In an illustrative example, a resource invocation conflict occurs between a task in the first interface and a task in the second interface, for example, a resource invocation conflict occurs between a video playing task in the first interface and a voice playing task (or a video call task) in the second interface. In this case, if only one set of audio resources is configured for the electronic device, the voice playing task (or the video call task) of the instant messaging application may be first executed, and playing of the video playing task in the first interface may be paused or the video playing task in the first interface may be played in a muted manner. If at least two sets of audio resources are configured for the electronic device, the electronic device may invoke different audio resources to respectively perform the video playing task in the first interface and the voice playing task (or the video call task) of the instant messaging application. In an example, it may be specified that an electronic device provided with a speaker is externally connected to an audio resource, for example, connected to a Bluetooth speaker. If the electronic device needs to perform the voice playing task (or the video call task) in the second interface when the electronic device invokes the Bluetooth speaker to perform the video playing task in the first interface, the electronic device may invoke the speaker of the electronic device to perform the voice playing task (or the video call task) in the second interface.

For a manner of displaying the second interface in a floating manner, refer to the foregoing descriptions of FIG. 3B. Details are not described herein again.

In an illustrative example, when the electronic device displays the first interface in full screen mode and displays the second interface in the floating window state in the first interface, if the electronic device detects an operation of maximizing the second interface displayed in the floating window state, the electronic device may display the second interface in full screen mode, automatically minimize the first interface, and display the first interface or the first interface in a minimized state in the second interface.

In an illustrative example, the operation of maximizing the second interface displayed in the floating window state may be a double-tap operation, a two-finger stretch operation, or the like.

In an illustrative example, refer to FIG. 3B. There is a maximization function option on the top of the second interface displayed in the floating window state. The operation of maximizing the second interface may be an operation on the maximization function option.

For a solution in which the first interface is displayed in a floating window state, refer to the foregoing descriptions of FIG. 3B. Details are not described herein again.

For a solution in which the first interface in the minimized state is displayed, refer to the foregoing descriptions of displaying the second interface in the minimized state. Details are not described herein again.

According to the screen display method provided in this embodiment of this application, the second interface may be displayed in the floating window state in the first interface displayed in full screen mode, and the second interface may be automatically minimized when the first interface enters the first state (for example, the first interface enters the focus obtaining state, or the edit box enters the input state). To be specific, the second interface may be minimized by performing one operation performed on the first interface. This improves an operation of minimizing the second interface by the user, and reduces or avoids interference from the second interface or impact on the task performed by the user in the first interface.

The screen display method provided in this application continues to be described below by using examples in different embodiments with reference to different application scenarios. Unless otherwise specified, the following embodiments may be implemented with reference to the foregoing descriptions of the embodiments shown in FIG. 3A, FIG. 3B, and FIG. 3C.

In some embodiments, another implementation of displaying the second interface in the floating window state in the first interface displayed in full screen mode is described. Details are as follows:

The first interface is a running interface of an application A. When the running interface of the application A is displayed in full screen mode, a hidden sidebar (sidebar) may be disposed on a side of the display of the electronic device. The sidebar may include an icon of at least one application, and the at least one application may include an application B. The method further includes: The electronic device displays the running interface of the application A in full screen mode; displays the sidebar in response to an operation that is of displaying the sidebar and that is initiated by the user; and in response to an operation initiated by the user on an icon of the application B in the sidebar, displays a running interface (the second interface) of the application B in a floating window state in the running interface (the first interface) that is of the application A that is displayed in full screen mode. The running interface of the application B may be a home page interface displayed when the application B is opened. For example, the application B is WeChat, and the running interface of the application B may be a home page interface displayed after WeChat is entered.

In some embodiments, still another implementation of displaying the second interface in the floating window state in the first interface displayed in full screen mode is described. Details are as follows:

The first interface may be a running interface of an application A, and the second interface may be a running interface of an application B. The electronic device displays the first interface in full screen mode; and the electronic device displays the running interface of the application B in a floating window state in the first interface in response to a voice used to open the application B. A voice operation of waking up the application B may be a voice sent by the user. For example, the application B is WeChat, and the user may say "open WeChat" to the electronic device. In response to the voice "open WeChat" initiated by the user, the electronic device may display the running interface of the application B in the floating window state in the first interface displayed in full screen mode.

In some embodiments, application of the screen display method provided in embodiments of this application to another scenario is described with reference to FIG. 4. Details are as follows:

The first interface may be an application list interface. The application list interface may also be referred to as a home screen, and is also an interface of an application. The application list interface may include a plurality of application icons. The second interface may be a running interface of an application B. The electronic device may first display the running interface of the application B in full screen mode. Then, in response to an operation that is of enabling the running interface of the application B to be displayed in a floating manner and that is initiated by the user, the electronic device may display the application list interface in full screen mode, and display the running interface of the application B in a floating window state in the application list interface displayed in full screen mode.

Figure 4:
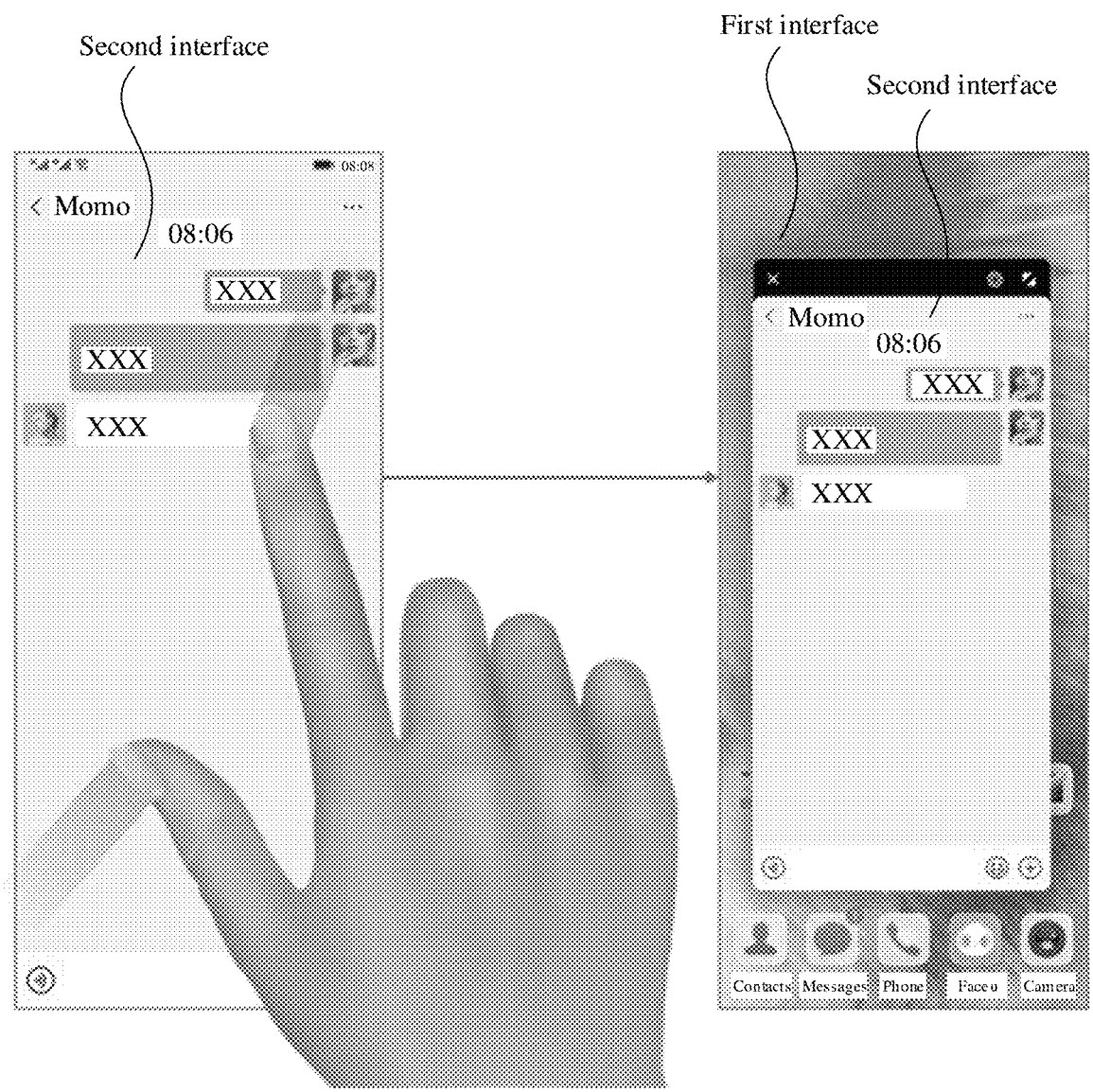
FIG. 4 is a diagram of an example of a screen display effect according to some embodiments of this application.

In an illustrative example, refer to FIG. 4. The operation of enabling the running interface of the application B to be displayed in the floating manner may be a two-finger pinch operation initiated by the user on the running interface of the application B.

In an illustrative example, operation of enabling the running interface of the application B to be displayed in the floating manner may be a slide-up operation, a slide-down operation, a slide-side operation, or the like initiated by the user on the running interface of the application B.

Refer to FIG. 4. For example, the application B is WeChat, and the running interface of the application B is a WeChat dialog box between a user and a WeChat friend Momo of the user. When the electronic device displays the WeChat dialog box in full screen mode, the electronic device may display the WeChat dialog box in a floating window state in the application list interface in response to an operation that is of enabling the WeChat dialog box to be displayed in the floating window state and that is initiated by the user, where the application list interface is the first interface displayed in full screen mode.

In an illustrative example, when the electronic device displays the application list interface in full screen mode, and displays the running interface of the application B in a floating state in the application list interface displayed in full screen mode, the user may tap or touch an application icon of an application C in the application list interface, to open the application C. It should be noted that, if the application icon of the application C is blocked by the running interface that is of the application B and that is displayed in the floating window state, the user may drag the running interface that is of the application B and that is displayed in the floating window state, so that the application icon of the application C is not blocked by the running interface that is of the application B and that is displayed in the floating window state.

In an example of this example, after the application C is opened, the electronic device may display a running interface of the application C in a floating window state in the application list interface displayed in full screen mode.

In another example of this example, after the application C is opened, the electronic device may display a running interface of the application C in full screen mode.

In this example, the user may quickly open the application C without exiting the running interface of the application B, to improve user experience of operating the electronic device.

In an illustrative example, when the electronic device displays the running interface of the application B in full screen mode, and displays the application list interface in a floating window state in the running interface that is of the application B and that is displayed in full screen mode, the user may tap or touch an application icon of an application C in the application list interface, to open the application C. Then, the application list interface displayed in the floating window state may be converted into an application interface of the application C. In this example, when displaying the running interface of the application in full screen mode, the electronic device may display the application list interface in the floating window state, so that the user can quickly open, in the application list interface displayed in the floating window state, another application without exiting the application currently displayed in full screen mode, to improve user experience of operating the electronic device.

In some embodiments, application of the screen display method provided in embodiments of this application to still another scenario is described with reference to FIG. 5A, FIG. 5B, and FIG. 5C.

Figure 5A:
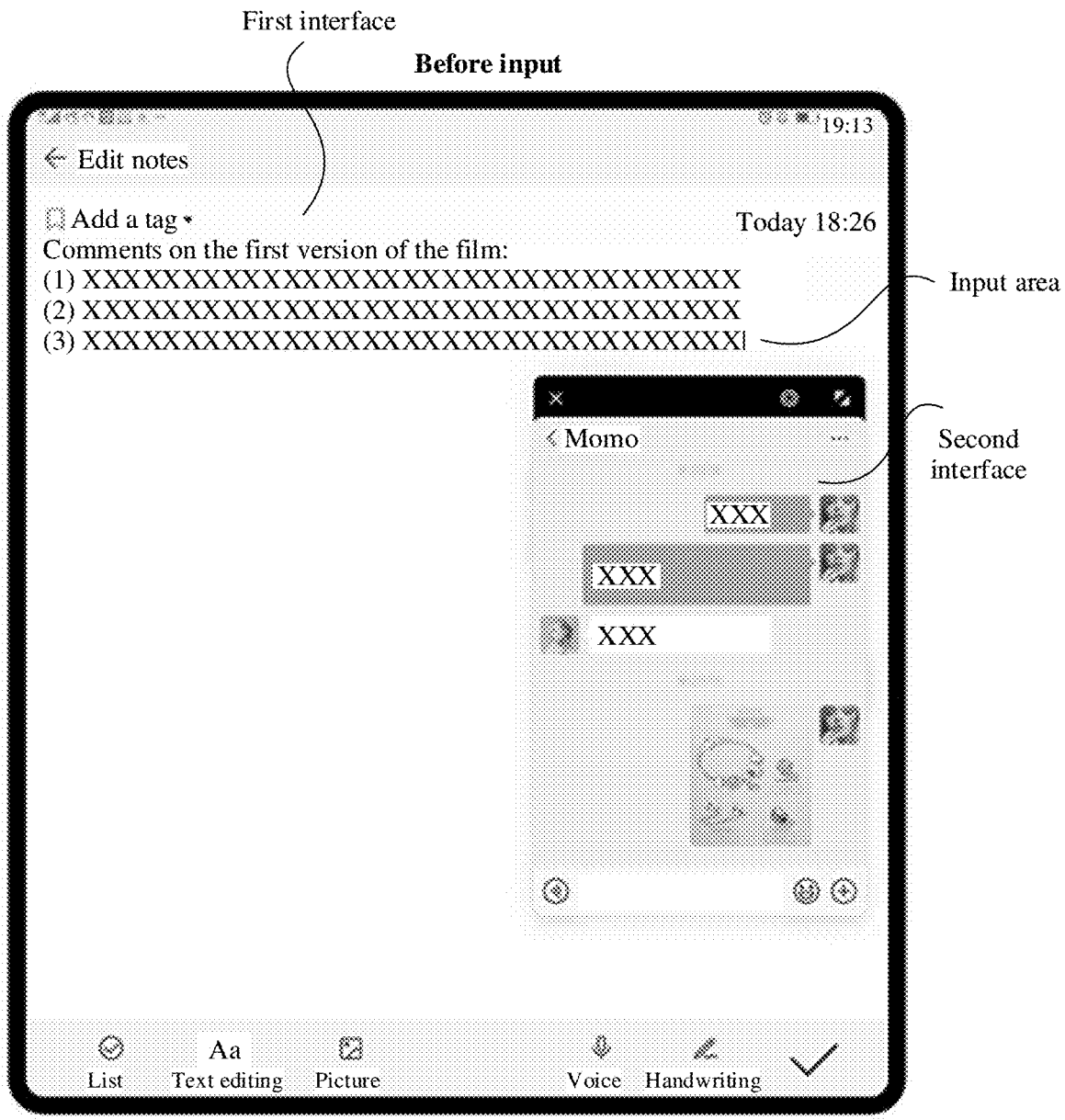
FIG. 5A, FIG. 5B, and FIG. 5C are diagrams of examples of screen display effects according to some embodiments of this application.

As shown in FIG. 5A, the electronic device may display a note editing page in full screen mode, and display a WeChat dialog box in a floating window state on the note editing page. The user may chat with a WeChat friend Momo of the user through this dialog box.

Figure 5B:
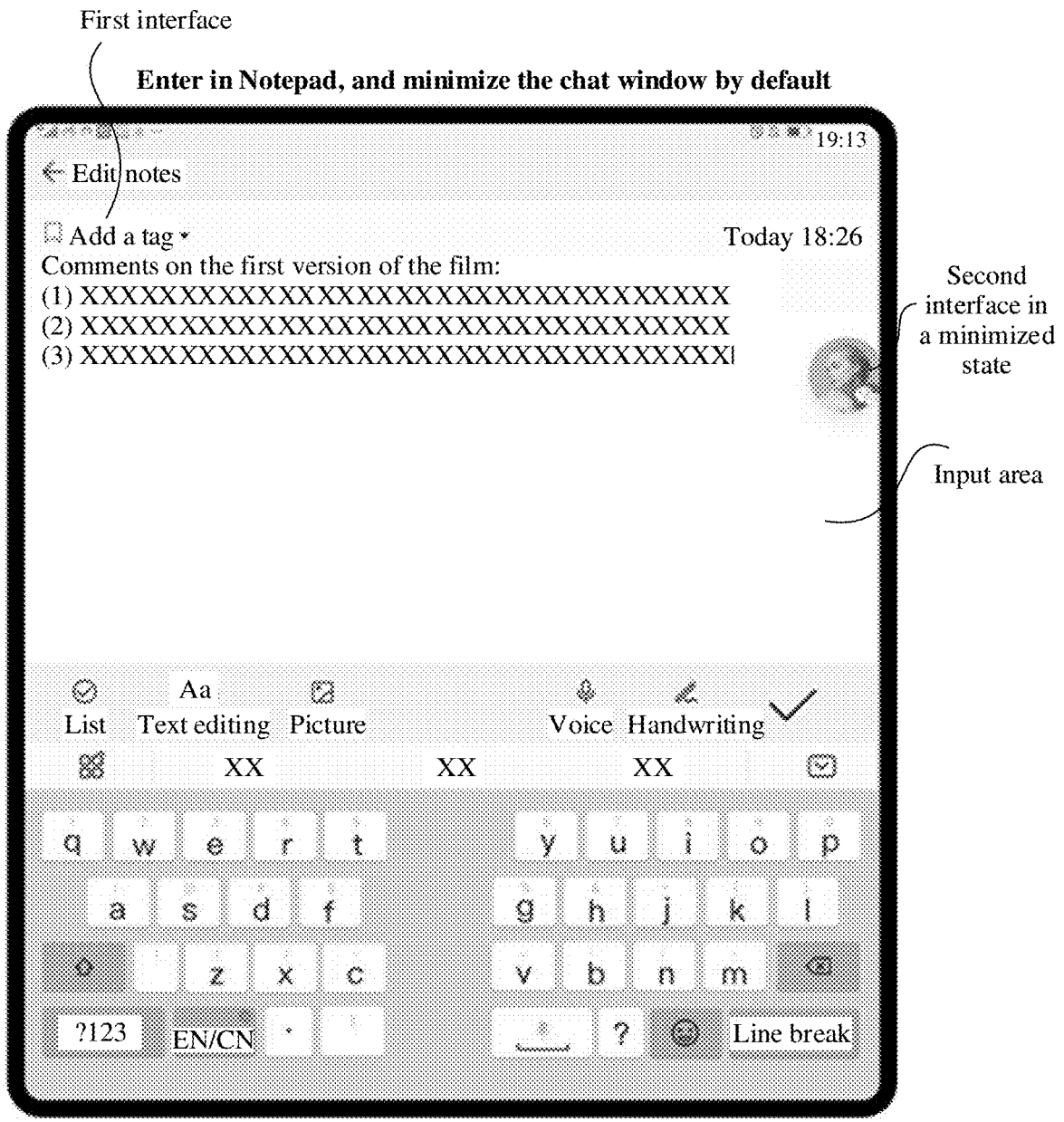

As shown in FIG. 5B, the user may tap an input area (that is, an edit box) on the note editing page, so that the WeChat dialog box is minimized to the WeChat dialog box in a minimized state, the edit box enters an input state, and a virtual keyboard is displayed. To be specific, the WeChat dialog box may be automatically minimized to the WeChat dialog box in the minimized state by performing an operation of tapping the edit box on the note editing page. Therefore, the WeChat dialog box can be automatically minimized by performing the operation performed on the edit box on the note editing page.

As shown in FIG. 5B, the WeChat dialog box in the minimized state may be a floating ball, and may include a WeChat avatar of the WeChat friend Momo of the user and a small WeChat icon. The floating ball may be displayed in an upper right-side area of the display, so that the user can operate the floating ball with a right hand.

For a form and a display manner of the WeChat dialog box in the minimized state, refer to the foregoing descriptions of FIG. 3C.

The user may tap or touch a screen area in which the WeChat dialog box in the minimized state is displayed, to restore the WeChat dialog box to a floating window.

Figure 5C:

In an illustrative example, refer to FIG. 5C. The user may tap or touch a screen area in which the WeChat dialog box in the minimized state is displayed, so that the WeChat dialog box is displayed in the floating window state again. In this way, the user can view or send a WeChat message.

Still refer to FIG. 5C. When the user may tap or touch the screen area in which the WeChat dialog box in the minimized state is displayed, so that the WeChat dialog box is displayed in the floating window state again, the edit box on the note editing page is still in an input state, and the virtual keyboard is still displayed. In this example, the user may view related information in the second interface by performing an operation on the interface in the minimized state. When input needs to be performed in the first interface, the user may directly perform input through the virtual keyboard without performing an operation of enabling or displaying the virtual keyboard, to improve experience of operating the electronic device.

The foregoing uses only the scenario shown in FIG. 5A to FIG. 5C as an example for description. The note editing page may be replaced with any interface that includes an edit box, and the any interface that includes the edit box may be referred to as a first interface. The WeChat dialog box interface may also be replaced with any other interface, and the any other interface may be referred to as a second interface. The electronic device may automatically minimize the second interface when determining that the user needs to enter content into the edit box in the first interface. The electronic device may receive an operation performed on the edit box in the first interface to determine that the user needs to enter the content into the edit box in the first interface, so as to automatically minimize the second interface. More specifically, the electronic device generates a focus obtaining event in the edit box in response to the operation performed on the edit box in the first interface. When generating the focus obtaining event, the electronic device may learn that the user needs to enter the content in the edit box, and may automatically minimize the second interface.

In this embodiment, when the operation performed on the first interface is not an operation of enabling the edit box in the first interface to enter an input state, the second interface is still displayed in the floating window state in the first interface. When the electronic device determines that the user expects to enter the content into the edit box in the first interface, that is, when the electronic device detects the operation of enabling the edit box in the first interface to enter the input state, the electronic device automatically minimizes the second interface, to facilitate an input operation of the user.

Figure 6A:
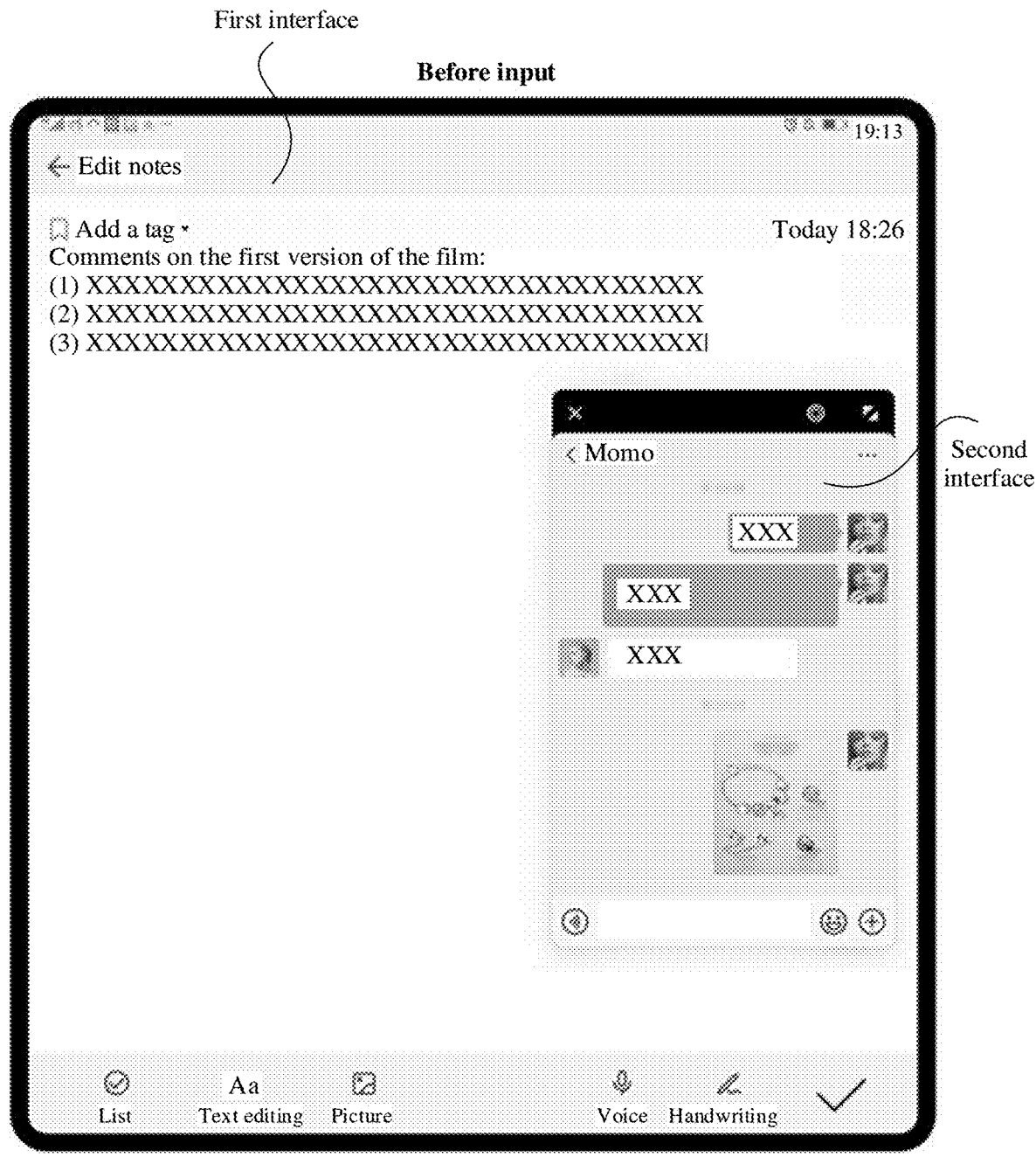
FIG. 6A, FIG. 6B, and FIG. 6C are diagrams of examples of screen display effects according to some embodiments of this application.

In some embodiments, application of the screen display method provided in embodiments of this application to still another scenario is described with reference to FIG. 6A, FIG. 6B, and FIG. 6C. Details are as follows:

As shown in FIG. 6A, in an expanded form of a foldable screen of the electronic device, a note editing interface of a notepad application may be displayed in full screen mode, and the note editing interface includes an input area (that is, an edit box). A WeChat dialog box between the user and a WeChat friend Momo of the user is displayed in a floating window state in the note editing interface. In a scenario shown in FIG. 6A, the user may chat with the friend Momo of the user through WeChat dialog box B.

Figure 6B:

As shown in FIG. 6B, the user may tap the edit box in the note editing interface, so that the edit box enters an input state, and a virtual keyboard is enabled. In response to the operation of tapping the edit box in the note editing interface by the user, the electronic device may automatically hide the WeChat dialog box between the user and the WeChat friend Momo of the user.

Figure 6C:
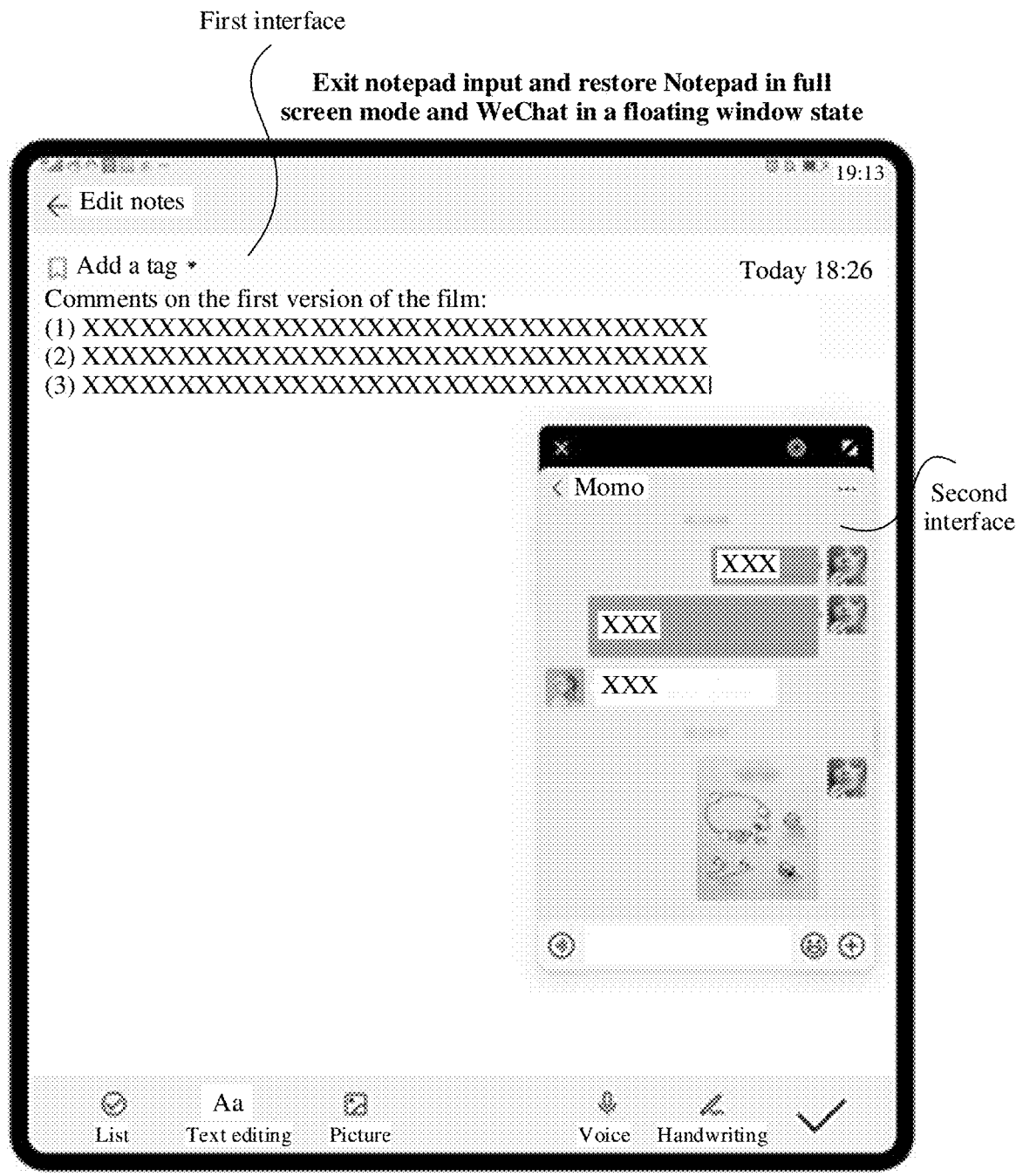

As shown in FIG. 6C, the user may tap an area other than the edit box in the note editing interface. In response to the tap operation, the electronic device enables the edit box to exit the input state (that is, enables the first interface to exit a first state), enables the virtual keyboard to exit, and automatically displays the WeChat dialog box between the user and the WeChat friend Momo of the user in a floating window state in the note editing interface displayed in full screen mode, so that the user can continue conversing with the friend Momo of the user.

In some embodiments, application of the screen display method provided in embodiments of this application to still another scenario is described with reference to FIG. 7A, FIG. 7B, and FIG. 7C. Details are as follows:

The first interface and the second interface may be two running interfaces of a same application, and the first interface may be a previous-level interface of the second interface. Multi-level interfaces may be simultaneously opened for an application (such as Taobao or UC Browser) whose plurality of running interfaces may be simultaneously opened. For example, the electronic device may display a theme interface of an application in response to an operation of opening the application by the user, and then open, in response to an operation on an interface element in the theme interface, a next-level interface that is of the theme interface and that corresponds to the interface element. The theme interface may be referred to as a first interface, and the next-level interface of the theme interface may be referred to as a second interface.

When the electronic device displays the second interface in full screen mode, in response to an operation of enabling the second interface to be displayed in a floating manner, the electronic device may display the first interface in full screen mode, and display the second interface as a floating window in the first interface.

Figure 7A:
FIG. 7A, FIG. 7B, and FIG. 7C are diagrams of examples of screen display effects according to some embodiments of this application.

As shown in FIG. 7A, the operation of enabling the second interface to be displayed in the floating manner may be a two-finger pinch operation initiated by the user on the second interface. In response to the operation, the electronic device displays a previous-level interface of the second interface, that is, the first interface, in full screen mode, and displays the second interface in a floating window state in the first interface displayed in full screen mode.

Figure 7B:
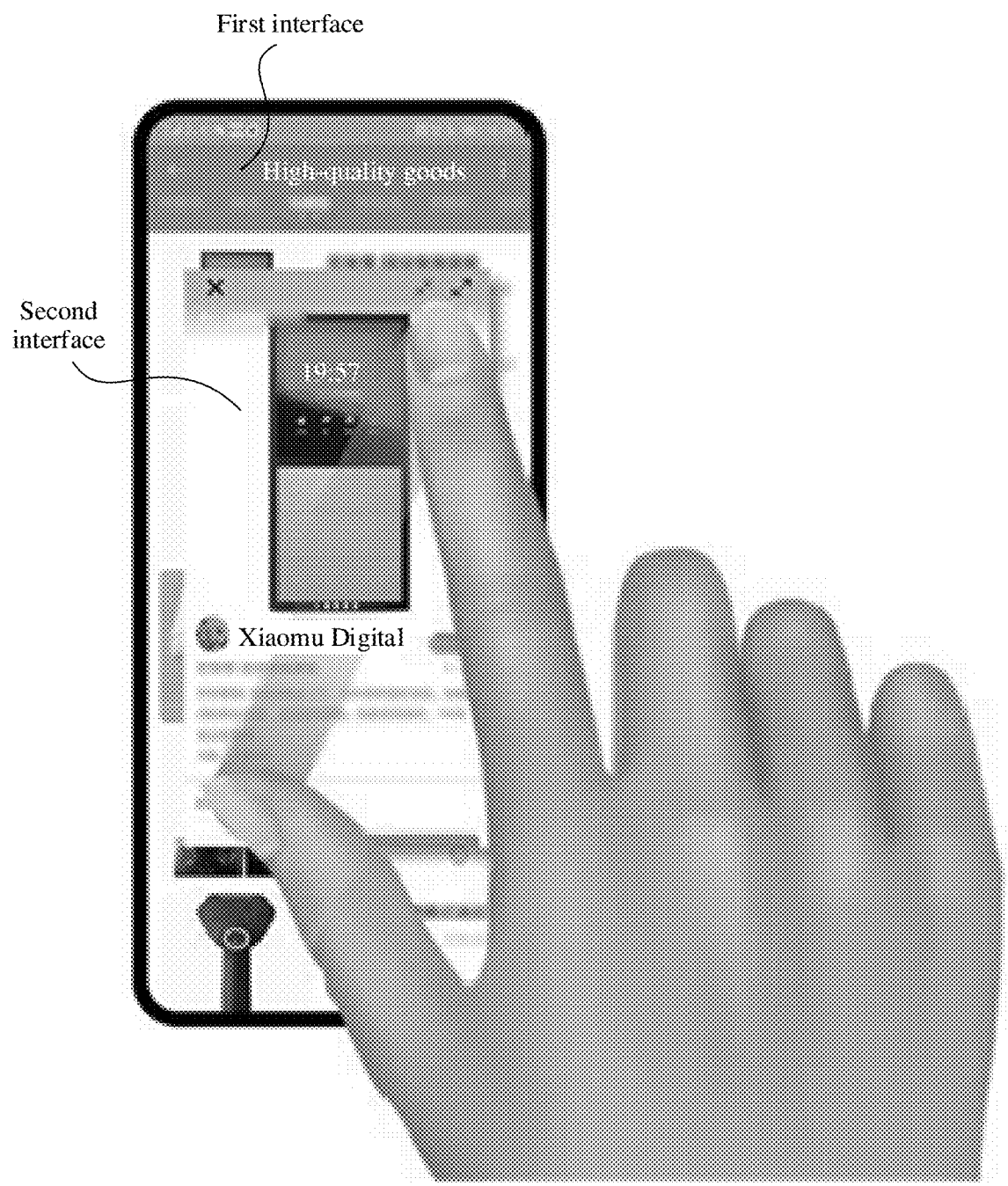
Figure 7C:
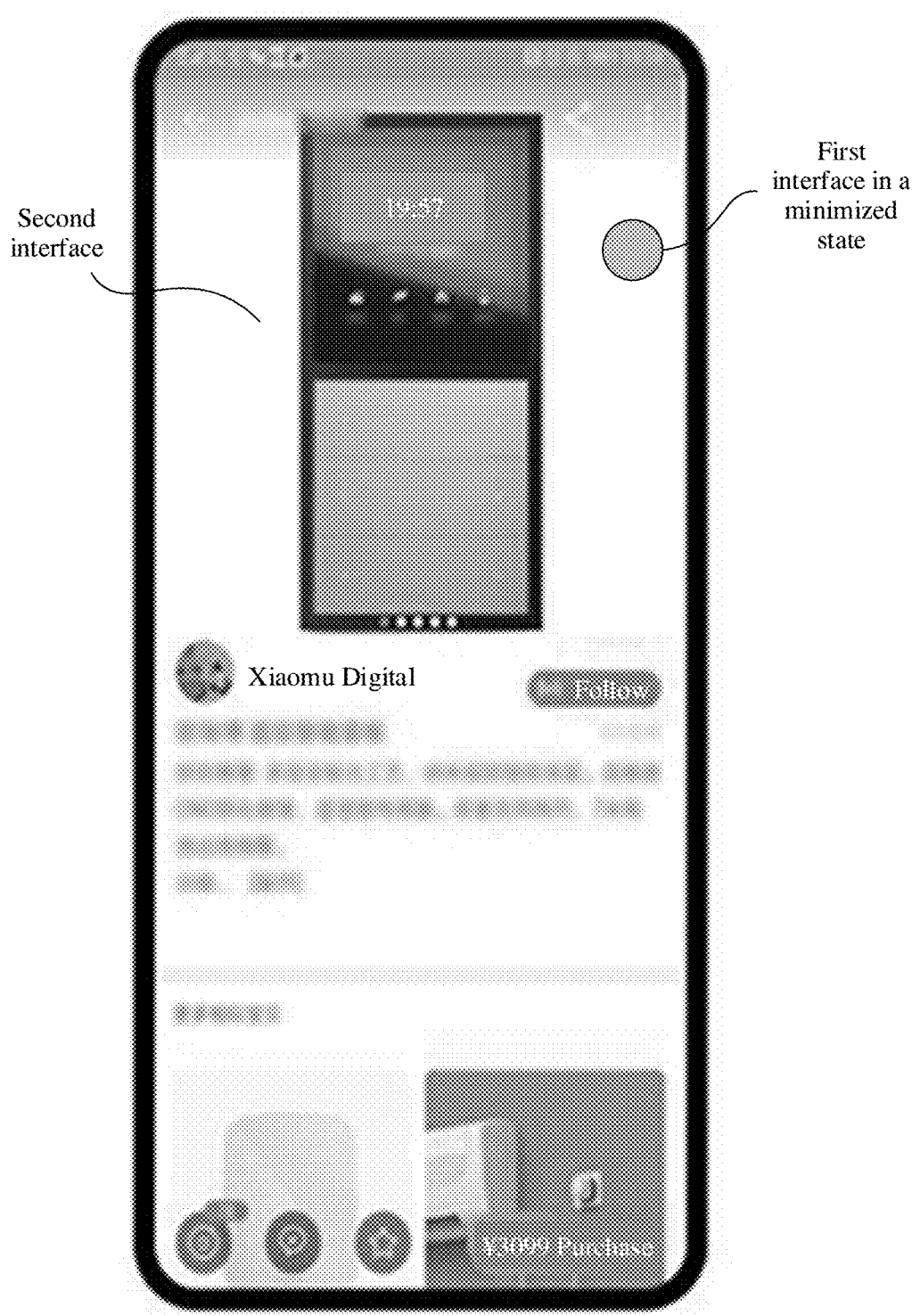

Refer to FIG. 7B and FIG. 7C. When the electronic device displays the first interface in full screen mode, and displays the second interface in a floating window state in the first interface, in response to an operation of maximizing the second interface, the electronic device may display the second interface in full screen mode, automatically minimize the first interface to the first interface in a minimized state, and display the first interface in the minimized state in the second interface displayed in full screen mode.

In an illustrative example, as shown in FIG. 7C, the first interface in the minimized state may be a floating ball.

In an illustrative example, as shown in FIG. 7B, the operation of maximizing the second interface may be a two-finger stretch operation performed on the second interface.

In an illustrative example, when the electronic device displays the second interface in full screen mode, and displays the first interface in the minimized state in a floating window state in the second interface, in response to an operation of enabling the second interface to lose a focus, the electronic device may automatically display the first interface as a floating window in the first interface displayed in full screen mode.

In an example, the operation of enabling the second interface to lose the focus may be an operation of tapping a system back key in a state in which the second interface obtains a focus. In another example, the operation of enabling the second interface to lose the focus may alternatively be an operation of tapping the first interface in the minimized state.

In an illustrative example, the first interface and the second interface each include a closing function option. When the electronic device displays the second interface in full screen mode, and displays the first interface in the minimized state in a floating window state in the second interface, in response to an operation on the closing function option in the second interface, the electronic device may close the second interface, and display the first interface in full screen mode.

In some embodiments, application of the screen display method provided in embodiments of this application to still another scenario is described with reference to FIG. 8A, FIG. 8B, FIG. 8C, and FIG. 8D. Details are as follows:

The first interface may be a video playback interface, and the second interface may be a dialog box of an instant messaging application or a Messages application. When the electronic device displays the video playback interface in full screen mode, the electronic device may prompt for a new message when receiving the new message from the instant messaging application or the Messages application.

In an illustrative example, prompting for the new message may be specifically displaying prompt information of the new message in a floating manner in the video playback interface displayed in full screen mode. For details, refer to the foregoing descriptions of FIG. 3A. The details are not described herein again.

In an illustrative example, the prompting for the message may be specifically displaying the second interface in a minimized state in the video playback interface displayed in full screen mode, where the second interface is an interface including the new message.

Figure 8A:
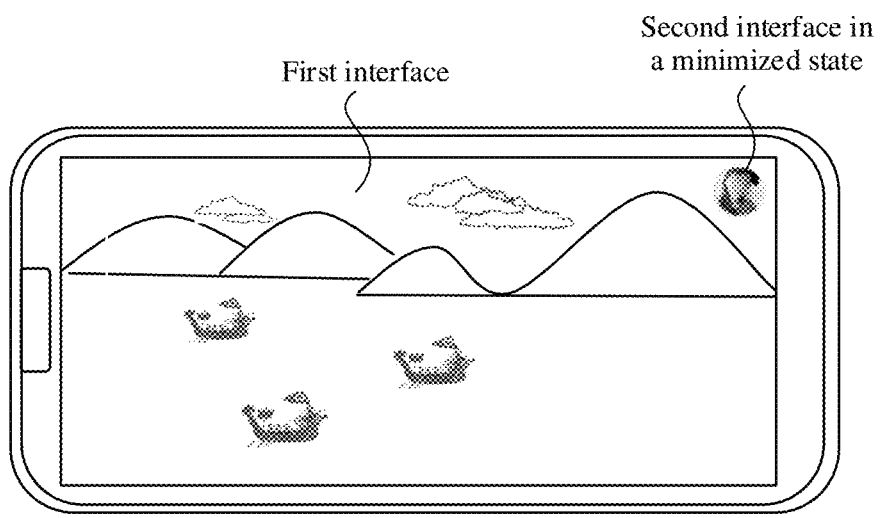
FIG. 8A, FIG. 8B, FIG. 8C, and FIG. 8D are diagrams of examples of screen display effects according to some embodiments of this application.

In an example, refer to FIG. 8A. It may be specified that the new message is a message from a WeChat friend of the user. The second interface in the minimized state may be a floating ball obtained by minimizing a WeChat dialog box between the user and the WeChat friend of the user, and the floating ball may include an avatar of the WeChat friend of the user.

In response to an operation initiated by the user on the second interface in the minimized state, the electronic device may display the second interface in a floating window state in the video playback interface displayed in full screen mode.

In response to an operation initiated by the user on the second interface, the electronic device may display the second interface in full screen mode, and minimize the first interface to the first interface in a minimized state.

Figure 8B:
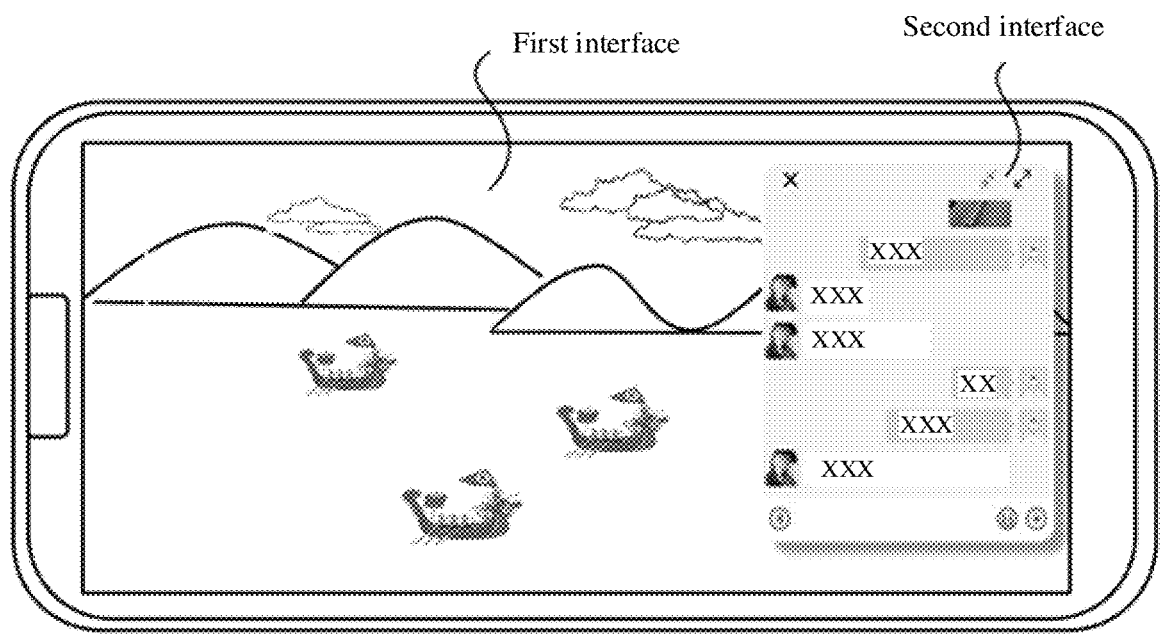
Figure 8C:
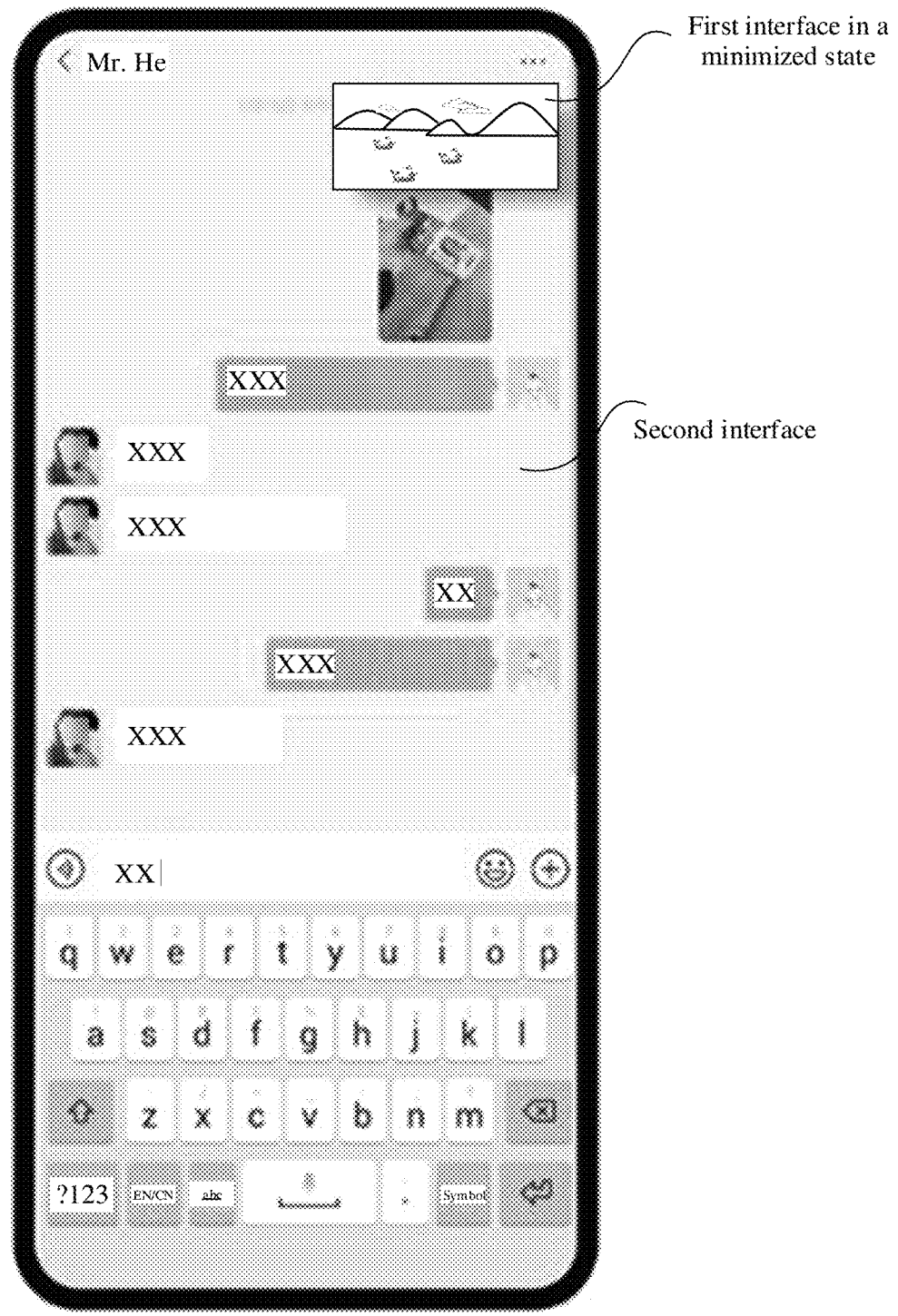

In an illustrative example, as shown in FIG. 8B, the second interface displayed in the floating window state includes an edit box. Refer to FIG. 8C. In response to an operation that is of enabling the edit box in the second interface to enter an input state and that is initiated by the user, the electronic device may automatically display the second interface in full screen mode, and automatically minimize the first interface to the first interface in the minimized state. For the operation that is of enabling the edit box to enter the input state and that is initiated by the user, refer to the foregoing descriptions of the embodiments shown in FIG. 5A and FIG. 5B. Details are not described herein again.

In this example, when the user expects to enter content into the edit box in the second interface displayed in the floating window state, in response to the operation that is of enabling the edit box in the second interface to enter the input state and that is initiated by the user, the electronic device may automatically display the second interface in full screen mode, and automatically minimize the first interface originally displayed in full screen mode, to facilitate an input operation of the user.

In an illustrative example, as shown in FIG. 8B, the second interface displayed in the floating window state includes a maximization function option. Refer to FIG. 8C. In response to an operation initiated by the user on the maximization function option, the electronic device may automatically display the second interface in full screen mode, and automatically minimize the first interface to the first interface in the minimized state.

In an illustrative example, as shown in FIG. 8C, the first interface in the minimized state may be a picture-in-picture interface, the picture-in-picture interface is obtained by scaling down the video playback interface displayed in full screen mode, and a size of the picture-in-picture interface is less than a size of the floating window. To be specific, the video playback interface may exist in three states: a full-screen display state, a floating window state (a state in which the video playback interface is displayed in the floating window state), and a picture-in-picture state. Size corresponding to the full-screen display state>Size corresponding to the floating window state>Size corresponding to the picture-in-picture state. The video playback interface in the picture-in-picture state may also be referred to as a video pop-up window.

In an example, the video playback interface in the picture-in-picture state may not stop playing a video. In other words, the video playback interface displayed in full screen mode is minimized to a picture-in-picture interface, and the video can be continuously played.

Still refer to FIG. 8C. The electronic device may display the picture-in-picture interface in an upper right corner of the second interface.

In an illustrative example, when the electronic device displays the second interface in full screen mode, and displays the first interface in the minimized state in the first interface, in response to an operation that is of enabling the edit box in the second interface to exit the input state and that is initiated by the user, the electronic device may automatically display the first interface, that is, the video playback interface, in full screen mode, minimize the second interface, and display the second interface in the minimized state in the video playback interface. For the operation that is of enabling the edit box in the second interface to exit the input state and that is initiated by the user, refer to the foregoing descriptions of FIG. 6C. Details are not described herein again.

In an illustrative example, when the electronic device displays the second interface in full screen mode, and displays the first interface in the minimized state in the second interface, in response to an operation initiated by the user on the first interface in the minimized state, the electronic device may automatically display the first interface, that is, the video playback interface, in full screen mode, minimize the second interface, and display the second interface in the minimized state in the video playback interface. For the operation that is of enabling the edit box in the second interface to exit the input state and that is initiated by the user, refer to the foregoing descriptions of FIG. 6C. Details are not described herein again.

Figure 8D:
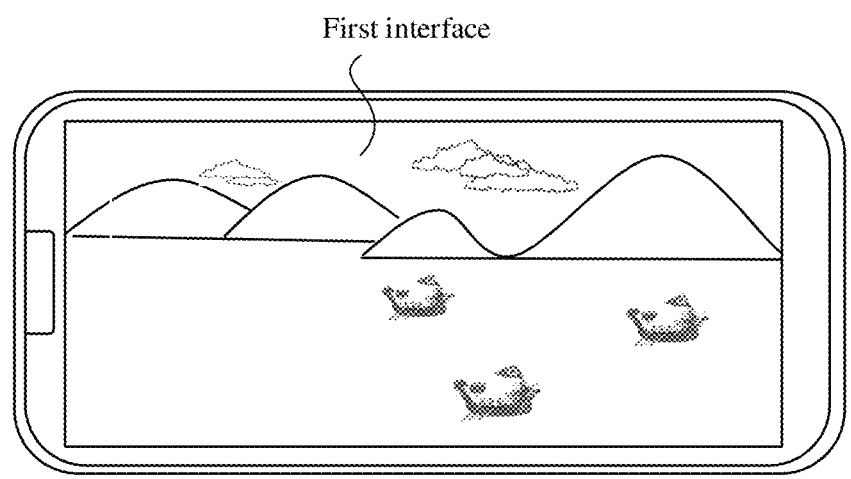

In an illustrative example, refer to FIG. 8D. When the electronic device displays the first interface (that is, the video playback interface) in full screen mode, and displays the second interface in the minimized state in the first interface, if within a preset time period, an application corresponding to the second interface does not receive a new message, or the electronic device does not detect an operation initiated by the user on the second interface in the minimized state, the electronic device may hide the second interface in the minimized state. The preset time period may be 30 seconds, 20 seconds, or the like.

In some embodiments, application of the screen display method provided in embodiments of this application to still another scenario is described with reference to FIG. 9A, FIG. 9B, FIG. 9C, and FIG. 9D. Details are as follows:

The first interface may be a running interface of a reading application, and the second interface may be a payment interface. In an example, the payment interface may be a payment code interface, for example, a payment page of a payment application such as Alipay or WeChat Pay. In another example, the payment interface may be an interface including a metro code or a bus code, for example, a bus code interface of a Beijing all-in-one card application. Other examples are not enumerated one by one herein.

In this embodiment, descriptions are provided below by using an example in which the first interface is a running interface of Phoenix News and the second user interface is a payment code interface of Alipay.

Figure 9A:
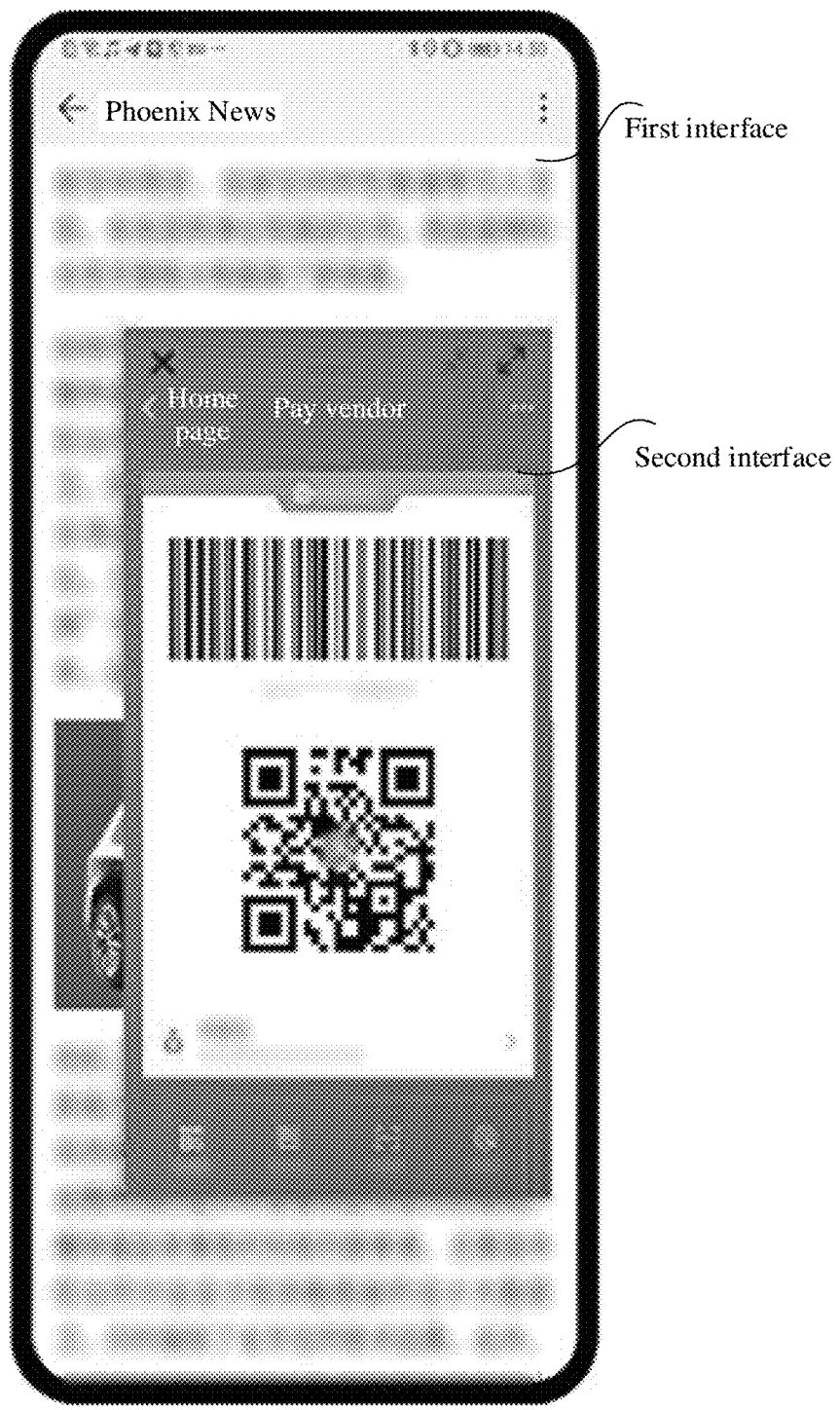
FIG. 9A, FIG. 9B, FIG. 9C, and FIG. 9D are diagrams of examples of screen display effects according to some embodiments of this application.

Refer to FIG. 9A. The electronic device may display the running interface (the first interface) of Phoenix News in full screen mode, and display the payment code interface (the second interface) of Alipay in a floating window state in the first interface displayed in full screen mode.

Specifically, when the electronic device displays the first interface in full screen mode, Alipay may be opened through a sidebar, voice wakeup, or the like, and the payment interface (the second interface) of Alipay may be displayed by performing a related operation. For details, refer to the foregoing descriptions of the implementation of displaying the second interface in the floating window state. The details are not described herein again.

When the electronic device displays the first interface in full screen mode, and displays the second interface in the floating window state in the first interface, in response to an operation of maximizing the second interface, the electronic device may automatically display the second interface in full screen mode, and display the first interface in a minimized state in the second interface displayed in full screen mode.

Figure 9B:
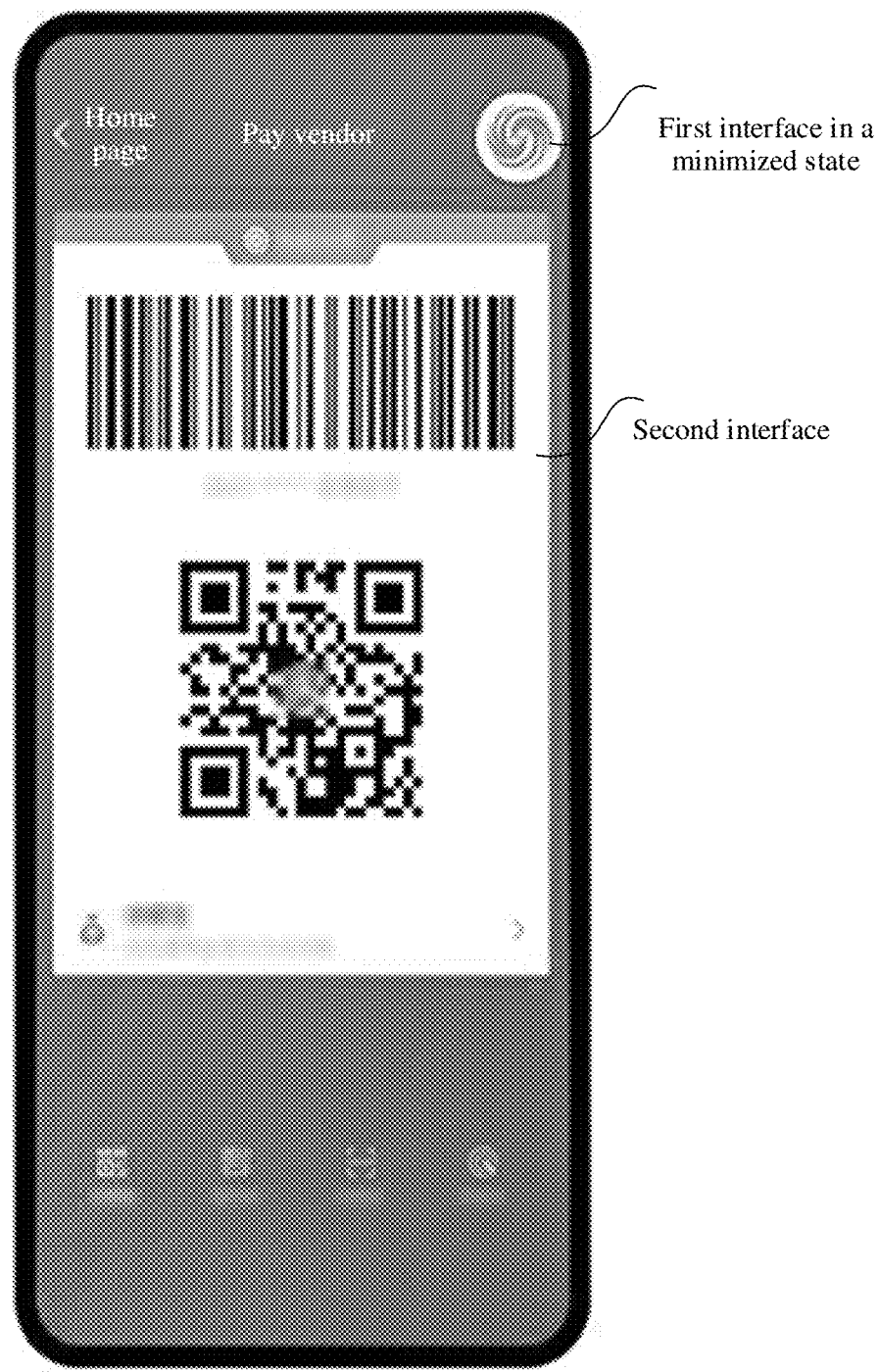

Refer to FIG. 9B. In response to the operation that is of maximizing the second interface (for example, tapping a maximization function option in the second interface displayed in the floating window state) and that is initiated by the user, the electronic device may automatically display the second interface in full screen mode, minimize the first interface, and display the first interface in the minimized state in the second interface displayed in full screen mode. In an example, as shown in FIG. 9B, the first interface in the minimized state may be an application icon of Phoenix News.

Figure 9C:
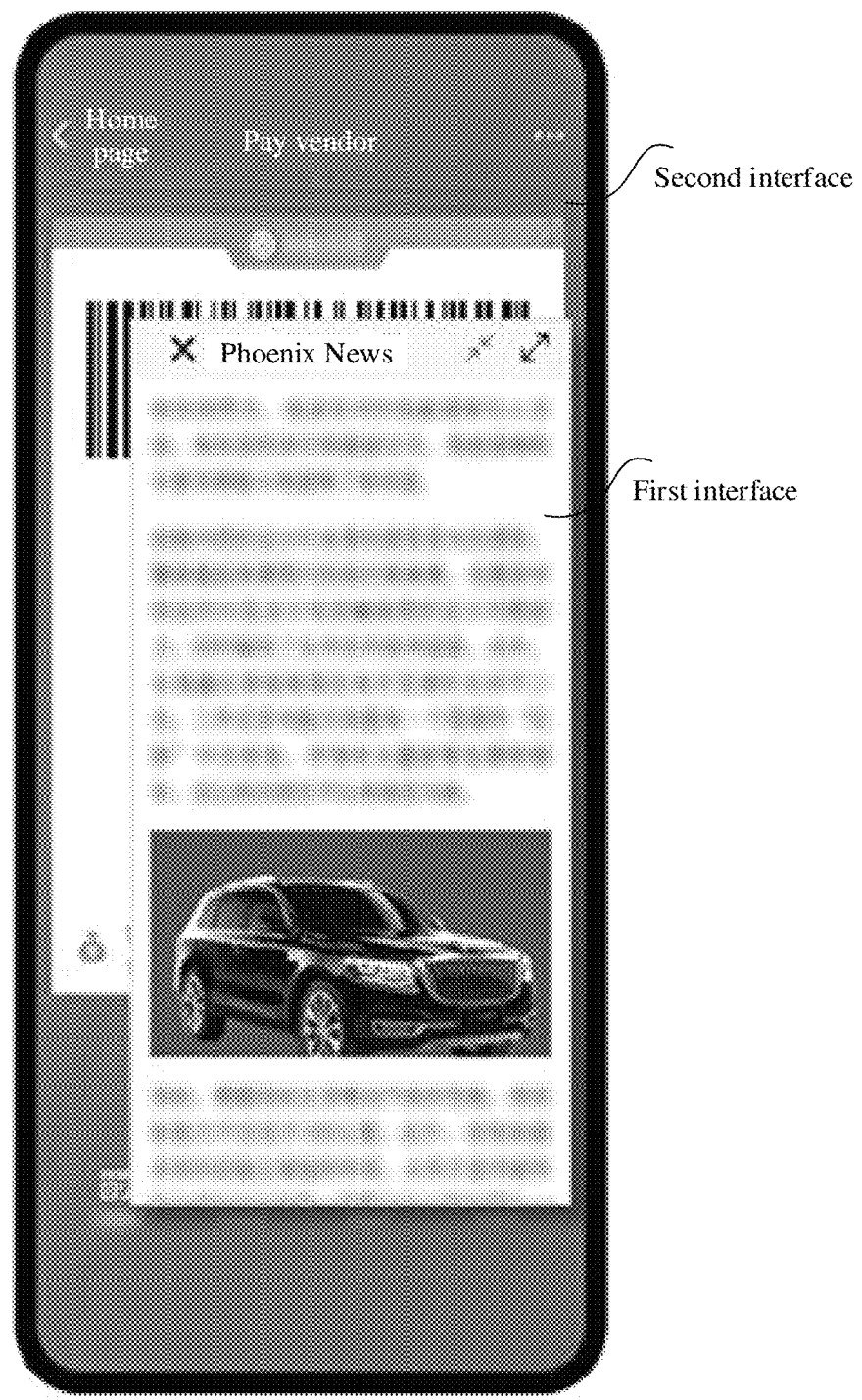

Refer to FIG. 9C. In response to an operation that is of enabling the second interface to exit a first state and that is initiated by the user, the electronic device may automatically display, in a floating window state, the first interface in the second interface displayed in full screen mode.

The operation of enabling the second interface to exit the first state may be an operation of enabling the second interface to exit a focus state, or may be an operation of enabling an edit box in the second interface to exit an input state. For details, refer to the foregoing descriptions. The details are not described herein again.

Figure 9D:
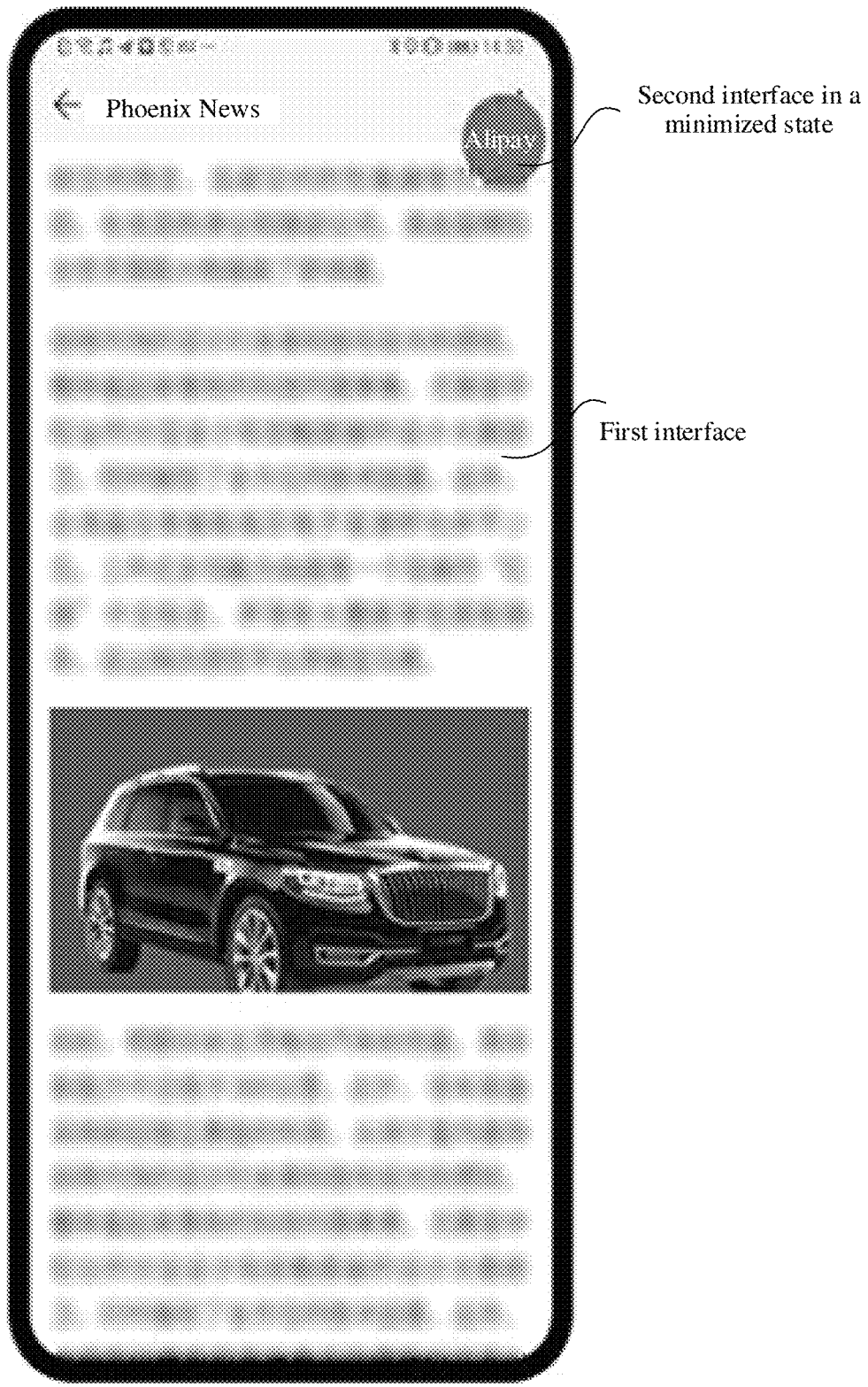

Refer to FIG. 9D. In response to an operation that is of maximizing the first interface (for example, tapping a maximization function option in the first interface displayed in the floating window state) and that is initiated by the user, the electronic device may automatically display the first interface in full screen mode, and display the second interface in a minimized state in the first interface displayed in full screen mode.

Figure 10A:
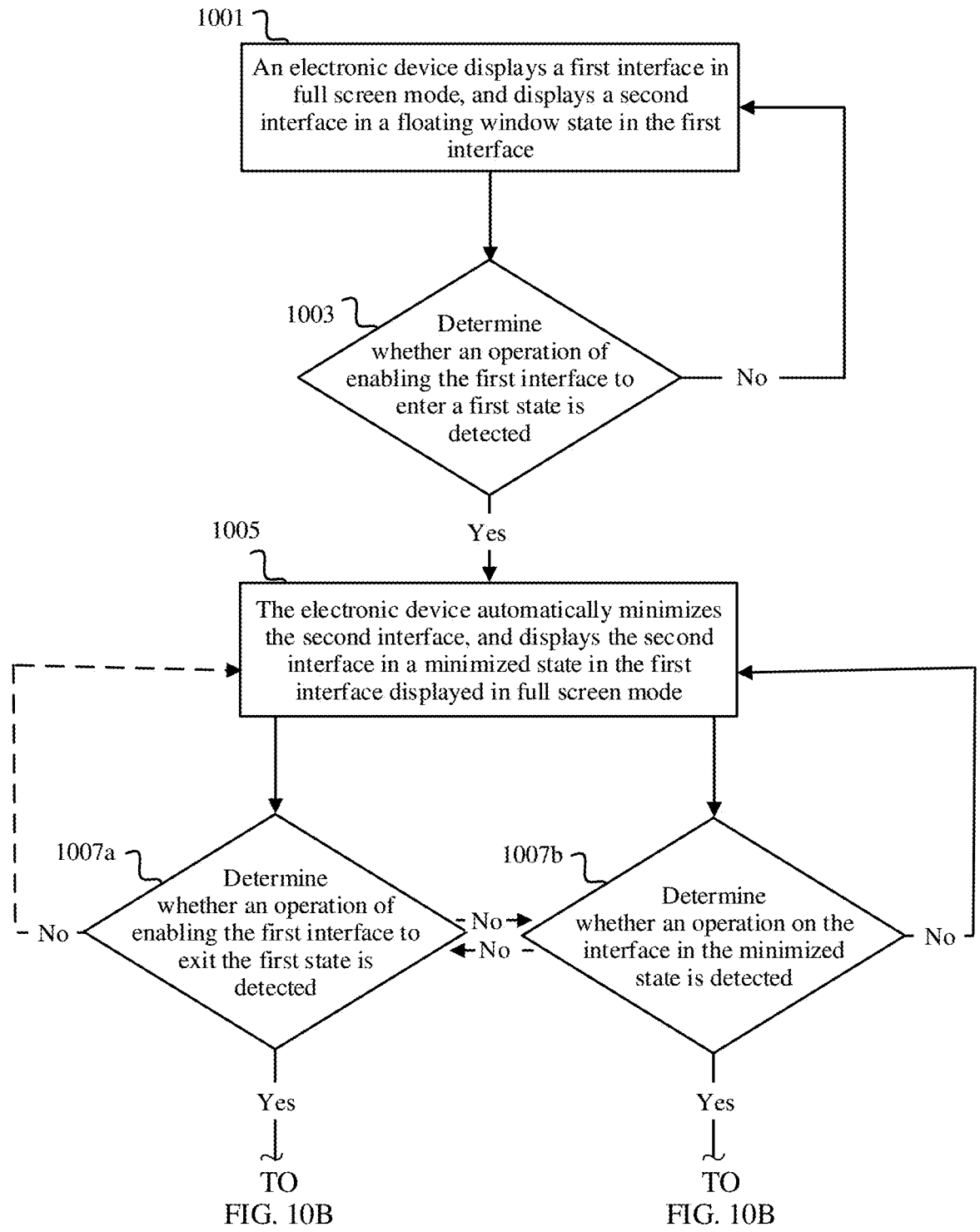
FIG. 10A and FIG. 10B are a flowchart of a screen display method according to some embodiments of this application.
Figure 10B:
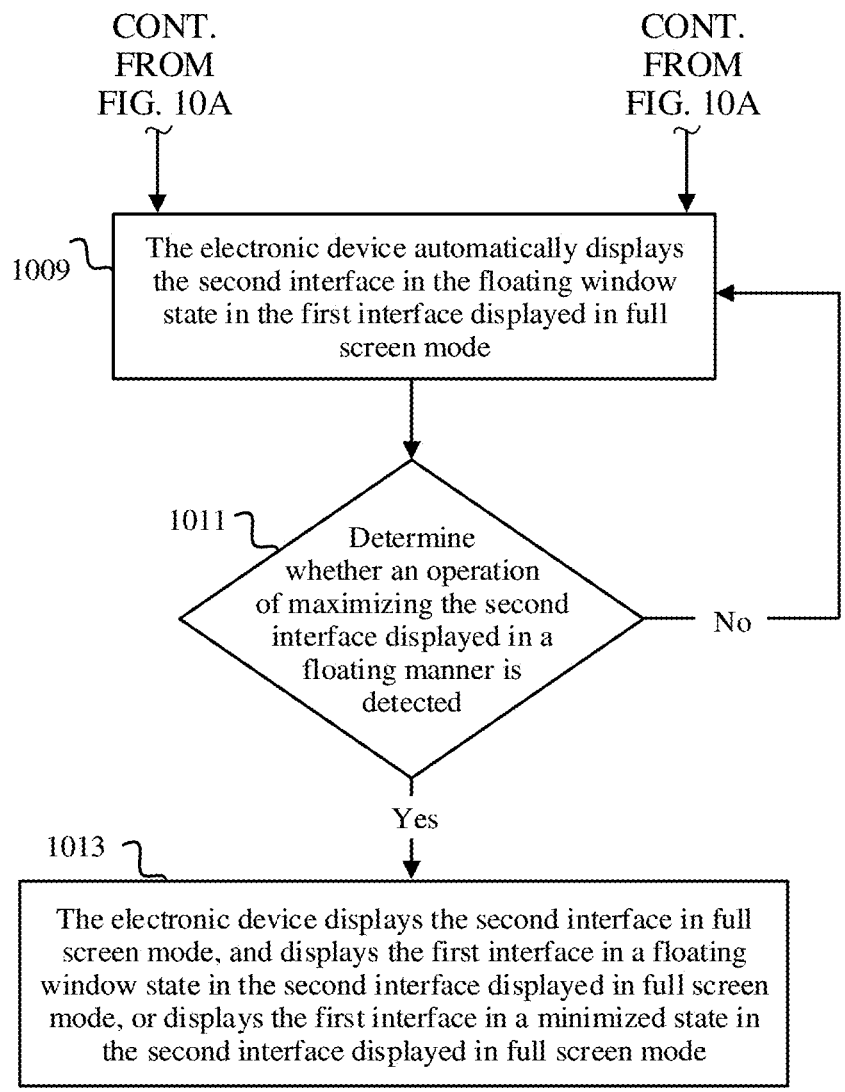

Refer to FIG. 10A and FIG. 10B. The following describes a screen display method according to an embodiment of this application. Refer to FIG. 10A and FIG. 10B. The method includes the following steps.

Step 1001: An electronic device displays a first interface in full screen mode, and displays a second interface in a floating window state in the first interface, where a size of the second interface displayed in the floating window state is less than a size of the first interface in a full-screen display state.

In an illustrative example, the first interface may be an application list interface, and the second interface may be a running interface of an application. For details, refer to the foregoing descriptions of the embodiment shown in FIG. 4.

In an illustrative example, the first interface may be a running interface of an application A, and the second interface may be a running interface of an application B. For details, refer to the foregoing descriptions of the embodiment shown in FIG. 3B, the embodiment shown in FIG. 5A, the embodiment shown in FIG. 6A, the embodiment shown in FIG. 7B, or the embodiment shown in FIG. 8A.

In an illustrative example, the first interface and the second interface may be two pages of a same application, and the first interface may be a previous-level page of the second interface. For details, refer to the foregoing descriptions of the embodiments shown in FIG. 7A and FIG. 7B.

For a manner in which the electronic device displays the first interface in full screen mode, refer to the foregoing descriptions of the embodiment shown in FIG. 3A.

For a manner in which the electronic device displays the second interface in the floating window state in the first interface displayed in full screen mode, refer to the foregoing descriptions of the embodiment shown in FIG. 3B.

Step 1003: Determine whether the electronic device detects an operation of enabling the first interface to enter a first state.

The first state of the first interface may be that the interface obtains a focus, or may be that any edit box in the interface enters an input state. For details, refer to the foregoing descriptions. Details are not described herein again.

If the operation of enabling the first interface to enter the first state is not detected in step 1003, the electronic device may continue to perform step 1001.

If the operation of enabling the first interface to enter the first state is detected in step 1003, the electronic device may perform step 1005: The electronic device automatically minimizes the second interface, and displays the second interface in a minimized state in the first interface displayed in full screen mode.

In an example, the second interface in the minimized state may be a floating ball. In an example, the second interface in the minimized state may alternatively be an application icon of an application to which the second interface belongs. In an example, the second interface in the minimized state may alternatively be an interface icon of the minimized second interface, and the interface icon may include feature information of the second interface. For example, the second interface is a WeChat dialog box, and the interface icon may include an avatar of a WeChat friend. In an example, if the second interface is a video playback interface, the second interface in the minimized state may be a minimized picture-in-picture interface, where a size of the minimized picture-in-picture interface is less than a size of the second interface displayed in the floating window state. The minimized picture-in-picture interface may be referred to as a video pop-up window.

In an illustrative example, if the first state of the first interface is specifically that any edit box in the first interface enters an input state, the second interface in the minimized state may be in a hidden state or a completely transparent state. For details, refer to the foregoing descriptions of FIG. 3C.

In an illustrative example, if the first state of the first interface is that any edit box in the first interface enters an input state, a display location of the second interface in the minimized state may be set based on a cursor location in the edit box that enters the input state. For details, refer to the foregoing descriptions.

In some embodiments, if the electronic device detects an operation of enabling the first interface to exit the first state, or detects an operation on the second interface in the minimized state, the electronic device may perform step 1009: The electronic device automatically displays the second interface in the floating window state in the first interface displayed in full screen mode.

The foregoing cases are described in detail below in different examples.

In an illustrative example, the screen display method provided in this embodiment of this application further includes step 1007a: Determine whether an operation of enabling the first interface to exit the first state is detected.

In an example, that the interface exits the first state may be that the interface loses a focus. For example, the first interface may lose a focus through a system-level back key. For details, refer to the foregoing descriptions.

In an example, that the interface exits the first state may be that an edit box originally in an input state in the interface exits the input state. For details, refer to the foregoing descriptions.

If the operation of enabling the first interface to exit the first state is not detected in step 1007a, the electronic device may continue to perform step 1005. If the operation of enabling the first interface to exit the first state is detected, the electronic device may perform step 1009.

It should be noted that when performing step 1007a, the electronic device may not stop performing step 1005.

In an illustrative example, the screen display method provided in this embodiment of this application further includes step 1007b: Determine whether an operation on the second interface in the minimized state is detected. The operation on the second interface in the minimized state may be an operation such as tapping, touching, or pressing initiated by the user in a screen area in which the second interface in the minimized state is displayed.

If the operation on the second interface in the minimized state is not detected in step 1007b, the electronic device may continue to perform step 1005. If the operation on the second interface in the minimized state is detected, the electronic device may perform step 1009.

It should be noted that when performing step 1007b, the electronic device does not stop performing step 1005.

In an illustrative example, the screen display method provided in this embodiment of this application further includes step 1007a: Determine whether an operation of enabling the first interface to exit the first state is detected.

If the operation of enabling the first interface to exit the first state is not detected in step 1007a, the electronic device may further perform step 1007b: Determine whether an operation on the second interface in the minimized state is detected. If the operation of enabling the first interface to exit the first state is detected in step 1007a, the electronic device may perform step 1009.

It should be noted that when performing step 1007a, the electronic device does not stop performing step 1005.

If the operation on the second interface in the minimized state is not detected in step 1007b, the electronic device may continue to perform step 1005. If the operation on the second interface in the minimized state is detected in step 1007b, the electronic device may perform step 1009.

It should be noted that when performing step 1007b, the electronic device does not stop performing step 1005.

In an illustrative example, the screen display method provided in this embodiment of this application further includes step 1007b: Determine whether an operation on the second interface in the minimized state is detected.

If the operation on the second interface in the minimized state is not detected in step 1007b, the electronic device may further perform step 1007a: Determine whether an operation of enabling the first interface to exit the first state is detected. If the operation on the interface is detected in step 1007b, the electronic device may perform step 1009.

It should be noted that when performing step 1007b, the electronic device does not stop performing step 1005.

If the operation of enabling the first interface to exit the first state is not detected in step 1007a, the electronic device may continue to perform step 1005. If the operation of enabling the first interface to exit the first state is detected in step 1007a, the electronic device may perform step 1009.

In some embodiments, when performing step 1009, the electronic device may further perform step 1011: Determine whether an operation of maximizing the second interface displayed in the floating window state is detected.

The operation of maximizing the second interface displayed in the floating window state may be specifically a two-finger stretch operation initiated by the user on the second interface, or may be an operation on a maximization function option in the second interface. Other examples are not enumerated one by one herein. The operation of maximizing the second interface displayed in the floating window state may be specifically an operation of enabling the edit box in the second interface to enter the input state. For details, refer to the foregoing descriptions of FIG. 8B and FIG. 8C.

If the operation of maximizing the second interface displayed in the floating window state is not detected in step 1011, the electronic device may continue to perform step 1009.

If the operation of maximizing the second interface displayed in the floating window state is detected in step 1011, the electronic device may perform step 1013: The electronic device displays the second interface in full screen mode, and displays the first interface in a floating window state in the second interface displayed in full screen mode, or displays the first interface in a minimized state in the second interface displayed in full screen mode.

For the first interface displayed in the floating window state, refer to the foregoing descriptions of the second interface displayed in the floating window state. For the first interface in the minimized state, refer to the foregoing descriptions of the second interface in the minimized state. Details are not described herein again.

According to the screen display method provided in this embodiment of this application, the electronic device may display the second interface in a floating window form in the first interface displayed in full screen mode. When detecting an operation on the first interface (the operation may enable the first interface to enter a first state), the electronic device may minimize the second interface displayed in the floating window form, to reduce impact on viewing or operating the first interface by the user. When the first interface exits the first state or the electronic device detects an operation on the second interface in the minimized state, the electronic device may display the second interface in the floating window form in the first interface again, so that the user quickly invokes the second interface.

An embodiment of this application provides another screen display method. Three or more interfaces may be displayed. For example, an interface of a news application, a chat window of an instant messaging application, and an interface of a payment application may be displayed. It may be specified that the interface of the news application is an interface displayed in full screen mode, and another interface is a floating window displayed in the interface of the news application. The electronic device may minimize the another interface in response to an operation performed on the interface of the news application, to reduce blocking of the interface of the news application by the another interface.

The method is described below in different embodiments with reference to different application scenarios.

In some embodiments, application of the screen display method provided the embodiments of this application to a scenario is described with reference to FIG. 11A, FIG. 11B, FIG. 11C, FIG. 11D, and FIG. 11E.

Figure 11A:
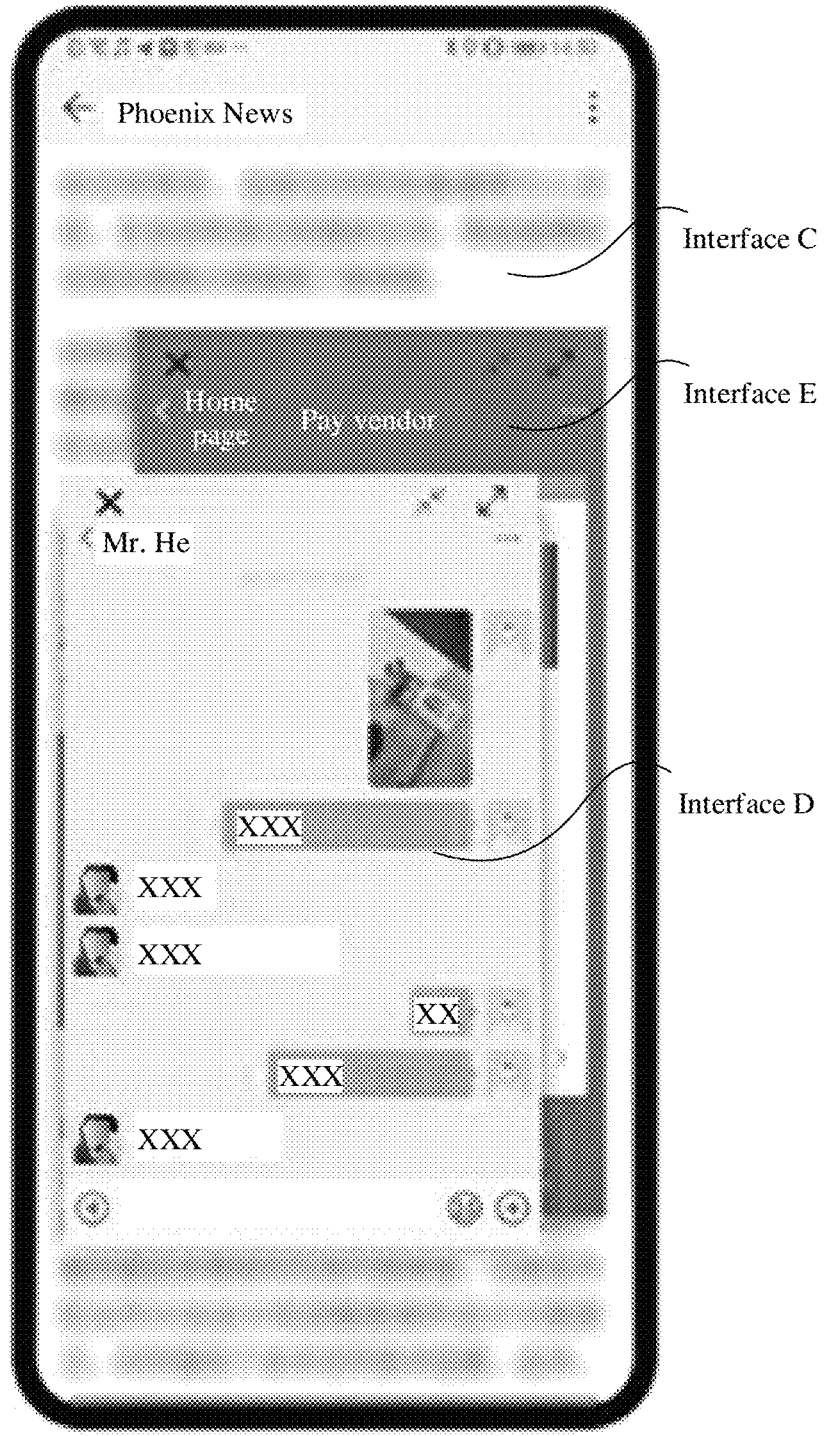
FIG. 11A, FIG. 11B, FIG. 11C, FIG. 11D, and FIG. 11E are diagrams of examples of screen display effects according to some embodiments of this application.

Refer to FIG. 11A. The electronic device may display an interface C in full screen mode, and display a plurality of interfaces in a floating window state in the interface C. The plurality of interfaces may include an interface D and an interface E.

The interface C may be a running interface of an application C or an application list interface, the interface D may be a running interface of an application D, and the interface E may be a running interface of an application E. The application C, the application D, and the application E are different applications.

In an illustrative example, as shown in FIG. nA, the interface C may be a running interface of Phoenix News, the interface D may be a running interface (a WeChat dialog box) of WeChat, and the interface E may be a payment interface (a payment code interface) of Alipay.

In an illustrative example, the electronic device may display the interface C in full screen mode, and display the interface E in a floating window state in the interface C displayed in full screen mode. For a specific implementation, refer to the foregoing described implementation of displaying the second interface in the floating window state in the first interface displayed in full screen mode.

When the electronic device may display the interface C in full screen mode, and display the interface E in the floating window state in the interface C displayed in full screen mode, the electronic device may display the interface D in a floating window state in response to a voice that is initiated by the user and that is used to open the application D. For example, when the electronic device displays the running interface of Phoenix News in full screen mode, and displays the payment code interface of Alipay in a floating window state in the running interface, the user may say a voice "see the WeChat message" when learning that a new WeChat message is received (for example, learning, through an alert sound or vibration obtained when the new WeChat message is received, that the new WeChat message is received). In response to the voice, the electronic device displays, in a floating window state, a WeChat dialog box in which the new message is located. In this way, an interface shown in FIG. nA is implemented.

For the interface D and the interface E that are displayed in the floating window state, refer to the foregoing descriptions of the second interface displayed in the floating window state. Details are not described herein again.

Figure 11B:
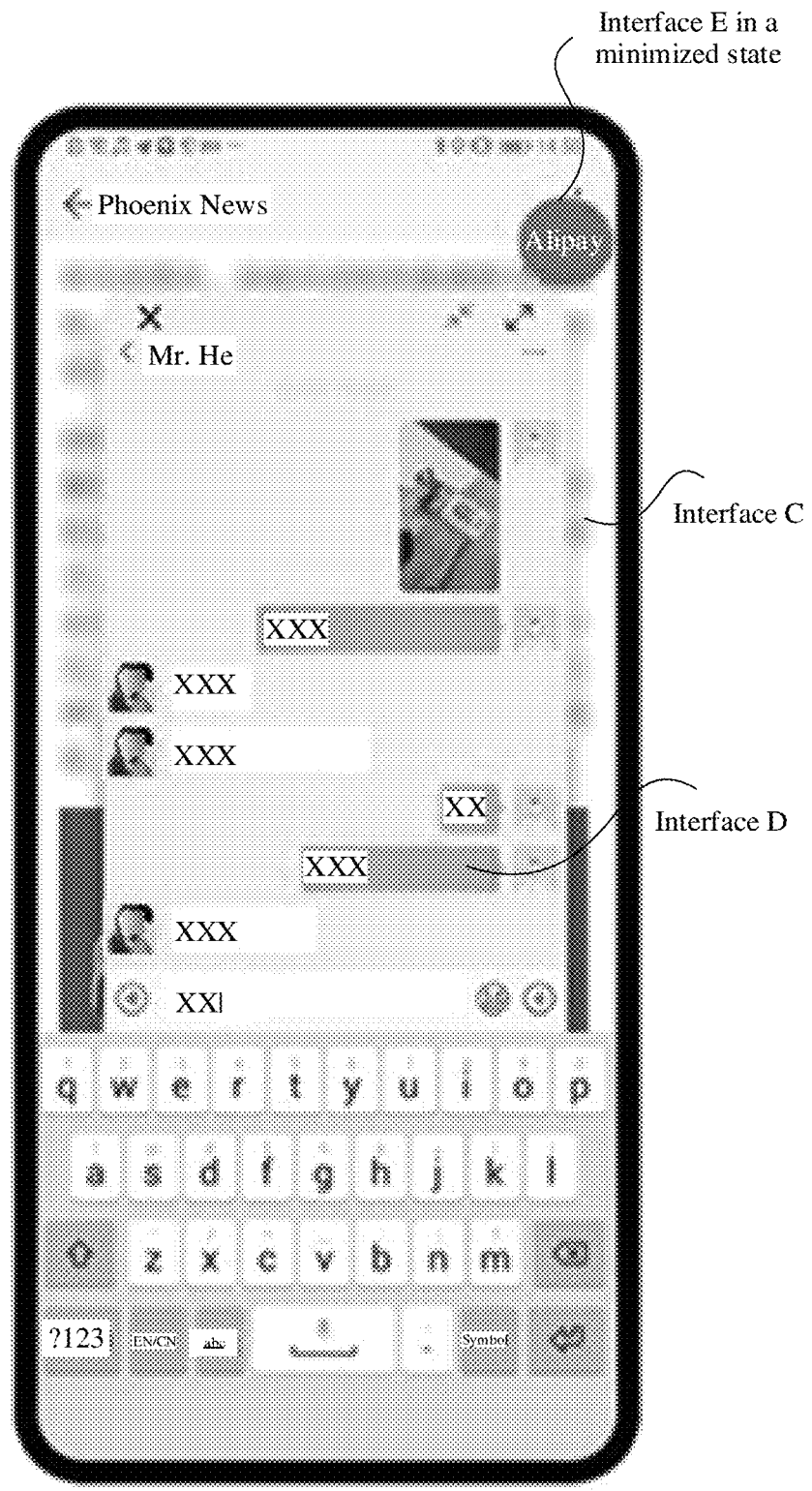

Refer to FIG. 11B. In response to an operation of enabling the interface D to enter a second state, the electronic device may automatically minimize an interface other than the interface D in the plurality of interfaces displayed in the floating window state. The interface E is changed to the interface E in a minimized state, the interface C is still displayed in full screen mode, and the interface D is still displayed in the floating window state.

The second state may be a focus obtaining state. The operation of enabling the interface D to enter the focus obtaining state may be an operation initiated by the user on the interface D, for example, an operation such as tapping or touching of enabling the interface D to obtain a focus. For details, refer to the foregoing descriptions that the first interface obtains the focus.

The interface D may include at least one edit box. The second state of the interface D may be specifically an input state of any first edit box in the at least one edit box. For details, refer to the foregoing descriptions that the edit box in the first interface enters the input state.

More specifically, as shown in FIG. 11B, the interface D is a WeChat dialog box, and the interface E is a payment code interface of Alipay. The user may tap an edit box in the WeChat dialog box, so that the edit box enters an input state. That the edit box enters the input state may be that the WeChat dialog box enters the second state. The electronic device may change the payment code interface to the interface E in the minimized state in response to an operation that is of tapping the edit box and that is initiated by the user.

For a form, a display manner, a display location, and the like of the interface E in the minimized state, refer to the foregoing descriptions of the second interface in the minimized state. Details are not described herein again.

Figure 11C:
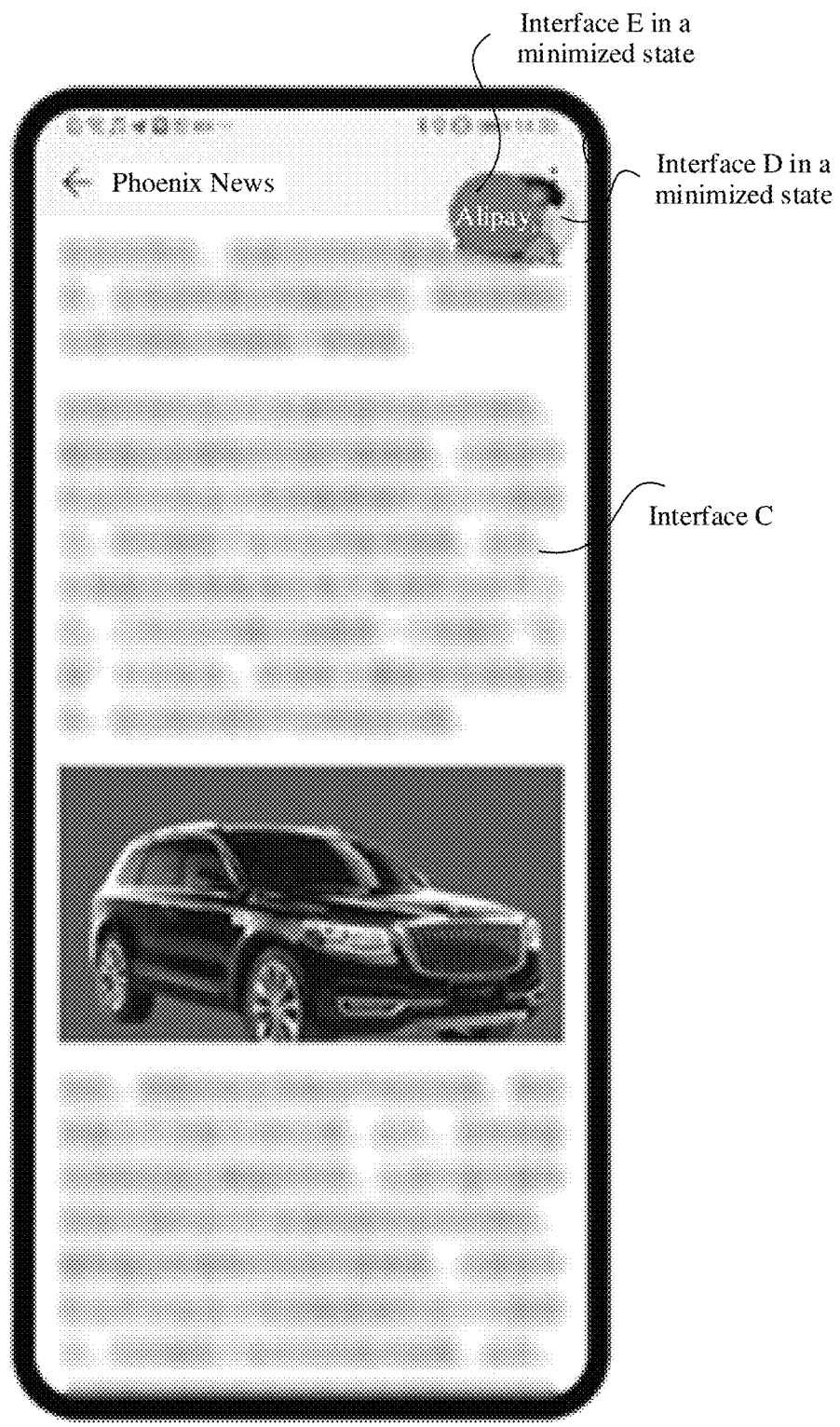

Refer to FIG. 11C. In response to an operation of enabling the interface C to enter a first state, the electronic device may automatically minimize the interface D displayed in the floating window state to the interface D in a minimized state. The minimized interface still remains in the minimized state. For example, as shown in FIG. 11C, the interface E still remains in the minimized state, that is, the electronic device keeps displaying the interface E in the minimized state.

For a form, a display manner, a display location, and the like of the interface D in the minimized state, refer to the foregoing descriptions of the second interface in the minimized state. Details are not described herein again.

In an illustrative example, as shown in FIG. 11C, the interface D in the minimized state and the interface E in the minimized state may partially overlap, so that while the user can conveniently operate the interface D in the minimized state and the interface E in the minimized state, screen space occupied by the interface D in the minimized state and the interface E in the minimized state is reduced, and impact on the interface C displayed in full screen mode is reduced.

The first state of the interface C may be a state in which the interface C obtains a focus, or may be an input state of any edit box in the interface C. For details, refer to the foregoing descriptions of the first state of the first interface. The details are not described herein again.

Figure 11D:
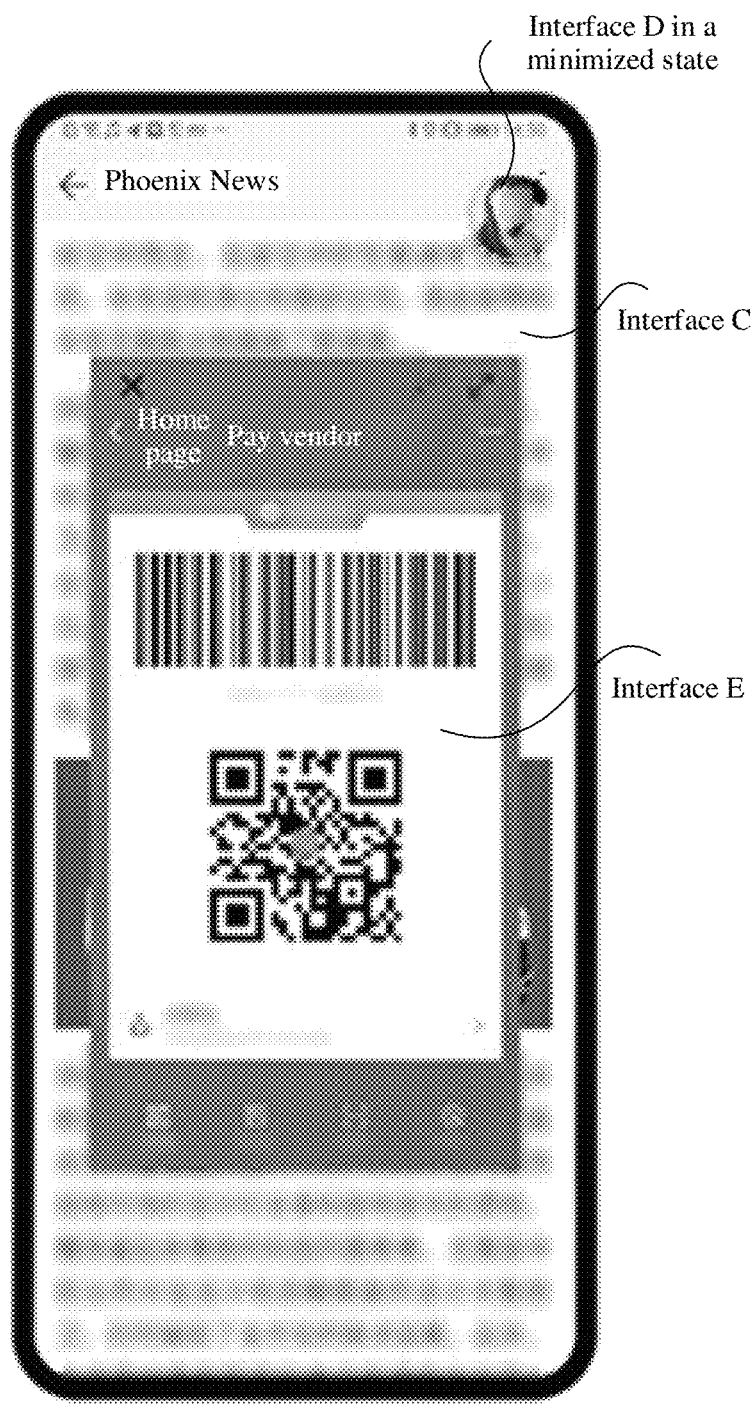

Refer to FIG. 11D. In response to an operation on the interface E in the minimized state, the electronic device may display the interface E in a floating state in the interface C displayed in full screen mode. The minimized interface still remains in the minimized state. For example, as shown in FIG. 11D, the interface D still remains in the minimized state, that is, the electronic device keeps displaying the interface D in the minimized state.

For a specific operation on the interface E in the minimized state, refer to the foregoing descriptions of the operation on the second interface in the minimized state. Details are not described herein again. For a manner of displaying the interface E in the floating state in the interface C displayed in full screen mode, refer to the foregoing descriptions of displaying the second interface in the floating state in the first interface displayed in full screen mode. Details are not described herein again.

Figure 11E:

Refer to FIG. 11E. In response to an operation of maximizing the interface E, the electronic device may display the interface E in full screen mode, and automatically change the interface C to the interface C in a minimized state. The interface in the minimized state still remains in the minimized state. For example, as shown in FIG. 11E, the interface D still remains in the minimized state, that is, the electronic device keeps displaying the interface D in the minimized state.

In these embodiments, the electronic device may display the plurality of interfaces in the floating window state in the interface displayed in full screen mode. When the interface displayed in full screen mode obtains a focus or an edit box in the interface displayed in full screen mode enters an input state, the electronic device may automatically minimize the interfaces displayed in the floating window state, so that the user can conveniently view or operate the interface C displayed in full screen mode. When any interface in the interfaces displayed in the floating window state obtains a focus or an edit box in the any interface enters an input state, the electronic device may automatically minimize another interface displayed in the floating window state, so that the user can conveniently view or operate the interface that obtains the focus or in which the edit box enters the input state.

In some embodiments, application of the screen display method provided in embodiments of this application to another scenario is described with reference to FIG. 12A, FIG. 12B, FIG. 12C, and FIG. 12D.

Figure 12A:
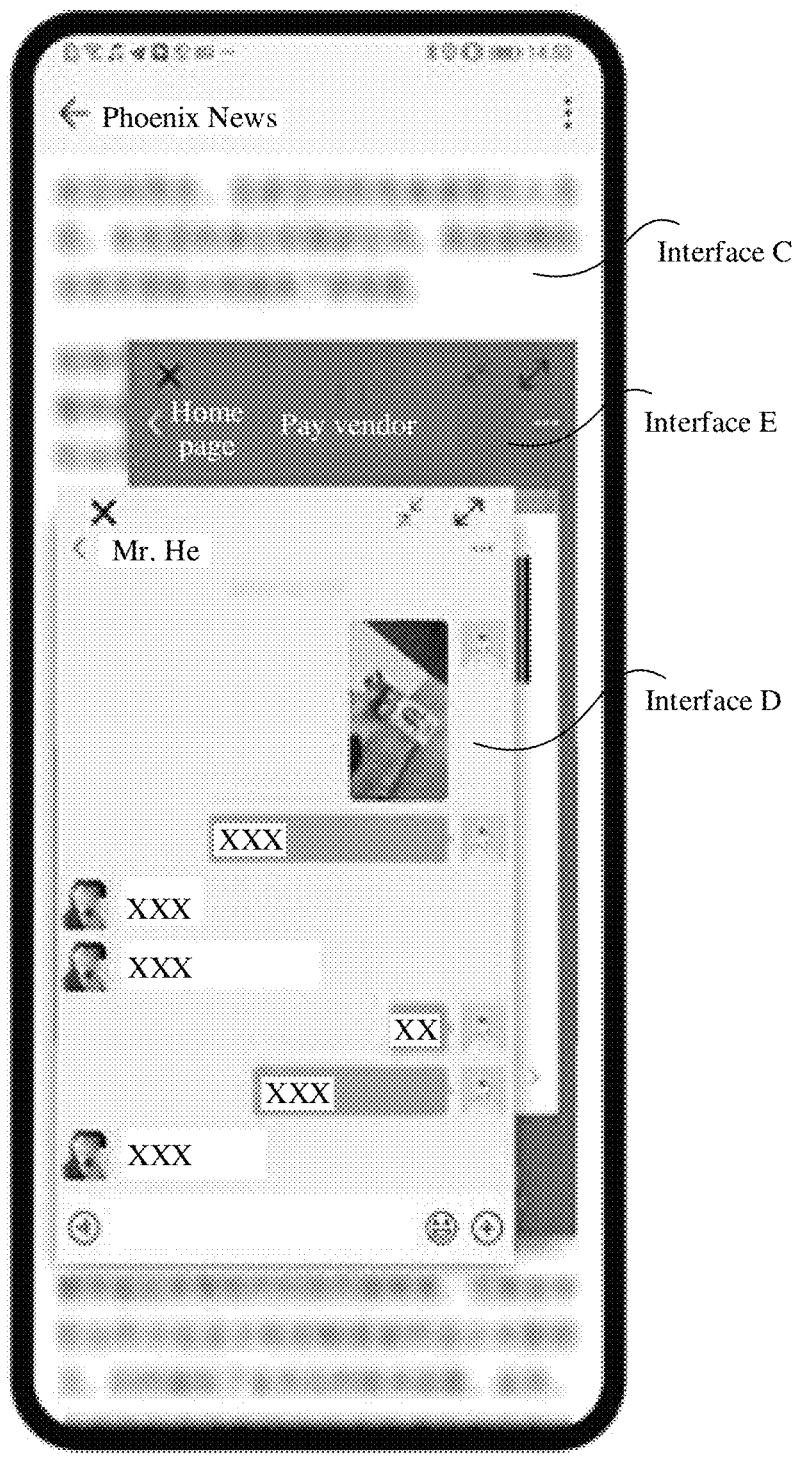
FIG. 12A, FIG. 12B, FIG. 12C, and FIG. 12D are diagrams of examples of screen display effects according to some embodiments of this application.

Refer to FIG. 12A. The electronic device may display an interface C in full screen mode, and display a plurality of interfaces in a floating window state in the interface C, where the interfaces include an interface D and an interface E. For details, refer to the foregoing descriptions of FIG. 11A. The details are not described herein again.

The interface D may include at least one edit box. For example, as shown in FIG. 12A, the interface D is a WeChat dialog box, and includes an edit box used to enter and edit a WeChat message.

Figure 12B:
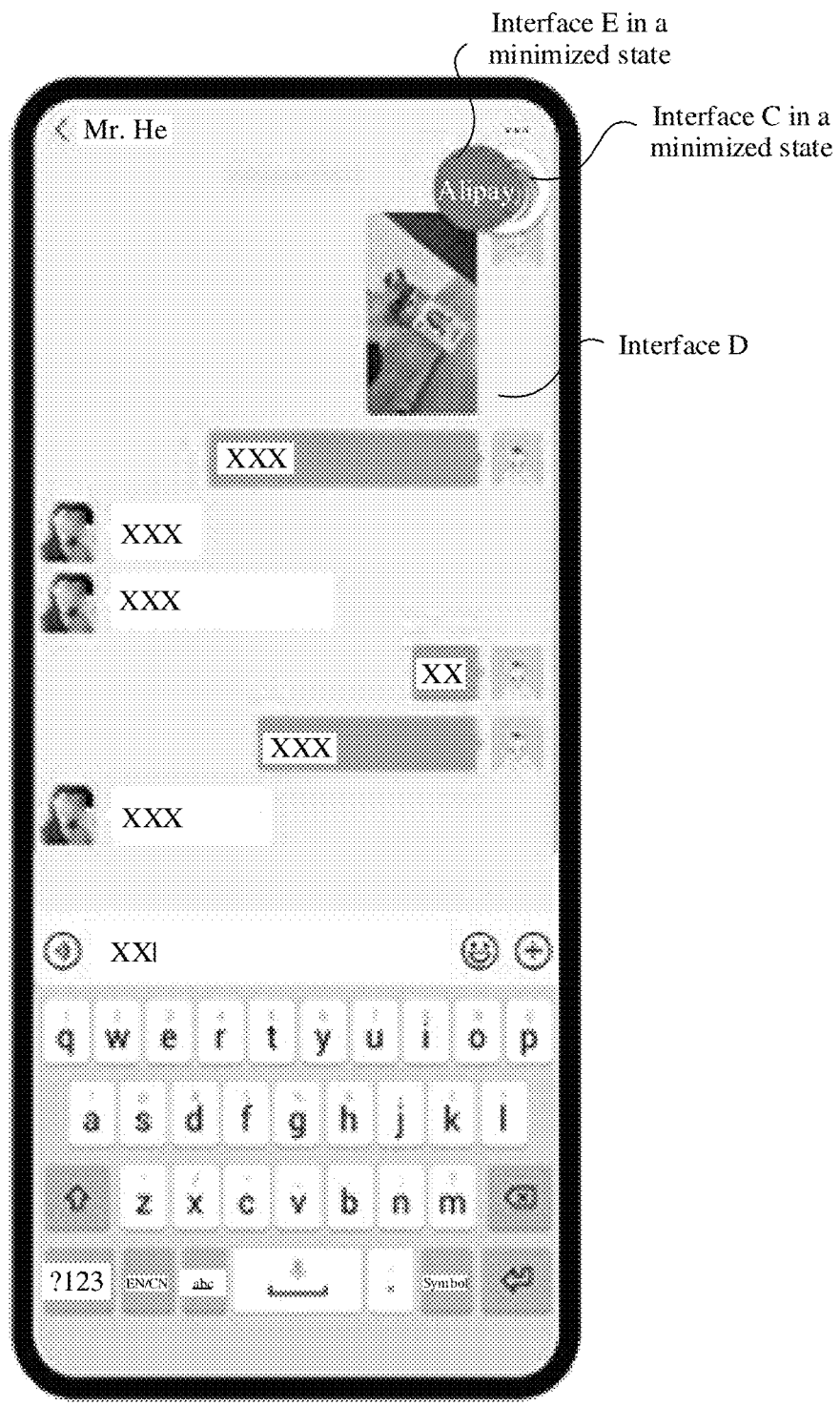

Refer to FIG. 12B. In response to an operation of enabling any edit box in the interface D to enter an input state, the electronic device may display the interface D in full screen mode, automatically minimize the interface C to the interface C in a minimized state, and automatically minimize each of the plurality of interfaces displayed in the floating window state to an interface in a minimized state, for example, minimize the interface E to the interface E in the minimized state.

The electronic device may display a virtual keyboard in response to the operation of enabling the any edit box in the interface D to enter the input state, to facilitate user input.

Specifically, as shown in FIG. 12B, the interface D may be a WeChat dialog box. The user may tap an edit box in the WeChat dialog box, so that the edit box enters an input state, and a virtual keyboard is displayed, to enter a WeChat message. In response to an operation initiated by the user, the electronic device may automatically minimize the interface C displayed in full screen mode and the interface E displayed in the floating window state to the interface C in a minimized state and the interface E in a minimized state, respectively, to facilitate a conversation between the user and a WeChat friend.

Figure 12C:
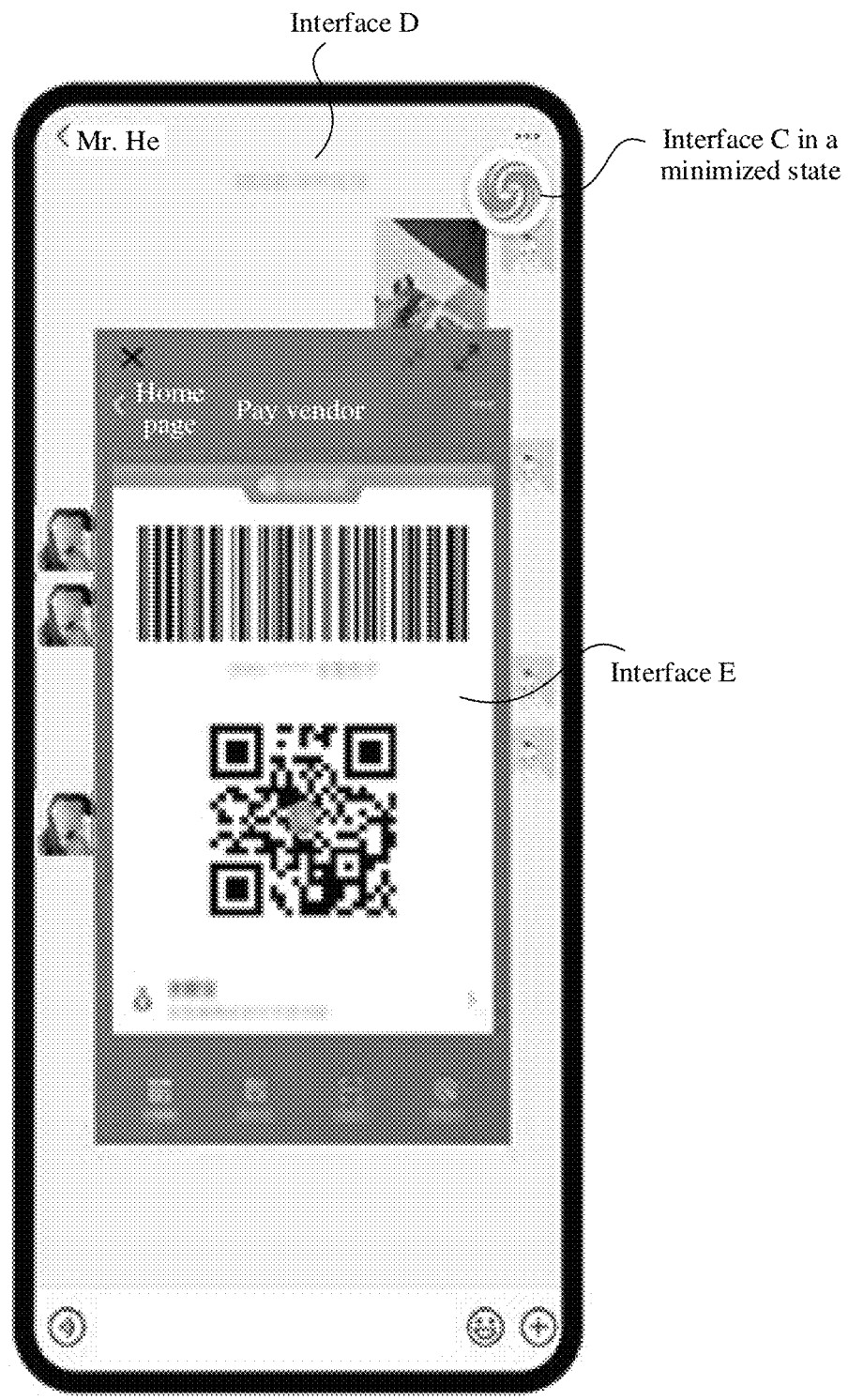

Refer to FIG. 12C. In response to an operation on the interface E in the minimized state, the electronic device may display the interface E in the floating window state in the interface D displayed in full screen mode. The another interface in the minimized state still remains in the minimized state. For example, as shown in FIG. 12C, the interface C still remains in the minimized state, that is, the electronic device keeps displaying the interface C in the minimized state.

For a specific operation on the interface E in the minimized state, refer to the foregoing descriptions of the operation on the second interface in the minimized state. Details are not described herein again. For a manner of displaying the interface E in the floating window state in the interface D displayed in full screen mode, refer to the foregoing descriptions of displaying the second interface in the floating window state in the first interface displayed in full screen mode. Details are not described herein again.

Still refer to FIG. 12C. In response to the operation on the interface E in the minimized state, the interface D loses a focus. Therefore, the edit box exits the input state, and the virtual keyboard is hidden.

Figure 12D:
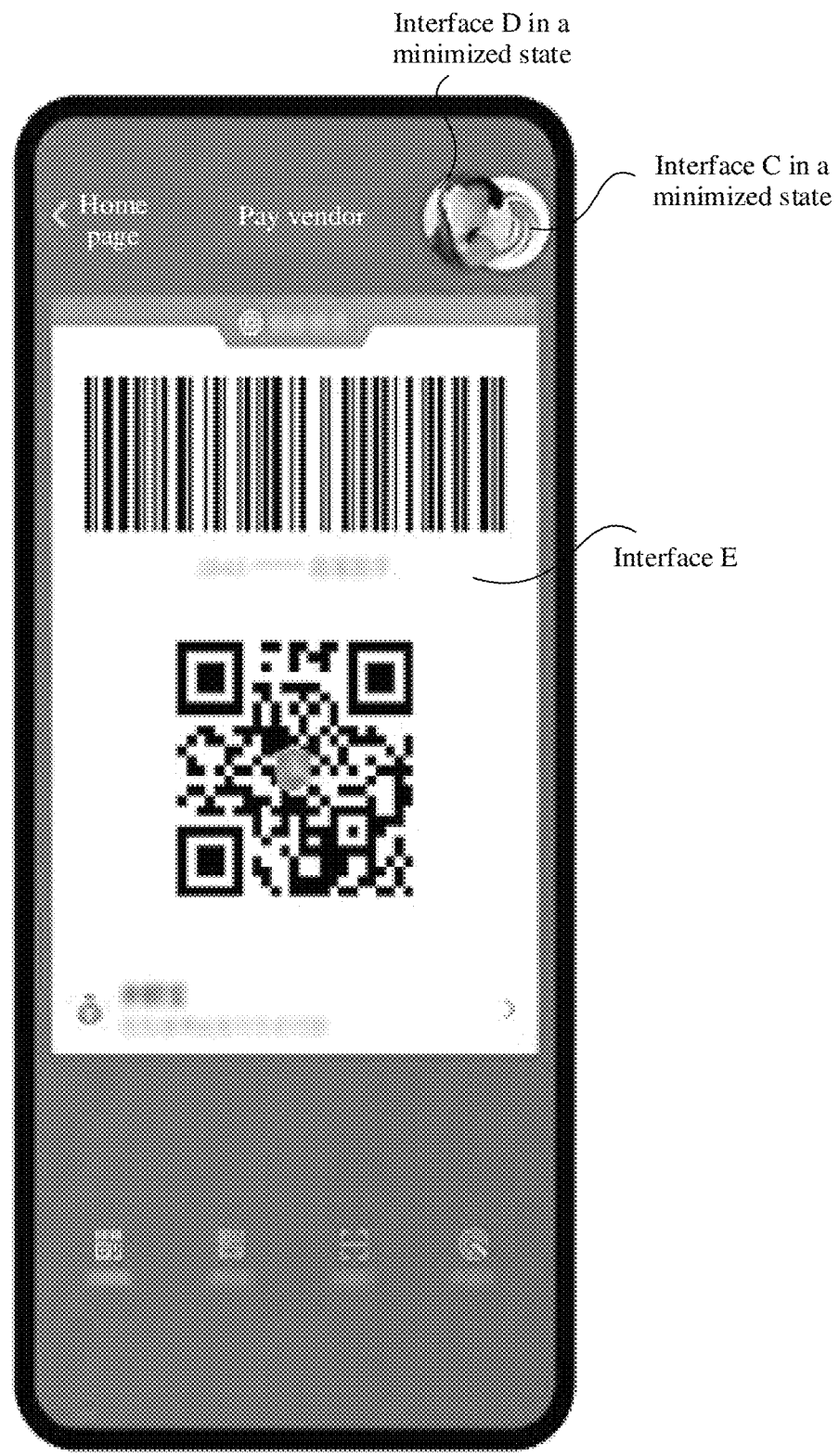

Refer to FIG. 12D. In response to an operation of maximizing the interface E, the electronic device may display the interface E in full screen mode, and automatically minimize the interface D to the interface D in a minimized state. The another interface in the minimized state still remains in the minimized state. For example, as shown in FIG. 12D, the interface C still remains in the minimized state, that is, the electronic device keeps displaying the interface C in the minimized state.

In these embodiments, the electronic device may display the plurality of interfaces in the floating window state in the interface displayed in full screen mode. When an edit box in any interface in the plurality of interfaces displayed in the floating window state enters an input state, the electronic device may automatically display the any interface in full screen mode, to facilitate user input. When any interface in the plurality of interfaces displayed in the floating window state obtains a focus (the obtaining a focus does not include that an edit box in the any interface enters an input state), the any interface is still displayed in the floating window state, and the another interface displayed in the floating window state is automatically minimized.

In some embodiments, application of the screen display method provided in embodiments of this application to still another scenario is described with reference to FIG. 13A, FIG. 13B, FIG. 13C, and FIG. 13D.

Figure 13A:
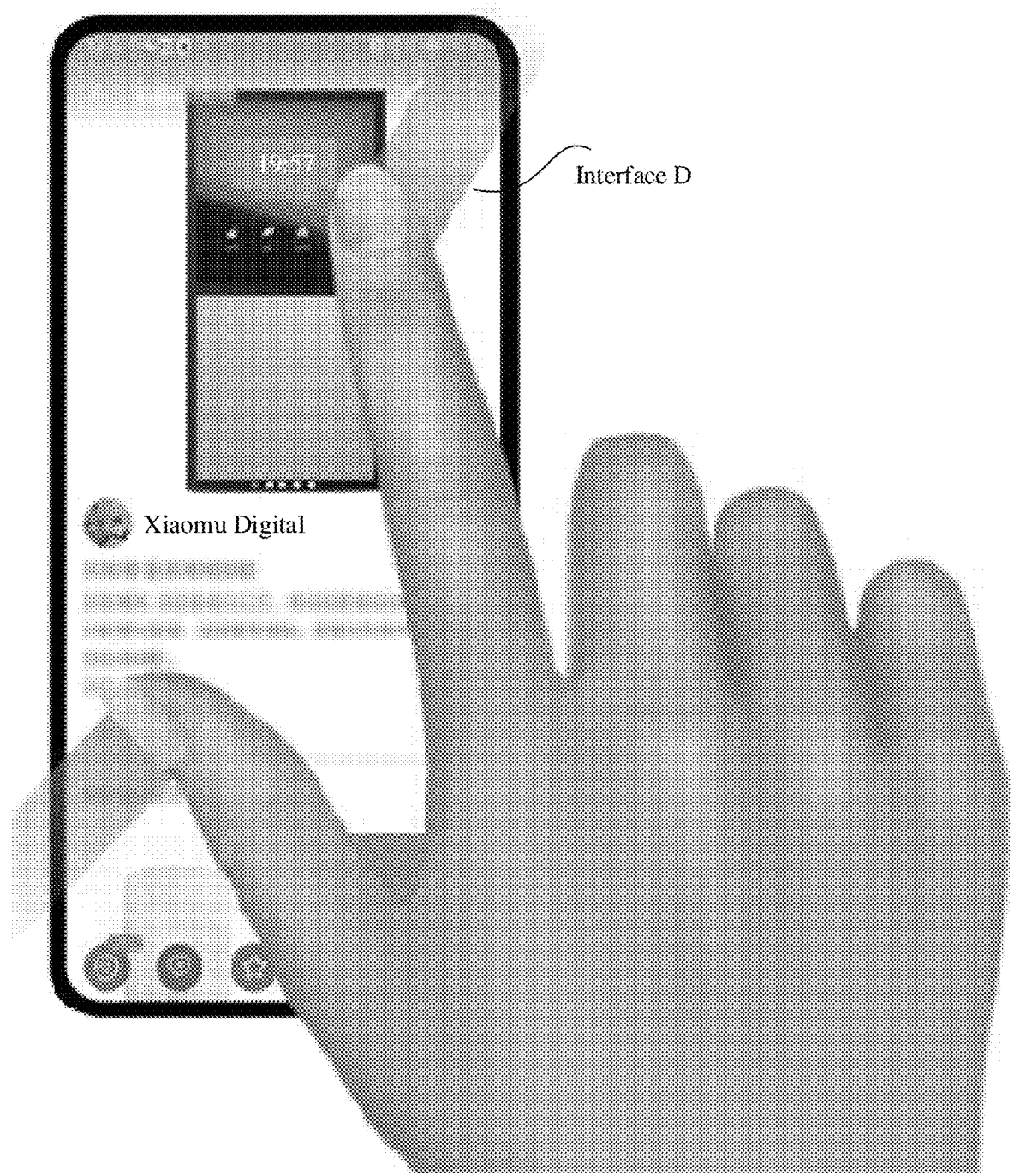
FIG. 13A, FIG. 13B, FIG. 13C, and FIG. 13D are diagrams of examples of screen display effects according to some embodiments of this application.
Figure 13B:
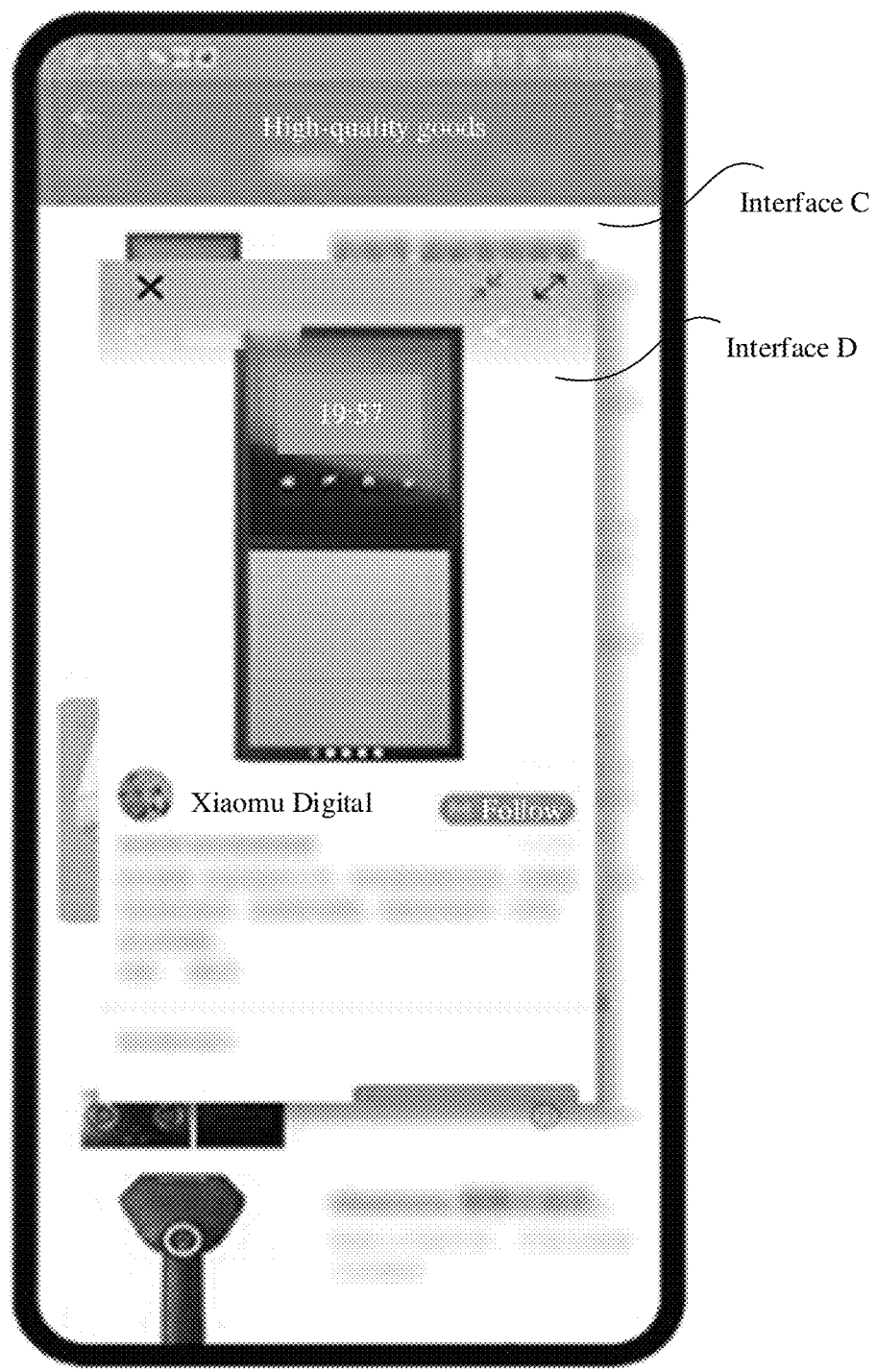

Refer to FIG. 13A and FIG. 13B. In response to an operation of enabling an interface D currently displayed in full screen mode to be displayed in a floating manner, the electronic device may display an interface C in full screen mode, and display the interface D in a floating window state in the interface C displayed in full screen mode.

In an illustrative example, the interface C may be a previous-level interface of the interface D, that is, the interface D and the interface C are different interfaces of a same application, and the interface D is a next-level interface of the interface C. For details, refer to the foregoing descriptions of FIG. 7A and FIG. 7B. The details are not described herein again.

In an illustrative example, the interface C may be an application list interface. For details, refer to the foregoing descriptions of FIG. 4. The details are not described herein again.

For the operation of enabling the interface D currently displayed in full screen mode to be displayed in the floating manner, refer to the foregoing descriptions of FIG. 4, FIG. 7A, and FIG. 7B. Details are not described herein again.

In an illustrative example, as shown in FIG. 13A and FIG. 13B, the interface D may be a running interface of Taobao, the interface C is also a running interface of Taobao, and the interface C is a previous-level interface of the interface D.

Figure 13C:
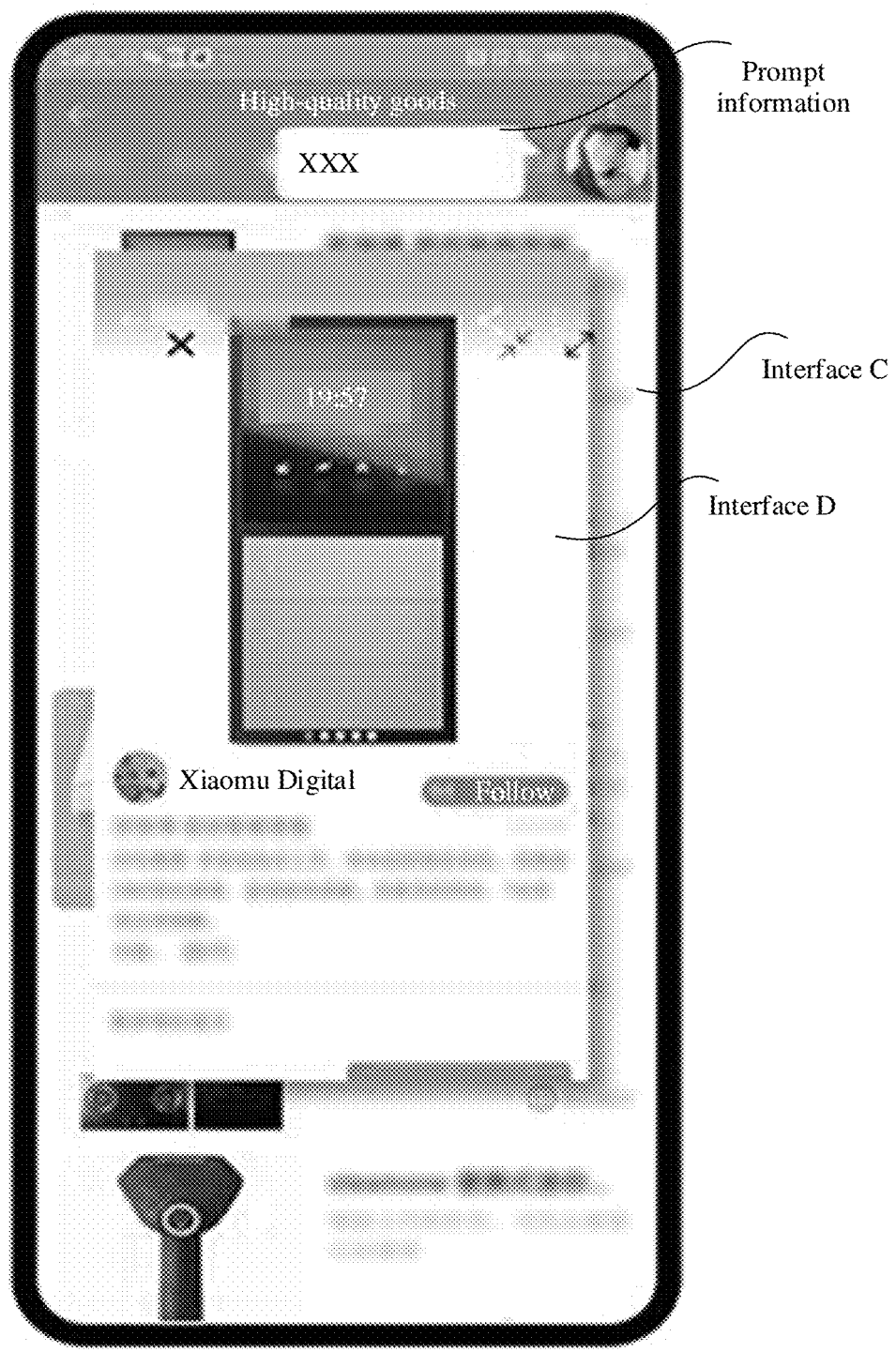

Refer to FIG. 13C. When receiving a new message from an instant messaging application or a Messages application, the electronic device may display prompt information of the new message. For example, as shown in FIG. 13C, when receiving a new WeChat message from a WeChat application, the electronic device may display prompt information of the new message. The prompt information may include all or a part of content of the new message, and may further include an avatar of a WeChat friend.

Figure 13D:
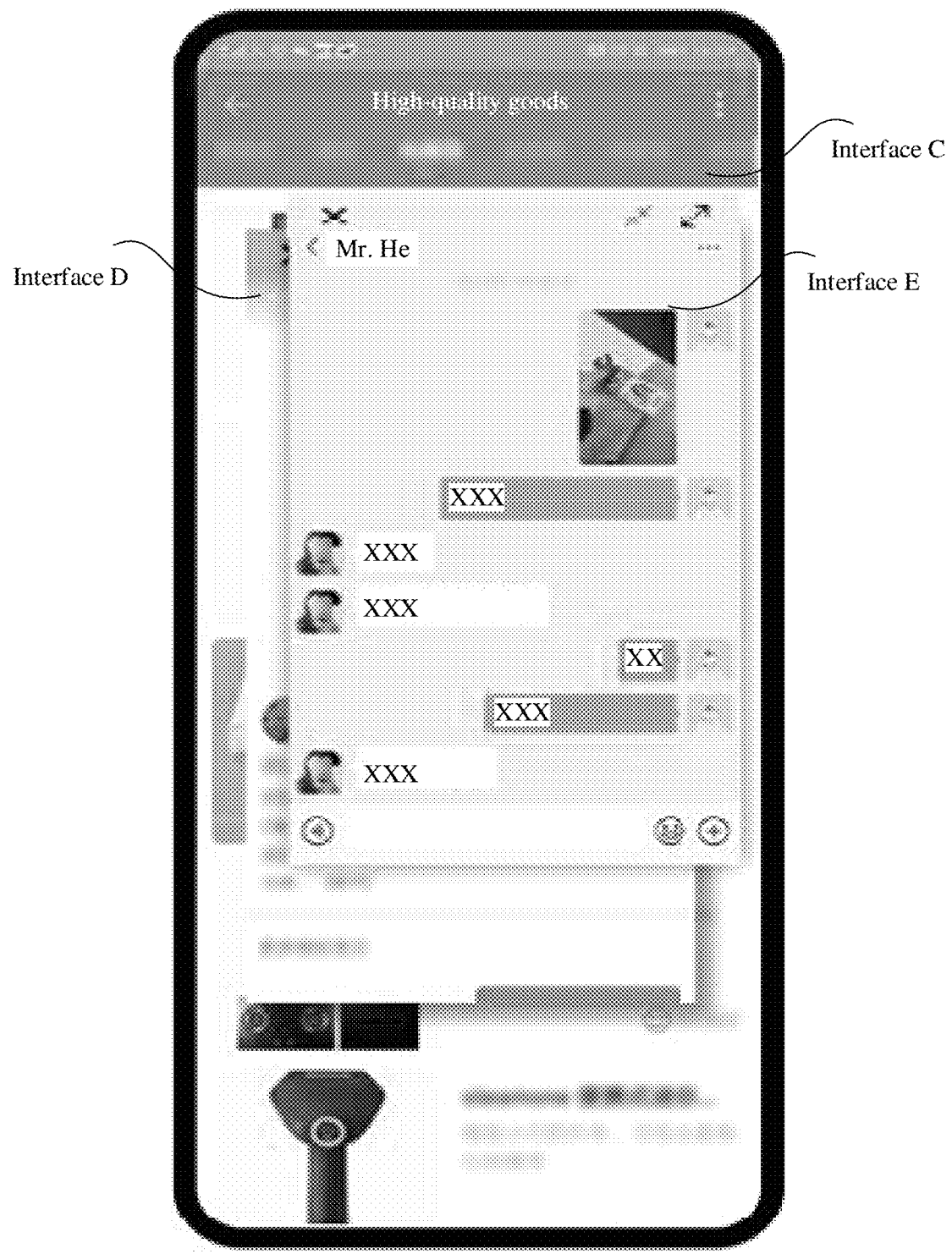

Refer to FIG. 13C and FIG. 13D. In response to an operation on the prompt information, the electronic device may display, in a floating window state, a dialog box corresponding to the new message, that is, an interface E. For example, as shown in FIG. 13C and FIG. 13D, the new message may be a new WeChat message, and the interface E may be a WeChat dialog box in which the new WeChat message is located.

It is easily understood that when the operation on the prompt information is performed, the interface E displayed in the floating window state can obtain a focus, and an edit box in the interface E does not enter an input state. In this case, the interface D still remains in a floating state. To be specific, in these embodiments, the electronic device may display a plurality of interfaces (the interface D, the interface E, and the like) in the floating window state in the interface C displayed in full screen mode. When any interface, for example, the interface E, displayed in a floating window state obtains a focus, and an edit box in the any interface does not enter an input state, a plurality of other interfaces displayed in the floating window state are still displayed in the floating window state.

In these embodiments, in response to the operation that is of enabling the interface D currently displayed in full screen mode to be displayed in the floating manner and that is initiated by the user, the electronic device may display the previous-level interface of the interface D in full screen mode (for example, a previous-level interface of a same application or an application list interface), and display the interface D in the floating window state in the interface displayed in full screen mode, so that the user switches between the interface D and the previous-level interface of the interface D, to improve user experience.

Figure 14A:
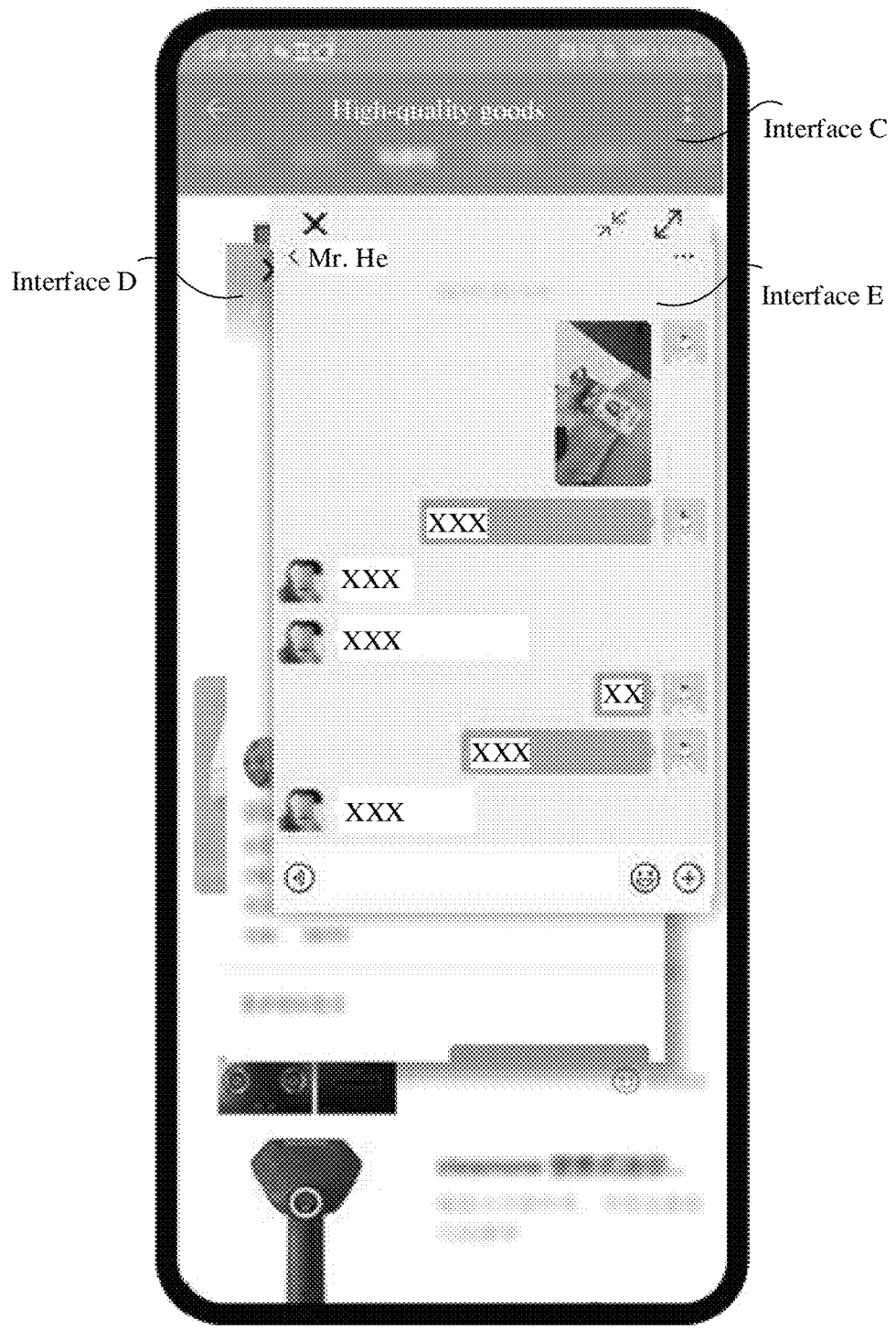
FIG. 14A and FIG. 14B are diagrams of examples of screen display effects according to some embodiments of this application.
Figure 14B:
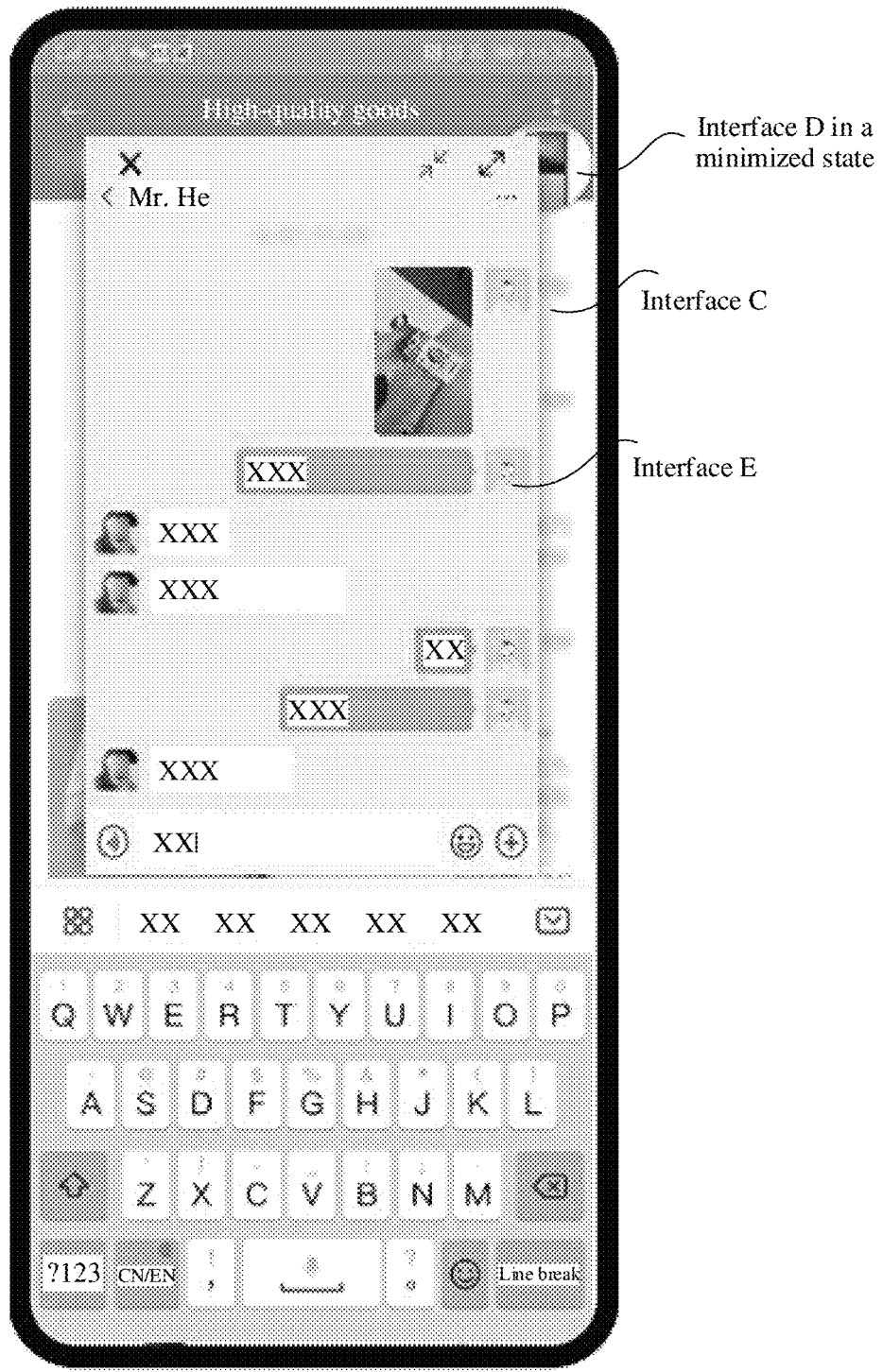

In some embodiments, with reference to FIG. 14A and FIG. 14B, an implementation of the screen display method provided in embodiments of this application is described.

Refer to FIG. 14A. The electronic device may display an interface C in full screen mode, and display a plurality of interfaces in a floating window state in the interface C displayed in full screen mode. The plurality of interfaces include an interface D and an interface E.

The interface C may be an application list interface or a running interface of an application C. The interface D may be a running interface of an application D, and the interface E may be a running interface of an application E. The interface E may include at least one edit box.

In an illustrative example, the application C and the application D may be a same application, and the interface C and the interface D may be different interfaces of the same application. The interface C may be a previous-level interface of the interface D.

Refer to FIG. 14B. The electronic device may automatically minimize an interface other than the interface E in the plurality of interfaces in response to an operation of enabling an edit box in the interface E to enter an input state (for example, tapping or touching the edit box). For example, as shown in FIG. 14B, the electronic device may automatically minimize the interface D to the interface D in a minimized state. The interface C still remains in a full-screen display state. That the edit box in the interface E enters the input state may be that the interface E enters a second state.

In these embodiments, when an edit box in any interface in the plurality of interfaces displayed in the floating window state enters an input state, the electronic device may automatically minimize an interface other than the interface in which the edit box enters the input state in the plurality of interfaces.

Figure 15A:
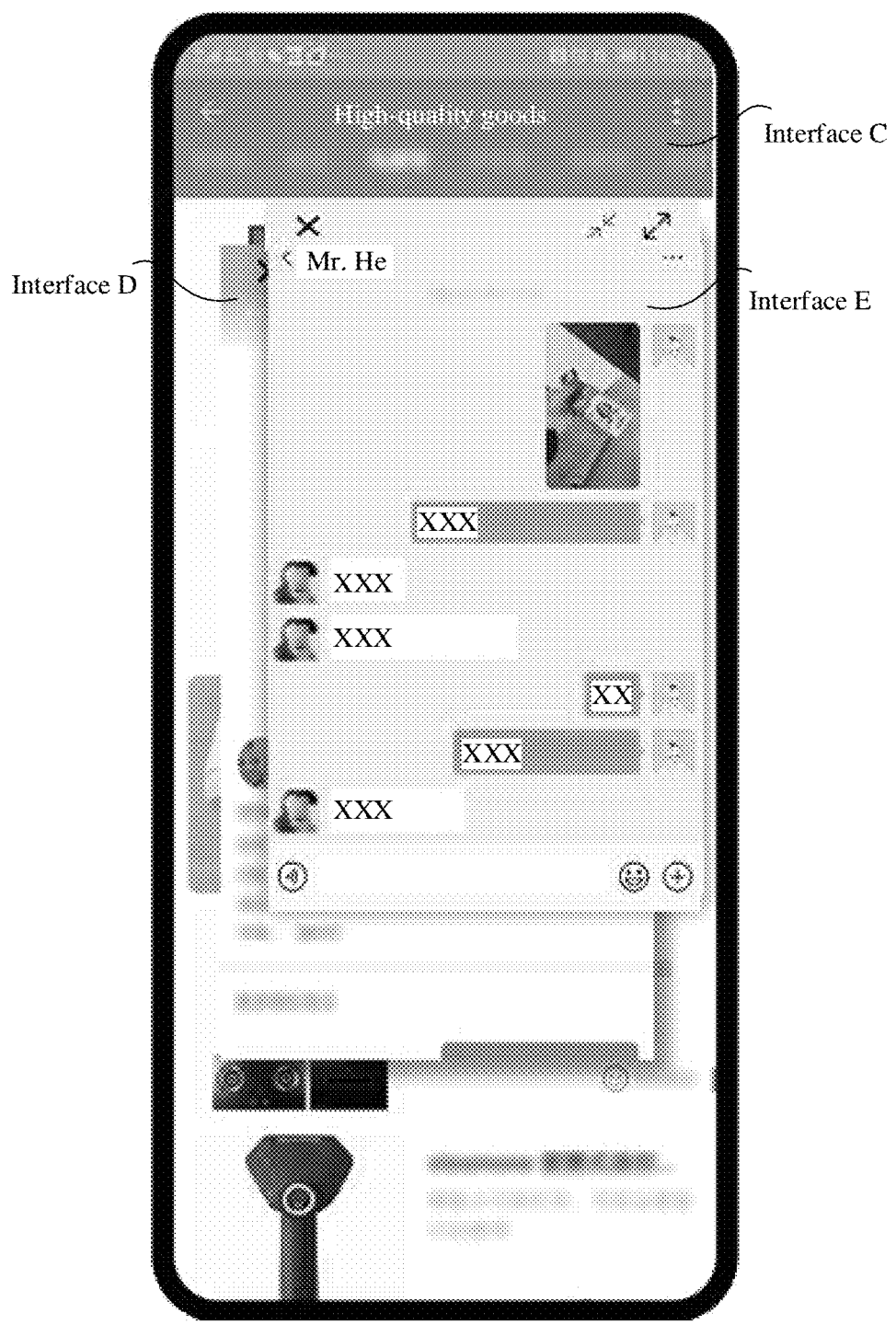
FIG. 15A and FIG. 15B are diagrams of examples of screen display effects according to some embodiments of this application.
Figure 15B:
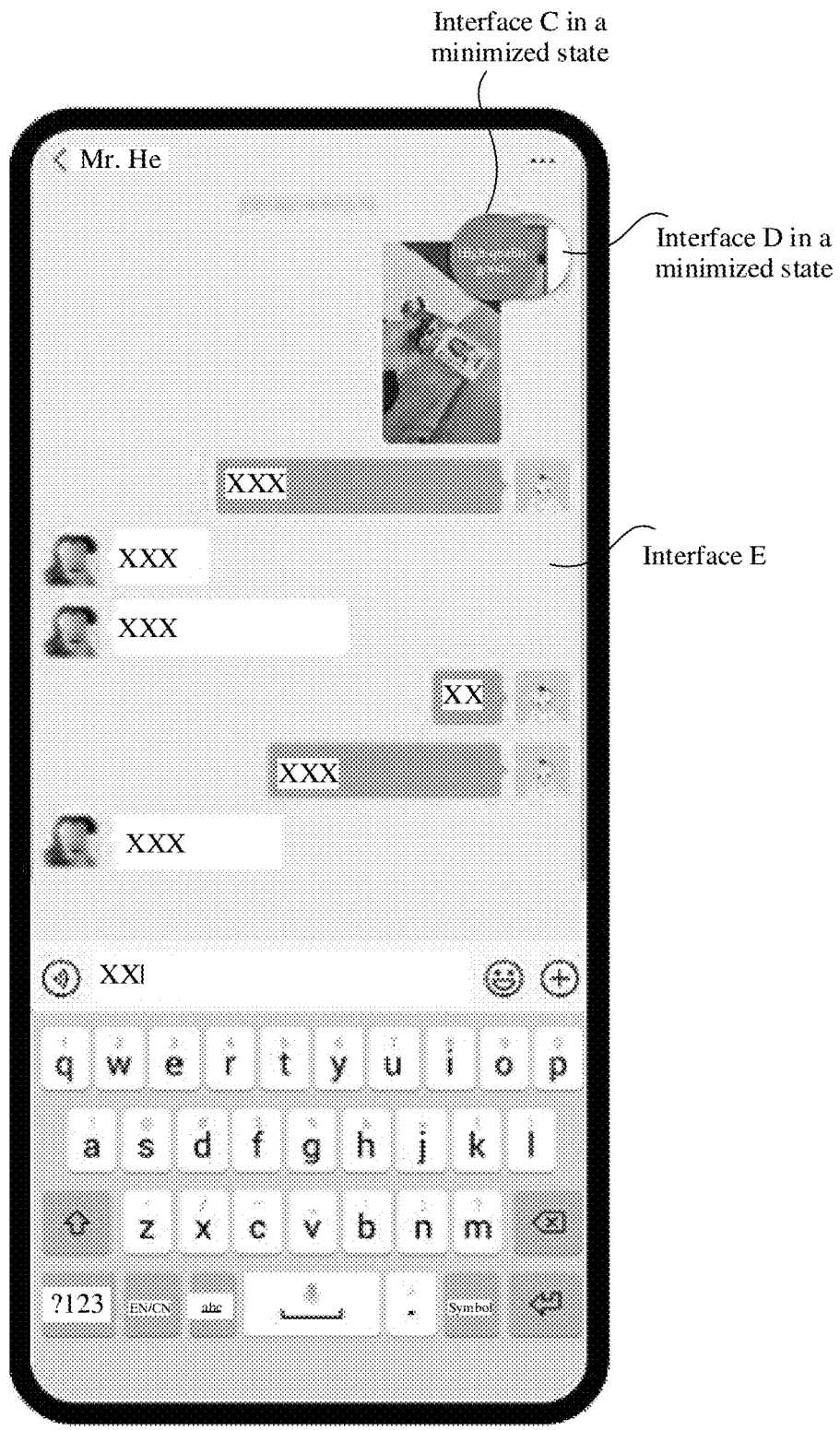

In some embodiments, with reference to FIG. 15A and FIG. 15B, another implementation of the screen display method provided in embodiments of this application is described.

Refer to FIG. 15A. The electronic device may display an interface C in full screen mode, and display a plurality of interfaces in a floating window state in the interface C displayed in full screen mode. The plurality of interfaces include an interface D and an interface E.

The interface C may be an application list interface or a running interface of an application C. The interface D may be a running interface of an application D, and the interface E may be a running interface of an application E. The interface E may include at least one edit box.

In an illustrative example, the application C and the application D may be a same application, and the interface C and the interface D may be different interfaces of the same application. The interface C may be a previous-level interface of the interface D.

Refer to FIG. 15B. In response to an operation of enabling an edit box in the interface E to enter an input state (for example, tapping or touching the edit box), the electronic device may automatically display the interface E in full screen mode, and minimize the interface C and an interface other than the interface E in the plurality of interfaces. For example, as shown in FIG. 15B, the electronic device may automatically minimize the interface D to the interface D in a minimized state, and automatically minimize the interface C to the interface C in a minimized state. That the edit box in the interface E enters the input state may be that the interface E enters a second state.

In these embodiments, when an edit box in any interface in the plurality of interfaces displayed in the floating window state enters an input state, the electronic device may automatically display, in full screen mode, the interface in which the edit box enters the input state, and automatically minimize other interfaces, so that the user performs an input operation.

Figure 16A:
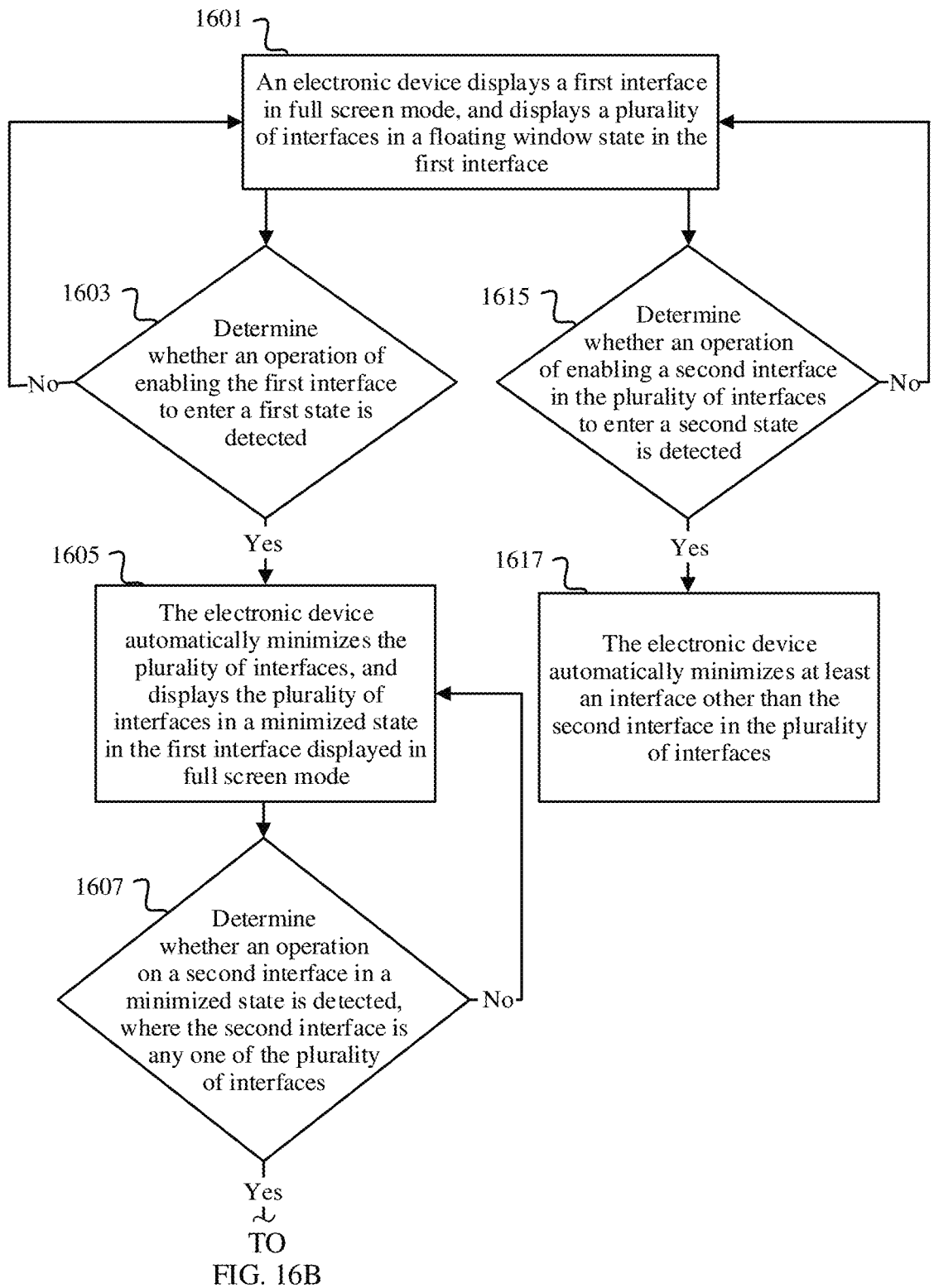
FIG. 16A and FIG. 16B are a flowchart of a screen display method according to some embodiments of this application.
Figure 16B:
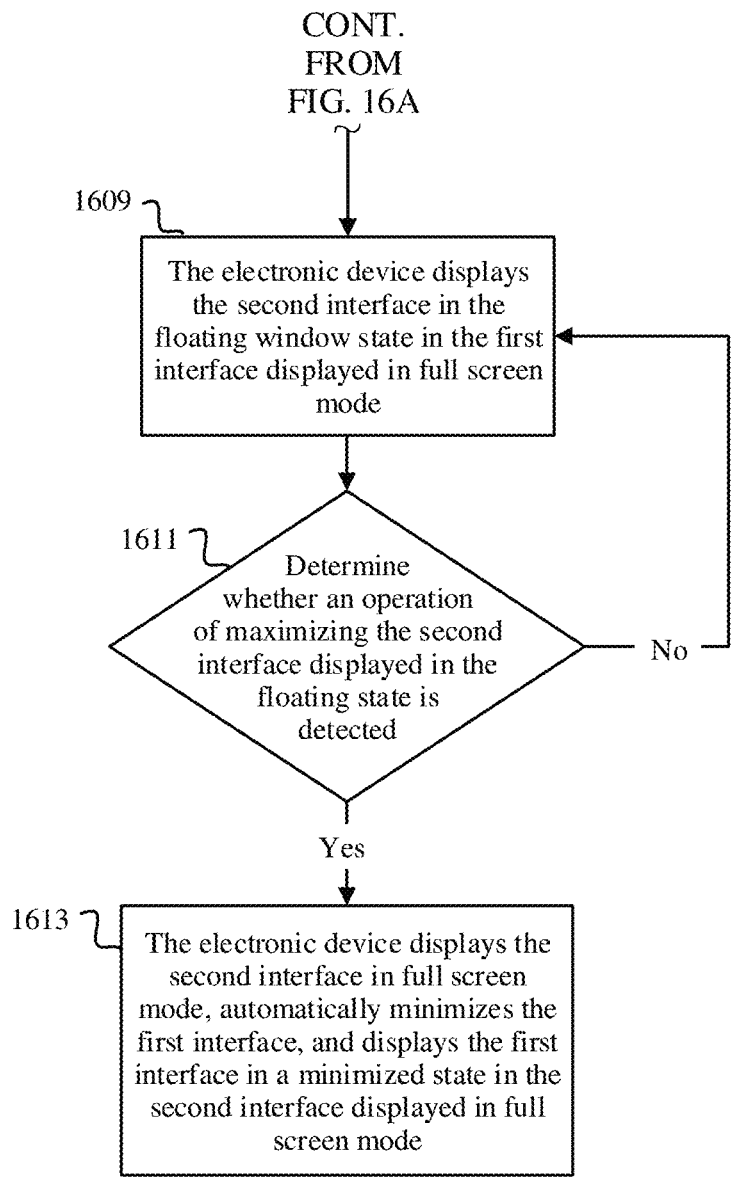

Refer to FIG. 16A and FIG. 16B. The following describes a screen display method according to an embodiment of this application. Refer to FIG. 16A and FIG. 16B. The method includes the following steps.

Step 1601: An electronic device displays a first interface in full screen mode, and displays a plurality of interfaces in a floating window state in the first interface, where a size of the interface displayed in the floating window state is less than a size of the first interface.

The first interface may be an application list interface or a running interface of a first application. The plurality of interfaces may include a second interface, and the second interface may be a running interface of a second application. In an illustrative example, the first application and the second application may be a same application, that is, the second interface and the first interface are running interfaces of the same application. The first interface may be a previous-level interface of the second interface.

For details, refer to the foregoing descriptions of the embodiment shown in FIG. 11A, the embodiment shown in FIG. 12A, and the embodiment shown in FIG. 13B. The details are not described herein again.

Step 1603: Determine whether the electronic device detects an operation of enabling the first interface to enter a first state.

That the first interface enters the first state may be that the first interface obtains a focus, or may be that an edit box in the first interface enters an input state. For details, refer to the foregoing descriptions of the embodiment shown in FIG. 11C. The details are not described herein again.

When performing step 1603, the electronic device may not stop performing step 1601.

If the operation of enabling the first interface to enter the first state is not detected in step 1603, the electronic device may continue to perform step 1601.

If the operation of enabling the first interface to enter the first state is detected in step 1603, the electronic device may perform step 1605: The electronic device automatically minimizes the plurality of interfaces, and displays the plurality of interfaces in a minimized state in the first interface displayed in full screen mode.

When the first interface displayed in full screen mode obtains the focus or the edit box in the first interface enters the input state, the electronic device may automatically minimize each of the plurality of interfaces, where each interface is minimized to an interface in a minimized state. For details, refer to the foregoing descriptions of the embodiment shown in FIG. 11C. The details are not described herein again.

The electronic device may further perform step 1607: Determine whether an operation on a second interface in a minimized state is detected, where the second interface is any one of the plurality of interfaces.

For step 1607, refer to the foregoing descriptions of the embodiment shown in FIG. 11D. Details are not described herein again.

When performing step 1607, the electronic device may not stop performing step 1605.

If the operation on the second interface in the minimized state is not detected in step 1607, the electronic device may continue to perform step 1605.

If the operation on the second interface in the minimized state is detected in step 1607, the electronic device may perform step 1609: The electronic device displays the second interface in the floating window state in the first interface displayed in full screen mode.

For step 1609, refer to the foregoing descriptions of the embodiment shown in FIG. 11D. Details are not described herein again.

The electronic device may further perform step 1611: Determine whether an operation of maximizing the second interface displayed in the floating window state is detected.

For step 1611, refer to the foregoing descriptions of the embodiment shown in FIG. 11E. Details are not described herein again.

When performing step 1611, the electronic device may not stop performing step 1609.

If the operation of maximizing the second interface displayed in the floating window state is not detected in step 1611, the electronic device may continue to perform step 1609.

If the operation of maximizing the second interface displayed in the floating window state is detected in step 1611, the electronic device may perform step 1613: The electronic device displays the second interface in full screen mode, automatically minimizes the first interface, and displays the first interface in a minimized state in the second interface displayed in full screen mode.

It is easily understood that when the operation of maximizing the second interface displayed in the floating window state is performed, the second interface can not only be maximized (displayed in full screen mode), but also the second interface can obtain a focus. Therefore, the first interface originally displayed in full screen mode can be automatically minimized, and the minimized interface still remains in the minimized state. For details, refer to the foregoing descriptions of the embodiment shown in FIG. 11E.

Refer to FIG. 16A and FIG. 16B. When the electronic device displays the first interface in full screen mode, and displays the plurality of interfaces in the floating window state in the first interface, that is, when the electronic device performs step 1601, the electronic device may further perform step 1615: Determine whether an operation of enabling a second interface in the plurality of interfaces to enter a second state is detected.

In an illustrative example, that the second interface enters the second state may be that any edit box in the second interface enters an input state. For details, refer to the foregoing descriptions of the embodiment shown in FIG. 11B and the embodiment shown in FIG. 12B. Details are not described herein again.

In an illustrative example, that the second interface enters the second state may be that the second interface obtains a focus.

When performing step 1615, the electronic device may not stop performing step 1601.

If the operation of enabling the second interface in the plurality of interfaces to enter the second state is not detected in step 1615, the electronic device may continue to perform step 1601.

If the operation of enabling the second interface in the plurality of interfaces to enter the second state is detected in step 1615, the electronic device may perform step 1617: The electronic device automatically minimizes at least an interface other than the second interface in the plurality of interfaces.

In an illustrative example, that the second interface enters the second state may be that any edit box in the second interface enters an input state. Step 1617 is specifically: continuing to display the first interface in full screen mode, and automatically minimizing the interface other than the second interface in the plurality of interfaces. Therefore, impact of the another interface on user input can be reduced. For details, refer to the foregoing descriptions of the embodiment shown in FIG. 11B. The details are not described herein again.

In an illustrative example, that the second interface enters the second state may be that any edit box in the second interface enters an input state. Step 1617 is specifically: continuing to display the first interface in full screen mode, and automatically minimizing the interface other than the second interface in the plurality of interfaces. Therefore, impact of the another interface displayed in the floating window state on user input can be reduced. For details, refer to the foregoing descriptions of the embodiment shown in FIG. 11B and the embodiment shown in FIG. 14B. The details are not described herein again.

In an illustrative example, that the second interface enters the second state may be that any edit box in the second interface enters an input state. Step 1617 is specifically: automatically displaying the second interface in full screen mode, and automatically minimizing the first interface and the interface other than the second interface in the plurality of interfaces. Therefore, user input can be facilitated. For details, refer to the foregoing descriptions of the embodiment shown in FIG. 12B and the embodiment shown in FIG. 15B. The details are not described herein again.

In an illustrative example, that the second interface enters the second state may be that the second interface obtains a focus. Step 1617 is specifically: continuing to display the first interface in full screen mode, and automatically minimizing the interface other than the second interface in the plurality of interfaces.

According to the method shown in FIG. 16A and FIG. 16B, the electronic device may display the plurality of second interfaces in the floating window state in the first interface displayed in full screen mode. When detecting an operation of enabling the first interface to obtain the focus or enabling the edit box to enter the input state, the electronic device may minimize the plurality of interfaces displayed in the floating window state, so that the user can conveniently view or operate the first interface. When detecting an operation of enabling the second interface in the plurality of interfaces displayed in the floating window state to obtain the focus or enabling the edit box to enter the input state, the electronic device may automatically minimize at least the interface other than the second interface in the plurality of interfaces, so that the user can conveniently view or operate the second interface.

An embodiment of this application provides still another screen display method. An interface P and an interface Q may be displayed side by side on a screen, so that a user can view both content in the interface P and content in the interface Q. In this embodiment of this application, displaying side by side on the screen may also be referred to as displaying in split-screen mode. To be specific, displaying the interface P and the interface Q side by side on the screen may be referred to as displaying the interface P and the interface Q in split-screen mode. For example, a video playback interface of a video application and a chat window of an instant messaging application are displayed in split-screen mode. In response to an operation of enabling an edit box in the chat window to enter an input state, the electronic device may display the chat window in full screen mode, and minimize the video playback interface, so that the user performs an input operation.

The method is described below in different embodiments with reference to different application scenarios.

In some embodiments, application of the screen display method provided in embodiments of this application to a scenario is described with reference to FIG. 17A, FIG. 17B, FIG. 17C, and FIG. 17D.

Figure 17A:
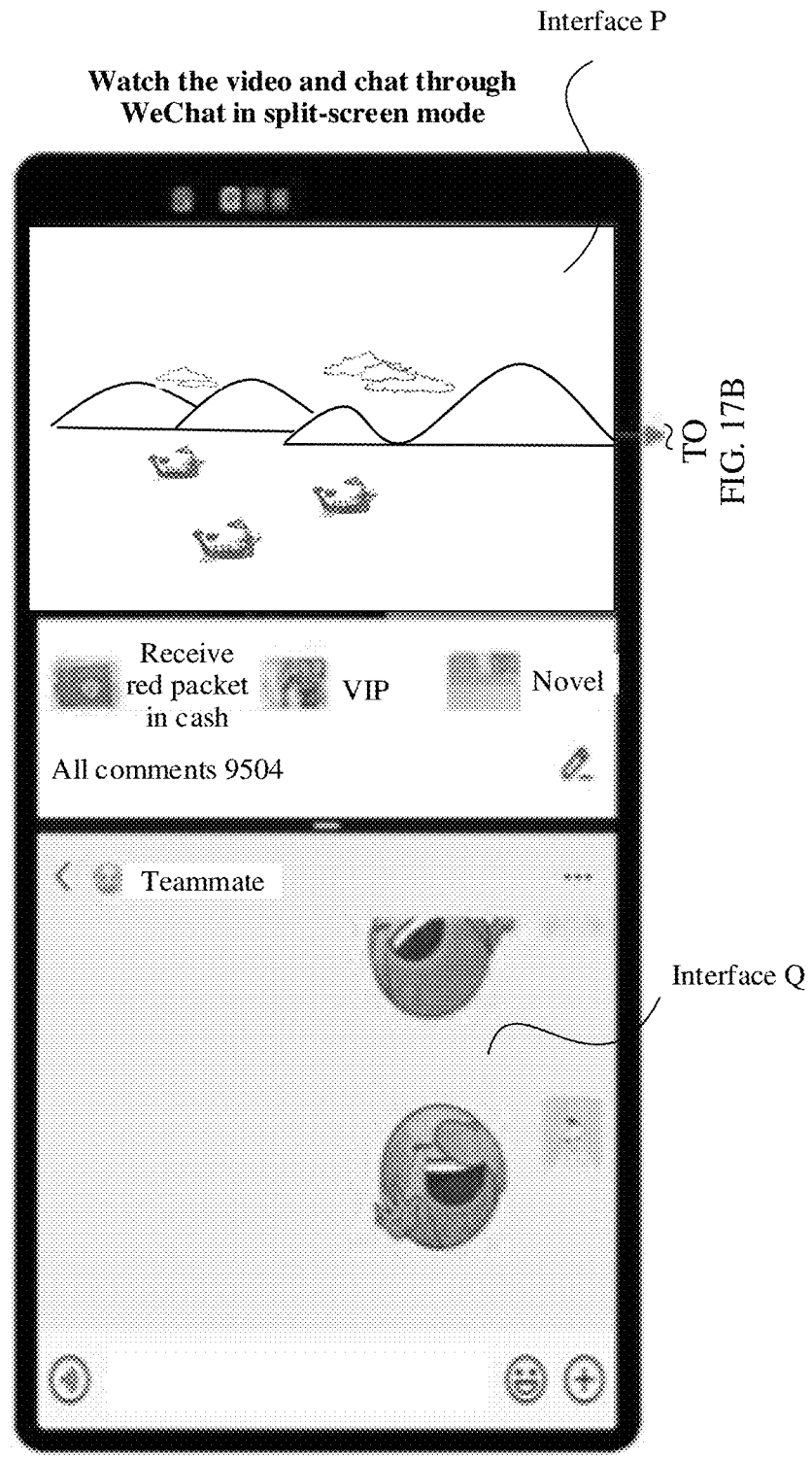
FIG. 17A, FIG. 17B, FIG. 17C, and FIG. 17D are diagrams of examples of screen display effects according to some embodiments of this application.

Refer to FIG. 17A. The electronic device may display an interface P and an interface Q in split-screen mode.

That the electronic device displays the interface P and the interface Q in split-screen mode means that the electronic device displays the interface P and the interface Q in different display areas, and display areas of the interface P and the interface Q do not overlap. In other words, there is no overlapping area between the interface P and the interface Q.

The interface P and the interface Q may be running interfaces of different applications.

The interface P may be an interface of an immersive task. The immersive task is a task relative to the user, and is a task that requires the user to continuously devote much attention, for example, watching a video, reading, or playing a game. The electronic device may identify user behavior (eye contact, eyeball rotation, facial expression, no movement for a long time, no significant movement change for a long time, or the like) by using a camera or another sensor, to determine whether attention of the user is highly concentrated, and further identify whether a current task of the electronic device is an immersive task. A video playing task, an ebook display task, and a game operation task may be further defined as immersive tasks, and the electronic device may identify these tasks. For example, as shown in FIG. 17A, that the user watches a video through the electronic device is an immersive task.

The interface Q may include at least one edit box. Specifically, the interface Q may be a dialog box of an instant messaging application or a Messages application, and includes a message edit box. Specifically, as shown in FIG. 17A, the interface Q may be a WeChat dialog box, and includes a WeChat message edit box.

In an illustrative example, before displaying the interface P and the interface Q in split-screen mode, the electronic device may display a running interface of an application P in full screen mode in response to an operation of opening the application P (for example, an operation that is of tapping an application icon of the application P and that is initiated by the user). The running interface of the application P may be referred to as the interface P. The electronic device may display the interface P in an upper half part (or a lower half part) or a left half part (or a right half part) of the screen in response to an operation of enabling the application P to be displayed in split-screen mode.

The operation of enabling the application P to be displayed in split-screen mode may be a two-finger pinch operation performed on the interface P. In an example, a two-finger pinch direction may be parallel or approximately parallel to a direction of a straight line in which a side of the display is located. Specifically, for example, the electronic device is a mobile phone. A display of the mobile phone is usually rectangular. Two longer sides in four sides of the display of the mobile phone may be referred to as long sides, and two shorter sides may be referred to as wide sides. If a finger pinch direction is parallel or approximately parallel to a direction of a straight line in which the long side is located, the interface P may be displayed in an upper half part (or a lower half part) of the display. If a finger pinch direction is parallel or approximately parallel to a direction of a straight line in which the wide side is located, the interface P may be displayed in a left half part (or a right half part) of the display.

In an example, when the interface P is in a split-screen display state, the user may drag the interface P to adjust a display location of the interface P.

When the interface P is in the split-screen display state, and an application Q is opened, a running interface of the application Q is displayed in an area in which the interface P is not displayed. The running interface of the application Q may be referred to as the interface Q.

In an example, the operation of opening the application Q may be an operation such as tapping or touching on an application icon of the application Q in an application list interface. The user may drag the interface P to change an area of the application list interface blocked by the interface P, to show the application icon of the application Q, so that the user can perform an operation on the application icon of the application Q.

In an example, the application Q may be opened through a sidebar.

Figure 17B:
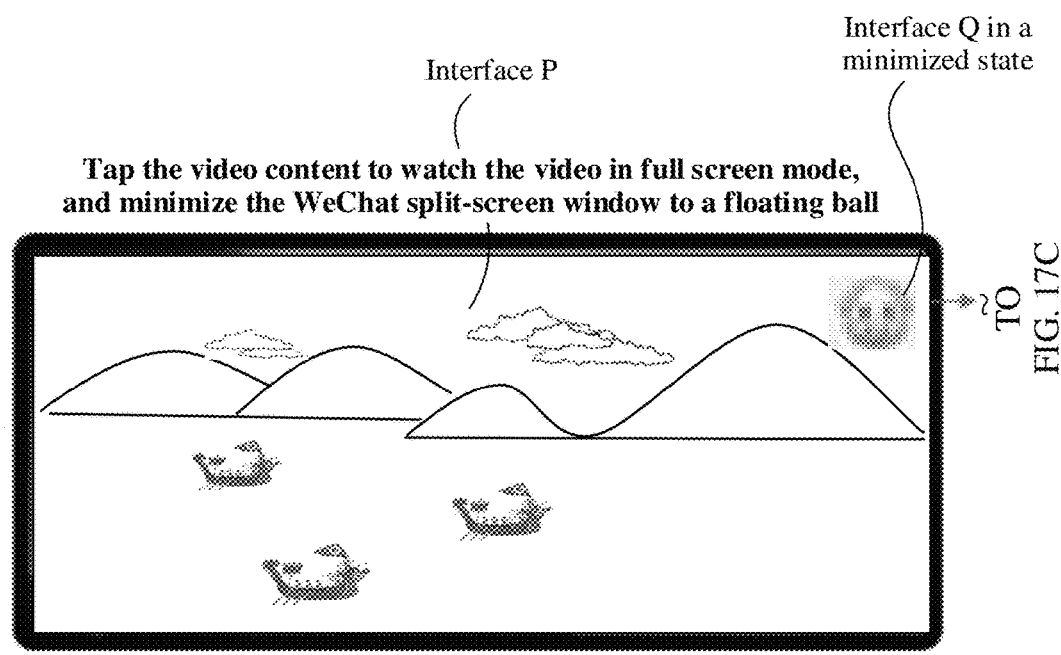

Refer to FIG. 17B. In response to an operation of maximizing the interface P, the electronic device displays the interface P in full screen mode, and automatically minimizes the interface Q to the interface Q in a minimized state.

The operation of maximizing the interface P may be a two-finger stretch operation performed in a screen area in which the interface P is displayed, or may be a double-tap operation performed in a screen area in which the interface P is displayed, or may be an operation on a maximization function option in the interface P. Other examples are not enumerated one by one herein.

For a shape, a display manner, a display location, and the like of the interface Q in the minimized state, refer to the foregoing descriptions of the embodiment shown in FIG. 3C. Details are not described herein again.

Figure 17C:
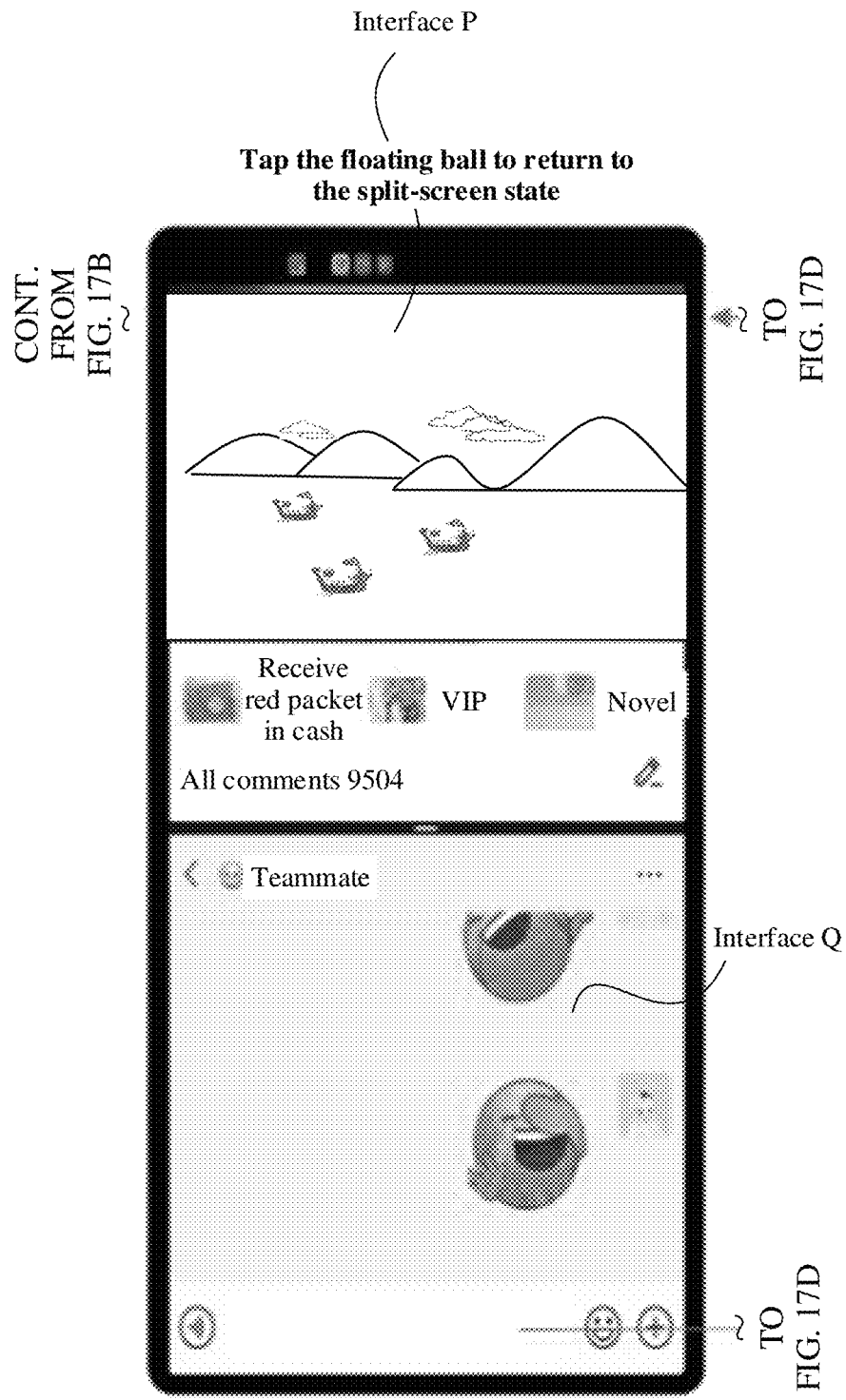

Refer to FIG. 17C. The electronic device may automatically display the interface P and the interface Q in split-screen mode in response to an operation on the interface Q in the minimized state.

The operation on the interface Q in the minimized state may be a tap operation or a touch operation. Other examples are not enumerated one by one herein.

Figure 17D:
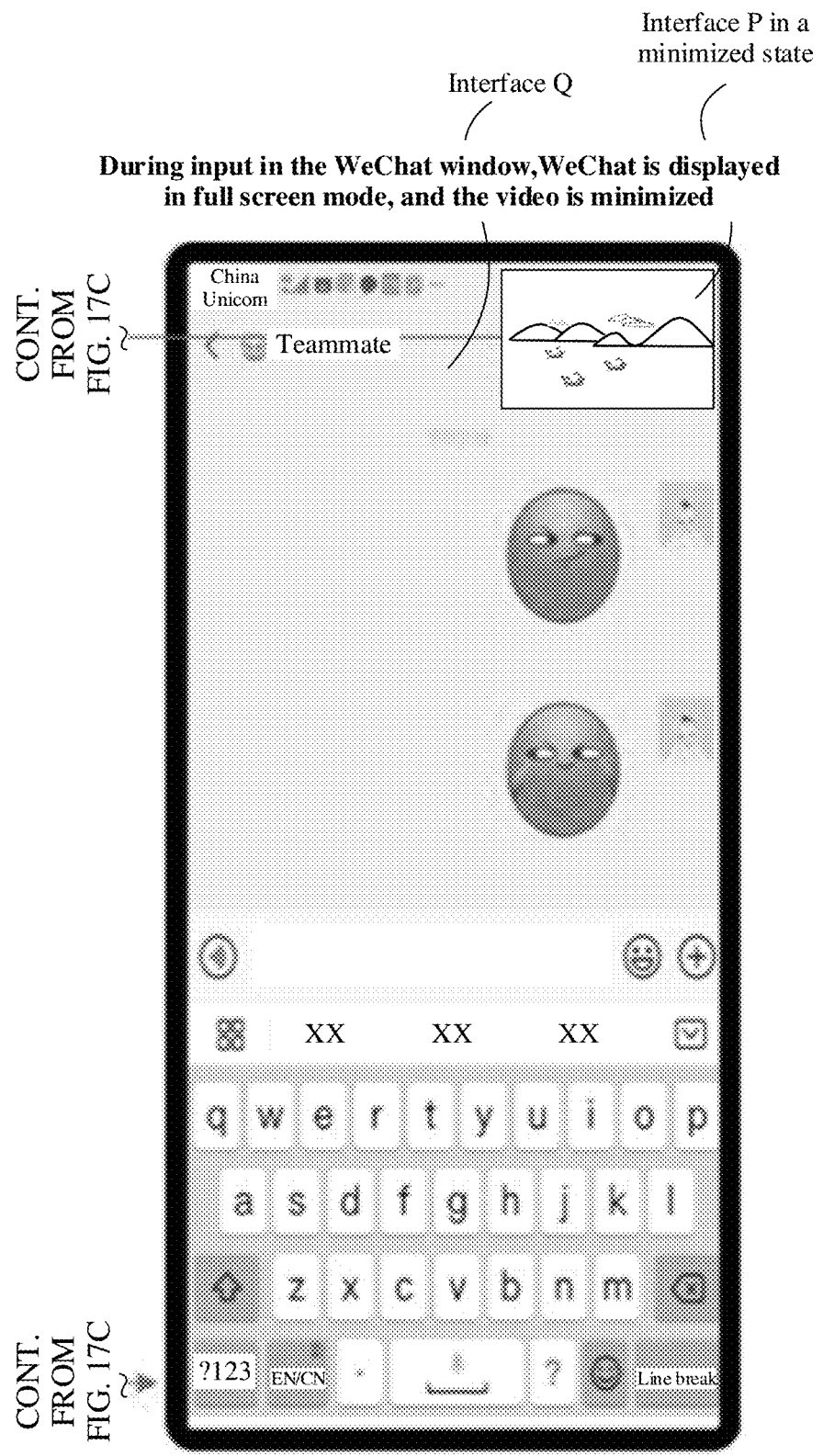

Refer to FIG. 17D. In response to an operation of enabling any edit box in the interface Q to enter an input state, the electronic device may automatically display the interface Q in full screen mode, and automatically minimize the interface P to the interface P in a minimized state.

The operation of enabling the any edit box in the interface Q to enter the input state may be an operation of tapping the edit box. For a shape, a display manner, a display location, and the like of the interface P in the minimized state, refer to the foregoing descriptions of the embodiment shown in FIG. 3C. Details are not described herein again.

If the interface P is an interface in which a video playing task is performed, that is, the interface P is a video playback interface, the interface P in the minimized state may be a scaled-down video playback interface, where a size of the interface P in the minimized state is less than a size of the interface P in the split-screen display state. For example, the scaled-down video playback interface may be a minimized picture-in-picture interface, and the minimized picture-in-picture interface may be referred to as a video pop-up window.

In an illustrative example, the electronic device may automatically display the interface P and the interface Q in split-screen mode in response to an operation on the interface P in the minimized state.

The operation on the interface P in the minimized state may be a tap operation or a touch operation. Other examples are not enumerated one by one herein.

In an illustrative example, the electronic device may automatically display the interface P and the interface Q in split-screen mode in response to an operation of enabling the edit box in the input state in the interface Q to exit the input state.

The operation of enabling the edit box in the input state in the interface Q to exit the input state may be an operation such as tapping an area other than the edit box in the interface Q.

In an illustrative example, when the electronic device displays the interface P and the interface Q in split-screen mode, the user may open an application K through a sidebar or a voice, and display an interface K of the application K in a floating window state. Both the interface P and the interface Q may partially overlap with the running interface K displayed in the floating window state. The user may perform a sliding operation that is performed on the interface K and that is toward the interface P (or the interface Q), so that the interface K replaces the interface P (or the interface Q), and the interface P (or the interface Q) is displayed in a floating window state. In other words, in response to the sliding operation that is performed on a screen on which the interface K is displayed, that is toward the interface P (or the interface Q), and that is initiated by the user, the electronic device may display the interface K and the interface Q (or the interface P) in split-screen mode, and display the interface P (or the interface Q) in the floating window state.

In these embodiments, the electronic device may display the interface P and the interface Q in split-screen mode; and in response to an operation on an interface, automatically display the corresponding interface in full screen mode, automatically minimize the other interface, and display the other interface in a minimized state in the interface displayed in full screen mode. To be specific, the user performs only one operation, so that one interface can be displayed in full screen mode and the other interface can be minimized. Therefore, the user can conveniently view or operate the corresponding interface, and conveniently switch between the interface P and the interface Q.

In some embodiments, application of the screen display method provided in embodiments of this application to another scenario is described with reference to FIG. 18A and FIG. 18B.

Figure 18A:
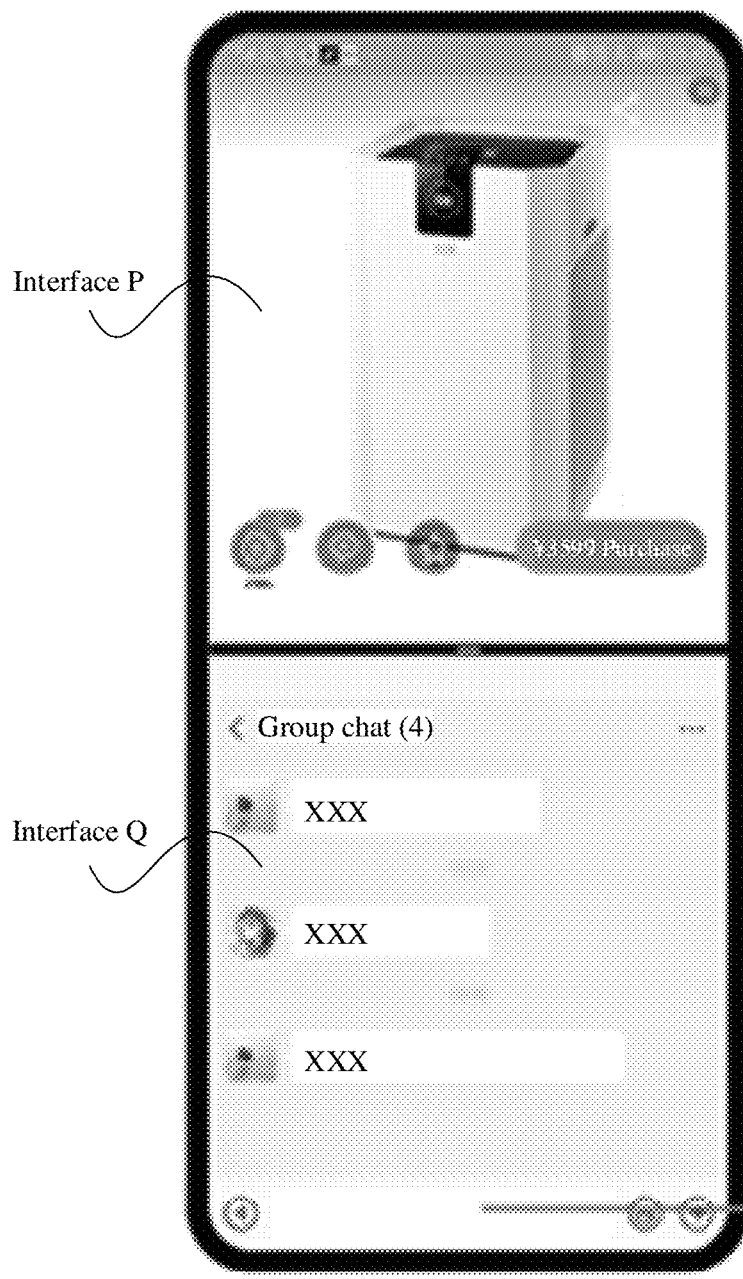
FIG. 18A and FIG. 18B are diagrams of examples of screen display effects according to some embodiments of this application.

Refer to FIG. 18A. The electronic device may display an interface Q and an interface P in split-screen mode. For a manner of displaying the interface Q and the interface P in split-screen mode, refer to the foregoing descriptions of the embodiment shown in FIG. 17A. Details are not described herein again.

In an example, as shown in FIG. 18A, the interface P may be a commodity display interface of Taobao, and the interface Q may be a WeChat dialog box. The WeChat dialog box includes an input box. The input box may also be referred to as an edit box.

Figure 18B:
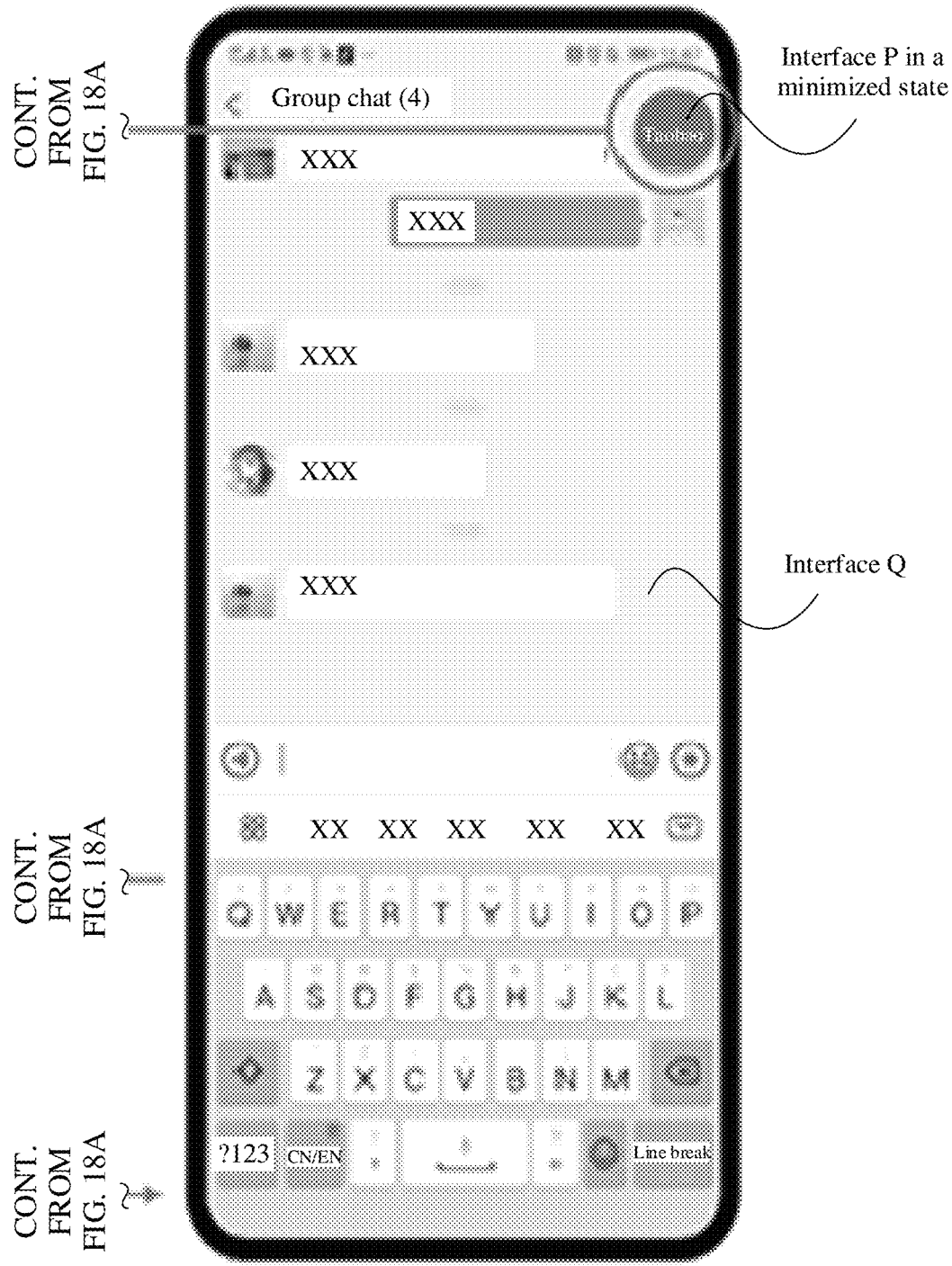

Refer to FIG. 18B. When any edit box in the interface Q enters an input state, the electronic device may automatically display the interface Q in full screen mode, minimize the interface P, and display the interface P in a minimized state in the interface Q displayed in full screen mode.

It may be specified that the interface Q is a WeChat dialog box, and the WeChat dialog box includes an input box. The interface P is a commodity display interface of Taobao. As shown in FIG. 18A and FIG. 18B, the user may tap the input box in the WeChat dialog box. In response to the tap operation, the electronic device may automatically display the WeChat dialog box in full screen mode, and automatically minimize the commodity display interface of Taobao to the interface P in the minimized state. To be specific, the user performs the operation of tapping the input box in the WeChat dialog box, so that the WeChat dialog box can be displayed in full screen mode, and the commodity display interface of Taobao can be minimized.

In an illustrative example, when the edit box in the input state in the interface Q exits the input state, the electronic device may automatically display the interface P and the interface Q in split-screen mode.

Specifically, as shown in FIG. 18A and FIG. 18B, when the input box in the WeChat dialog box exits the input state, the electronic device may automatically display the WeChat dialog box and the commodity display interface of Taobao in split-screen mode.

In an illustrative example, the electronic device may automatically display the interface P and the interface Q in split-screen mode in response to an operation on the interface P in the minimized state.

Specifically, as shown in FIG. 18A and FIG. 18B, the interface P in the minimized state may be specifically a floating ball. When the user taps the interface P in the minimized state, that is, the floating ball, the electronic device may automatically display the WeChat dialog box and the commodity display interface of Taobao in split-screen mode.

In these embodiments, the electronic device may display the interface P and the interface Q in split-screen mode; and in response to an operation on an interface, automatically display the corresponding interface in full screen mode, automatically minimize the other interface, and display the other interface in a minimized state in the interface displayed in full screen mode. Therefore, the user can conveniently view or operate the corresponding interface, and conveniently switch between the interface P and the interface Q.

Figure 19:
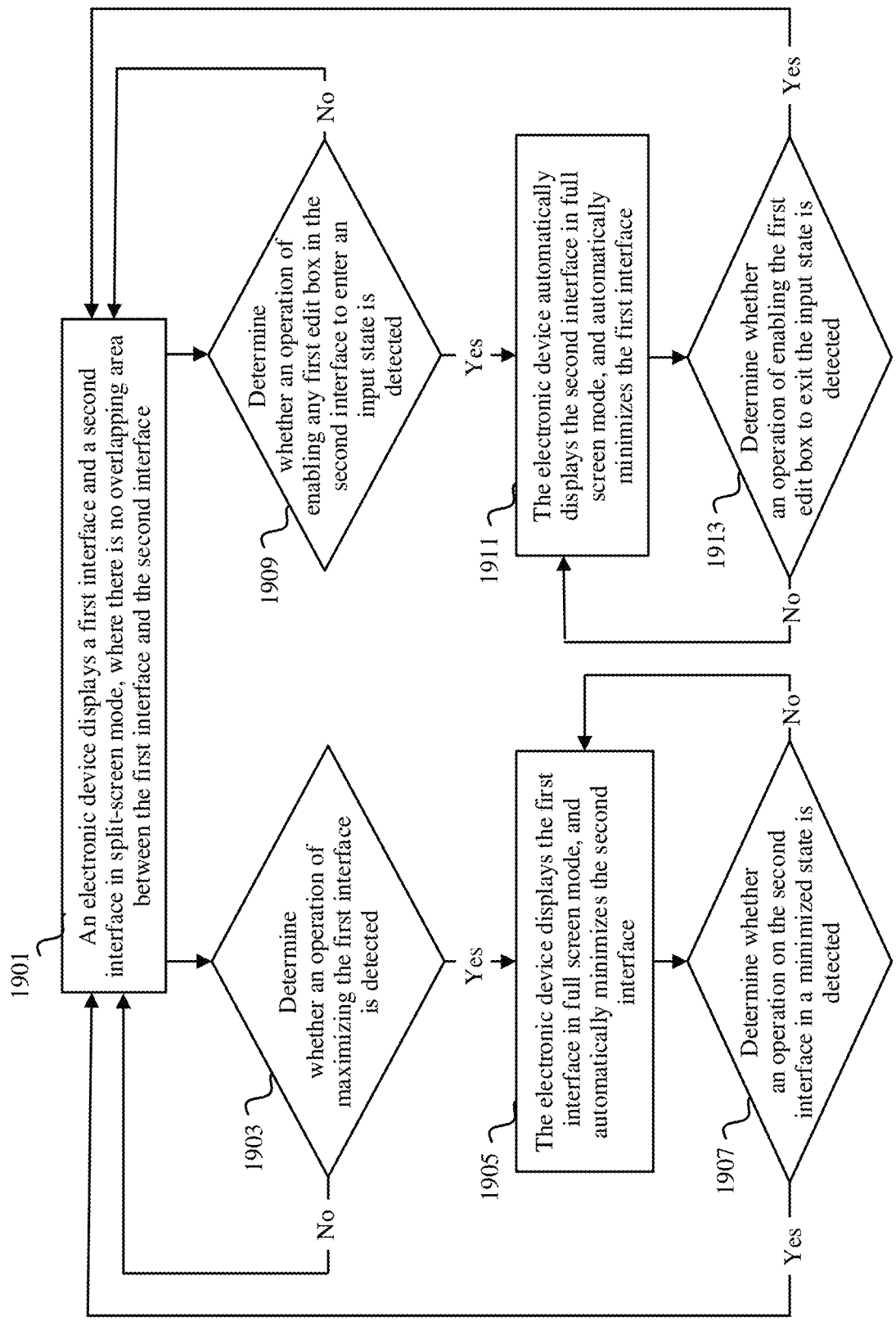
FIG. 19 is a flowchart of a screen display method according to some embodiments of this application.

Refer to FIG. 19. The following describes a screen display method according to an embodiment of this application. Refer to FIG. 19. The method includes the following steps.

Step 1901: An electronic device displays a first interface and a second interface in split-screen mode, where there is no overlapping area between the first interface and the second interface.

For step 1901, refer to the foregoing descriptions of the embodiment shown in FIG. 17A. Details are not described herein again.

Step 1903: Determine whether an operation of maximizing the first interface is detected.

For the operation of maximizing the first interface, refer to the foregoing descriptions of the embodiment shown in FIG. 17B. Details are not described herein again. The operation of maximizing the first interface may also be referred to as an operation of enabling the first interface to enter a first state.

When performing step 1903, the electronic device may not stop performing step 1901.

If the operation of maximizing the first interface is not detected in step 1903, the electronic device may continue to perform step 1901.

If the operation of maximizing the first interface is detected in step 1903, the electronic device may perform step 1905: The electronic device displays the first interface in full screen mode, and automatically minimizes the second interface, where the second interface in a minimized state may be displayed in the first interface displayed in full screen mode.

For details, refer to the foregoing descriptions of the embodiment shown in FIG. 17B. The details are not described herein again.

The electronic device may further perform step 1907: Determine whether an operation on the second interface in the minimized state is detected.

For the operation on the second interface in the minimized state, refer to the foregoing descriptions of the embodiment shown in FIG. 17C. Details are not described herein again.

When performing step 1907, the electronic device may not stop performing step 1905.

If the operation on the second interface in the minimized state is not detected in step 1907, the electronic device may continue to perform step 1905.

If the operation on the second interface in the minimized state is detected in step 1907, the electronic device may perform step 1901 again, that is, the electronic device automatically displays the first interface and the second interface in split-screen mode, where there is no overlapping area between the first interface and the second interface.

Refer to FIG. 19. When the electronic device displays the first interface and the second interface in split-screen mode, where there is no overlapping area between the first interface and the second interface, that is, when the electronic device performs step 1901, the electronic device may further perform step 1909: Determine whether an operation of enabling any first edit box in the second interface to enter an input state is detected.

For step 1909, refer to the foregoing descriptions of the embodiment shown in FIG. 17D. Details are not described herein again.

When performing step 1909, the electronic device may not stop performing step 1901.

If the operation of enabling the any first edit box in the second interface to enter the input state is not detected in step 1909, the electronic device may continue to perform step 1901.

If the operation of enabling the any first edit box in the second interface to enter the input state is detected in step 1909, the electronic device may perform step 1911: The electronic device automatically displays the second interface in full screen mode, and automatically minimizes the first interface, where the first interface in a minimized state may be displayed in the second interface displayed in full screen mode.

For step 1911, refer to the foregoing descriptions of the embodiment shown in FIG. 17D. Details are not described herein again.

The electronic device may further perform step 1913: Determine whether an operation of enabling the first edit box to exit the input state is detected.

For step 1913, refer to the foregoing descriptions of the embodiment shown in FIG. 17D. Details are not described herein again.

When performing step 1913, the electronic device may not stop performing step 1911.

If the operation of enabling the first edit box to exit the input state is not detected in step 1913, the electronic device may continue to perform step 1911.

If the operation of enabling the first edit box to exit the input state is detected in step 1913, the electronic device may perform step 1901 again, that is, the electronic device displays the first interface and the second interface in split-screen mode, where there is no overlapping area between the first interface and the second interface.

Step 1913 may be replaced with the following: Determine whether an operation on the first interface in the minimized state is detected. If the operation on the first interface in the minimized state is not detected, the electronic device may continue to perform step 1911. If the operation on the first interface in the minimized state is detected, the electronic device may perform step 1901 again. For details, refer to the foregoing descriptions of FIG. 17D.

According to the method shown in FIG. 19, the electronic device may display the first interface and the second interface in split-screen mode; and in response to an operation on a corresponding interface, automatically display the corresponding interface in full screen mode, automatically minimize the other interface, and display the other interface in a minimized state in the interface displayed in full screen mode. To be specific, the user performs one operation, so that one interface can be displayed in full screen mode and the other interface can be minimized. Therefore, the user can conveniently view or operate the corresponding interface, and conveniently switch between the first interface and the second interface.

Therefore, according to the methods shown in the embodiments described above, the electronic device may display the second interface in the floating window state in the first interface displayed in full screen mode, or display the first interface and the second interface in split-screen mode. When the electronic device displays the second interface in the floating state in the first interface displayed in full screen mode, the second interface is displayed in the first interface, that is, there is an overlapping area between the first interface and the second interface. When the electronic device displays the first interface and the second interface in split-screen mode, there is no overlapping area between the first interface and the second interface. When the electronic device displays the first interface in full screen mode, and displays the second interface in the floating window state in the first interface, in response to an operation performed on the first interface, the electronic device may minimize the second interface, and display the second interface in a minimized state in the first interface. When the electronic device displays the first interface and the second interface in split-screen mode, in response to an operation performed on the first interface, the electronic device may automatically display the first interface in full screen mode, automatically minimize the second interface, and display the second interface in a minimized state in the first interface. In this embodiment of this application, the user performs one operation on the first interface, so that the second interface can be minimized. Therefore, interference from the second interface or impact on a task performed by the user in the first interface can be reduced. In addition, the user can conveniently and quickly switch between the first interface and the second interface, to improve a user operation in a multitasking scenario.

Figure 20:
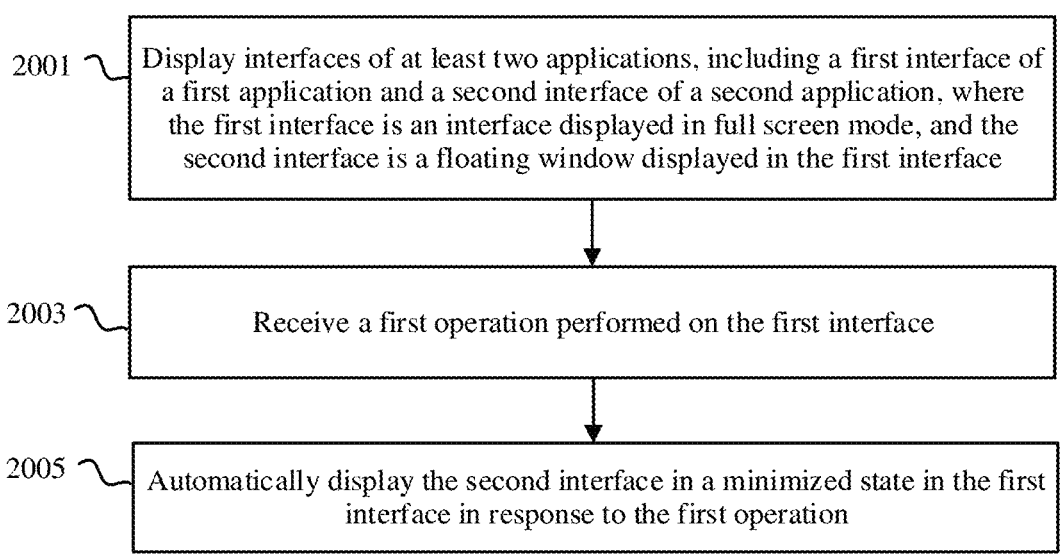
FIG. 20 is a flowchart of a screen display method according to some embodiments of this application.

Refer to FIG. 20. An embodiment of this application provides a screen display method. The method may be applied to an electronic device. As shown in FIG. 20, the method includes the following steps.

Step 2001: Display interfaces of at least two applications, including a first interface of a first application and a second interface of a second application, where the first interface is an interface displayed in full screen mode, and the second interface is a floating window displayed in the first interface.

For step 2001, refer to the foregoing descriptions of step 1001 in FIG. 10A. Details are not described herein again.

Step 2003: Receive a first operation performed on the first interface.

Step 2005: Automatically display the second interface in a minimized state in the first interface in response to the first operation.

The second interface in the minimized state in step 2005 is any one of the following: a floating ball, an icon of the second application, a contact avatar, and a video pop-up window.

For step 2003 and step 2005, refer to the foregoing descriptions of step 1003 and step 1005 in FIG. 10A. Details are not described herein again.

In some embodiments, the first interface includes a first edit box, and the first operation is an operation performed on the first edit box; and the automatically displaying the second interface in a minimized state in the first interface in response to the first operation is specifically: generating a focus obtaining event in the first edit box in response to the first operation; and automatically displaying the second interface in the minimized state in the first interface in response to the focus obtaining event in the first edit box. For details, refer to the foregoing descriptions of step 1003 and step 1005 in FIG. 10A. The details are not described herein again.

In an example of these embodiments, the method further includes: generating a focus loss event in the first edit box in response to a second operation; and automatically restoring the second interface in the minimized state to a floating window in response to the focus loss event in the first edit box. For details about this example, refer to the foregoing descriptions of step 1007a and step 1009 in FIG. 10A and FIG. 10B. Details are not described herein again.

In an example of these embodiments, the method further includes: obtaining a cursor location in the first edit box; and determining a first location whose distance from the cursor location is greater than a first threshold; and the displaying the second interface in the minimized state in the first interface includes: displaying the second interface in the minimized state at the first location. For details, refer to the foregoing descriptions of step 1005 in FIG. 10A. The details are not described herein again.

In some embodiments, the method further includes: receiving a third operation performed on the second interface in a floating window state; displaying the second interface in full screen mode, and minimizing the first interface, in response to the third operation; and displaying the first interface in a minimized state in the second interface. For details, refer to the foregoing descriptions of step 1011 and step 1012 in FIG. 10B. The details are not described herein again.

In an example of these embodiments, the second interface includes a second edit box, and the third operation is an operation performed on the second edit box; and the displaying the second interface in full screen mode, and minimizing the first interface, in response to the third operation includes: generating a focus obtaining event in the second edit box in response to the third operation; and automatically displaying the second interface in full screen mode, and minimizing the first interface, in response to the focus obtaining event in the second edit box. For details, refer to the foregoing descriptions of step 1011 and step 1012 in FIG. 10B. The details are not described herein again.

In some embodiments, the interfaces of the at least two applications further include a third interface of a third application, and the third interface is a floating window displayed in the first interface. For details, refer to the foregoing descriptions of step 1601 in FIG. 16A.

In an example of these embodiments, the method further includes: receiving a fourth operation performed on the second interface in a floating window state; and automatically minimizing at least the third interface in response to the fourth operation. For details, refer to the foregoing descriptions of step 1615 and step 1617 in FIG. 16B.

In an example of this example, the automatically minimizing at least the third interface in response to the fourth operation includes: displaying the second interface in full screen mode, and minimizing the first interface and the third interface, in response to the fourth operation; and displaying the first interface in a minimized state and the third interface in a minimized state in the second interface. For details, refer to the foregoing descriptions of step 1617 in FIG. 16B.

In an example of these embodiments, the automatically displaying the second interface in a minimized state in the first interface in response to the first operation is specifically: automatically displaying the second interface in the minimized state and the third interface in a minimized state in the first interface in response to the first operation. For details, refer to the foregoing descriptions of step 1603 and step 1605 in FIG. 16A.

According to the screen display method provided in this embodiment of this application, when displaying interfaces of a plurality of applications, in response to an operation performed on an interface of one application, the electronic device may automatically minimize an interface of another application, and display the interface that is of the another application and that is in a minimized state. This simplifies an operation of minimizing the interface of the another application by a user, and provides better user operation experience.

Figure 21:
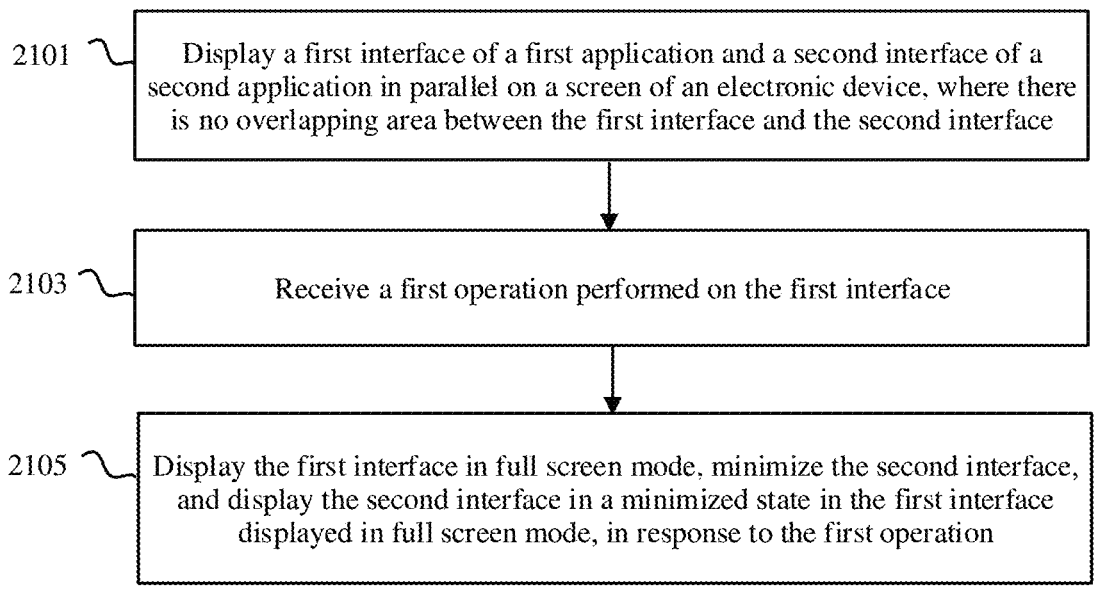
FIG. 21 is a flowchart of a screen display method according to some embodiments of this application.

Refer to FIG. 21. An embodiment of this application provides a screen display method. The method is applied to an electronic device. Refer to FIG. 21. The method includes the following steps:

Step 2101: Display a first interface of a first application and a second interface of a second application side by side on a screen of the electronic device, where there is no overlapping area between the first interface and the second interface. For details, refer to the foregoing descriptions of step 1901 in FIG. 19.

Step 2103: Receive a first operation performed on the first interface.

Step 2105: Display the first interface in full screen mode, minimize the second interface, and display the second interface in a minimized state in the first interface, in response to the first operation.

The second interface in the minimized state in step 2105 is any one of the following: a floating ball, an icon of the second application, a contact avatar, and a video pop-up window.

For steps 2103 and 2105, refer to the foregoing descriptions of steps 1903, 1905, 1909, and 1911 in FIG. 19.

In some embodiments, the first interface includes a first edit box, and the first operation is an operation performed on the first edit box; and the displaying the first interface in full screen mode, minimizing the second interface, and displaying the second interface in a minimized state in the first interface displayed in full screen mode, in response to the first operation is specifically: generating a focus obtaining event in the first edit box in response to the first operation; and displaying the first interface in full screen mode, minimizing the second interface, and displaying the second interface in the minimized state in the first interface displayed in full screen mode, in response to the focus obtaining event in the first edit box. For details, refer to the foregoing descriptions of steps 1909 and 1911 in FIG. 19.

In an example of these embodiments, the method further includes: receiving a second operation; generating a focus loss event in the first edit box in response to the second operation; and displaying the first interface and the second interface side by side again in response to the focus loss event. For details, refer to the foregoing descriptions of steps 1913 and 1901 in FIG. 19.

In an example of these embodiments, the method further includes: obtaining a cursor location in the first edit box; and determining a first location whose distance from the cursor location is greater than a first threshold; and the displaying the second interface in the minimized state in the first interface displayed in full screen mode includes: displaying the second interface in the minimized state at the first location. For details, refer to the foregoing descriptions of step 1909 in FIG. 19.

In some embodiments, the first interface includes a maximization function option, and the first operation is an operation on the maximization function option. For details, refer to the foregoing descriptions of steps 1903 and 1905 in FIG. 19.

In some embodiments, the method further includes: receiving a third operation performed on the second interface in the minimized state; and displaying the first interface and the second interface side by side again in response to the third operation. For details, refer to the foregoing descriptions of steps 1907 and 1901 in FIG. 19.

According to the screen display method provided in this embodiment of this application, interfaces of two applications may be displayed side by side on the screen, and there is no overlapping area between the interfaces of the two applications that are displayed side by side, so that a user can conveniently view the interfaces of the two applications. When an operation performed on one of the two interfaces displayed side by side is detected, the interface may be automatically displayed in full screen mode, the other interface may be automatically minimized, and the interface in a minimized state may be displayed in the interface displayed in full screen mode, to improve user operation experience.

Figure 22:
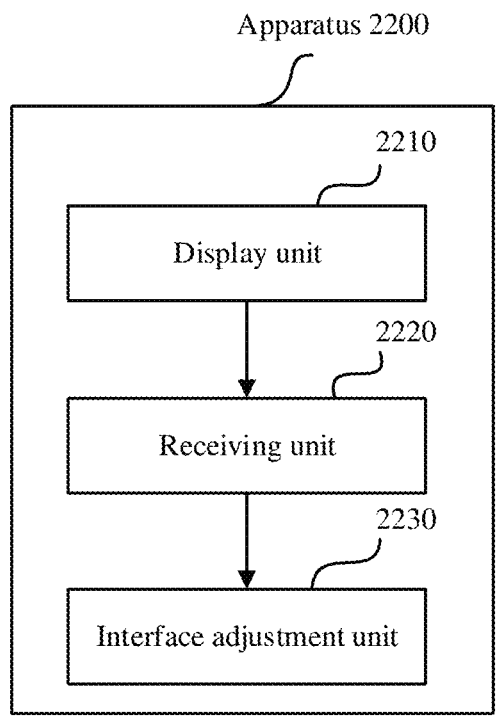
FIG. 22 is a schematic block diagram of a screen display apparatus according to some embodiments of this application.

Refer to FIG. 22. An embodiment of this application provides a screen display apparatus 2200. The apparatus 2200 includes:

a display unit 2210, configured to display interfaces of at least two applications, including a first interface of a first application and a second interface of a second application, where the first interface is an interface displayed in full screen mode, and the second interface is a floating window displayed in the first interface;

a receiving unit 2220, configured to receive a first operation performed on the first interface; and an interface adjustment unit 2230, configured to automatically display the second interface in a minimized state in the first interface in response to the first operation, where the second interface in the minimized state is any one of the following:

a floating ball, an icon of the second application, a contact avatar, and a video pop-up window.

For functions of the functional units of the apparatus 2200, refer to implementations of the method embodiment shown in FIG. 22. Details are not described herein again.

The foregoing mainly describes, from a perspective of a method procedure, the apparatus 2200 provided in this embodiment of this application. It may be understood that, to implement the foregoing functions, each electronic device includes a corresponding hardware structure and/or software module for implementing each function. A person skilled in the art should be easily aware that units, algorithms, and steps in the examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the electronic device or the like may be divided into functional modules according to the method embodiment shown in FIG. 20. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation.

When displaying interfaces of a plurality of applications, in response to an operation performed on an interface of one application, the screen display apparatus provided in this embodiment of this application may automatically minimize an interface of another application, and display the interface that is of the another application and that is in a minimized state. This simplifies an operation of minimizing the interface of the another application by a user, and provides better user operation experience.

Figure 23:
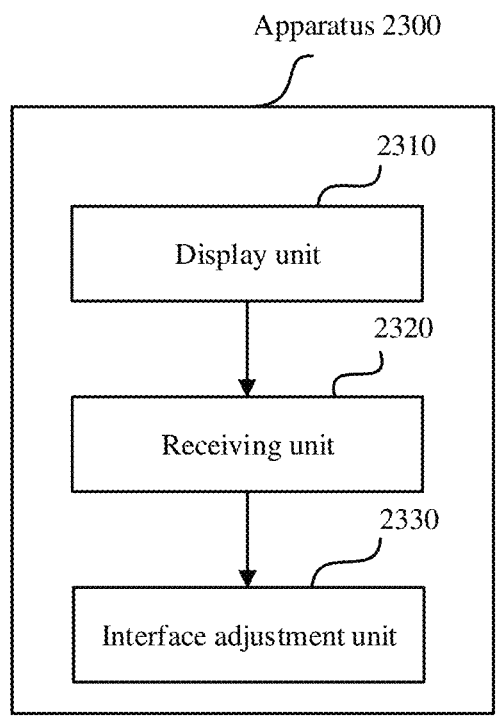
FIG. 23 is a schematic block diagram of a screen display apparatus according to some embodiments of this application.

Refer to FIG. 23. An embodiment of this application provides a screen display apparatus 2300. The apparatus 2300 includes:

a display unit 2310, configured to display a first interface of a first application and a second interface of a second application side by side on a screen, where there is no overlapping area between the first interface and the second interface;

a receiving unit 2320, configured to receive a first operation performed on the first interface; and an interface adjustment unit 2330, configured to: display the first interface in full screen mode, minimize the second interface, and display the second interface in a minimized state in the first interface displayed in full screen mode, in response to the first operation, where the second interface in the minimized state is any one of the following:

a floating ball, an icon of the second application, a contact avatar, and a video pop-up window.

For functions of the functional units of the apparatus 2300, refer to implementations of the method embodiment shown in FIG. 21. Details are not described herein again.

The foregoing mainly describes, from a perspective of a method procedure, the apparatus 2300 provided in this embodiment of this application. It may be understood that, to implement the foregoing functions, each electronic device includes a corresponding hardware structure and/or software module for implementing each function. A person skilled in the art should be easily aware that units, algorithms, and steps in the examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the electronic device or the like may be divided into functional modules according to the method embodiment shown in FIG. 21. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation.

According to the screen display apparatus provided in this embodiment of this application, interfaces of two applications may be displayed side by side on the screen, and there is no overlapping area between the interfaces of the two applications that are displayed side by side, so that a user can conveniently view the interfaces of the two applications. When an operation performed on one of the two interfaces displayed side by side is detected, the interface may be automatically displayed in full screen mode, the other interface may be automatically minimized, and the interface in a minimized state may be displayed in the interface displayed in full screen mode, to improve user operation experience.

Figure 24:
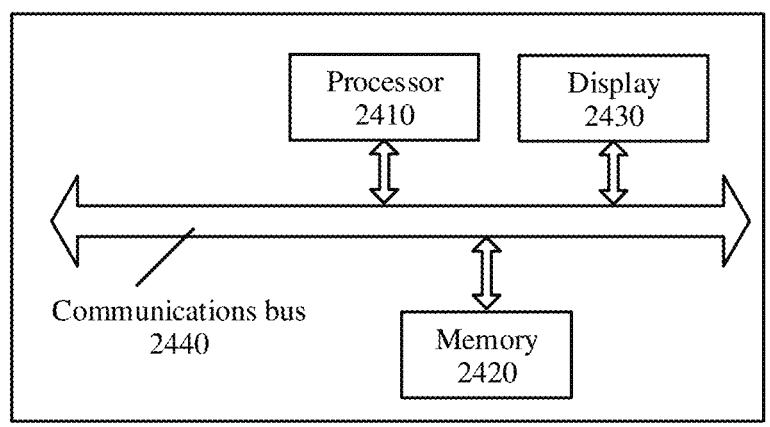
FIG. 24 is a schematic block diagram of an electronic device according to some embodiments of this application.

Refer to FIG. 24. An embodiment of this application provides an electronic device. The electronic device may include a processor 2410, a memory 2420, and a display 2430. The memory 2420 is configured to store computer executable instructions. When the electronic device runs, the processor 2410 executes the computer executable instructions stored in the memory 2420, so that the electronic device performs the method shown in FIG. 20. The processor 2410 is configured to control the display 2430 to display interfaces of at least two applications, including a first interface of a first application and a second interface of a second application, where the first interface is an interface displayed in full screen mode, and the second interface is a floating window displayed in the first interface. The processor 2410 is configured to receive a first operation performed on the first interface. The processor 2410 is configured to automatically display the second interface in a minimized state in the first interface in response to the first operation.

In some embodiments, the electronic device further includes a communications bus 2440. The processor 2410 may be connected to the memory 2420 through the communications bus 2440, to obtain the computer executable instructions stored in the memory 2420, and execute the computer executable instructions.

For specific implementations of the parts/components of the electronic device in this embodiment of this application, refer to the foregoing implementation of the method embodiment shown in FIG. 20. Details are not described herein again.

Therefore, when displaying interfaces of a plurality of applications, in response to an operation performed on an interface of one application, the electronic device may automatically minimize an interface of another application, and display, in an application displayed in full screen mode, the interface that is of the another application and that is in a minimized state. This simplifies an operation of minimizing the interface of the another application by a user, and provides better user operation experience.

Figure 25:
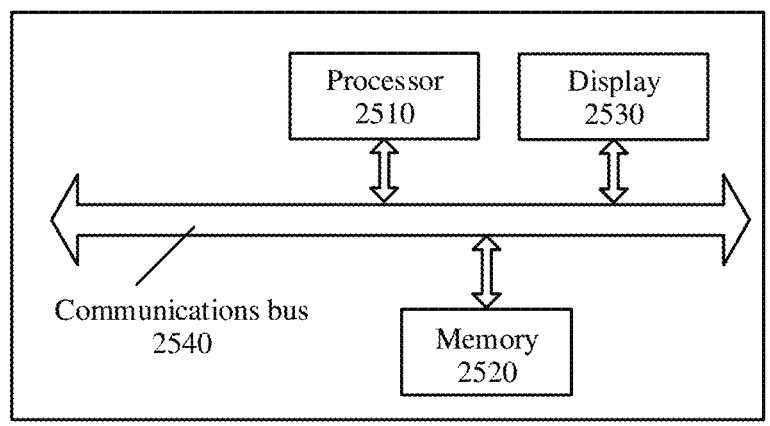
FIG. 25 is a schematic block diagram of an electronic device according to some embodiments of this application.

Refer to FIG. 25. An embodiment of this application provides an electronic device. The electronic device may include a processor 2510, a memory 2520, and a display 2530. The memory 2520 is configured to store computer executable instructions. When the electronic device runs, the processor 2510 executes the computer executable instructions stored in the memory 2520, so that the electronic device performs the method shown in FIG. 21. The processor 2510 is configured to control the display 2530 to display a first interface of a first application and a second interface of a second application side by side, where there is no overlapping area between the first interface and the second interface. The processor 2510 is configured to receive a first operation performed on the first interface. The processor 2510 is configured to: display the first interface in full screen mode, minimize the second interface, and display the second interface in a minimized state in the first interface displayed in full screen mode, in response to the first operation.

In some embodiments, the electronic device further includes a communications bus 2540. The processor 2510 may be connected to the memory 2520 through the communications bus 2540, to obtain the computer executable instructions stored in the memory 2520, and execute the computer executable instructions.

For specific implementations of the parts/components of the electronic device in this embodiment of this application, refer to the foregoing implementation of the method embodiment shown in FIG. 21. Details are not described herein again.

Therefore, interfaces of two applications may be displayed side by side on the screen, and there is no overlapping area between the interfaces of the two applications that are displayed side by side, so that a user can conveniently view the interfaces of the two applications. When an operation performed on one of the two interfaces displayed side by side is detected, the interface may be automatically displayed in full screen mode, the other interface may be automatically minimized, and the interface in a minimized state may be displayed in the interface displayed in full screen mode, to improve user operation experience.

The method steps in embodiments of this application may be implemented in a hardware manner, or may be implemented in a manner of executing software instructions by the processor. The software instructions may include corresponding software modules. The software modules may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to a processor, so that the processor can read information from the storage medium or write information into the storage medium. Certainly, the storage medium may be further a component of the processor. The processor and the storage medium may be located in an ASIC.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

It may be understood that various numbers in embodiments of this application are merely used for differentiation for ease of description, and are not used to limit the scope of embodiments of this application.

What is claimed is:

1. A method, applied to an electronic device, wherein the method comprises:
    displaying a first interface of a first application and prompt information of a second application different from the first application, wherein the first interface of the first application is displayed in full screen, and the prompt information of the second application floats and displays on the first interface of the first application;
    receiving a first operation performed by a user on the prompt information of the second application;

in response to the first operation, floating a first interface of the second application on the first interface of the first application, wherein the first interface of the second application displays content corresponding to the prompt information, and a size of the first interface of the second application is greater than a size of an interface to display the prompt information;

receiving a second operation performed by the user on the first interface of the first application, the second operation being different from the first operation; and in response to the second operation, zooming out the first interface of the second application and displaying the zoomed out first interface of the second application on the first interface of the first application, the zoomed out first interface being smaller than the first interface of the second application before the zooming out.

2. The method according to claim 1, further comprising:
receiving a third operation of the user, wherein the third operation acts on the first interface of the second application that is displayed in zoom-out mode; and
in response to the third operation, zooming in and displaying the first interface of the second application on the first interface of the first application in a floating manner.

3. The method according to claim 2, further comprising:
receiving a fourth operation, wherein the fourth operation acts on the first interface of the second application when it is displayed in an enlarged manner in response to the third operation; and
displaying the first interface of the second application in full screen in response to the fourth operation.

4. The method according to claim 1, further comprising:
before the receiving the second operation, receiving a fourth operation of the user, wherein the fourth operation acts on the first interface of the second application when it is displayed in a floating manner, and displaying the first interface of the second application in full screen in response to the fourth operation.

5. The method according to claim 4, wherein the displaying the first interface of the second application in full screen in response to the fourth operation comprises:
displaying the first interface of the second application in full screen in response to the fourth operation, and zooming out and displaying the first interface of the first application on the first interface of the second application.

6. The method according to claim 5, wherein the first interface of the second application comprises a second edit box, and the fourth operation acts on the second edit box; and
wherein the displaying the first interface of the second application in full screen in response to the fourth operation, and the zooming out and displaying the first interface of the first application on the first interface of the second application comprise:
automatically displaying the first interface of the second application in full screen in response to the fourth operation that enables the second edit box to obtain a focus, and zooming out and displaying the first interface of the first application on the first interface of the second application.

7. The method according to claim 5, wherein before the receiving and responding to the fourth operation of the user, a first interface of a third application is displayed in a floating manner on the first interface of the first application; and wherein in response to the fourth operation, the displaying the first interface of the second application in full screen, and the zooming out and displaying the first interface of the first application on the first interface of the second application comprise:
displaying the first interface of the second application in full screen in response to the fourth operation, and zooming out and displaying the first interface of the first application and the first interface of the third application on the first interface of the second application.

8. The method according to claim 1, wherein the zooming out the first interface of the second application and the displaying the zoomed out first interface of the second application on the first interface of the first application in response to the second operation comprises:
in response to the second operation, displaying the first interface of the second application on the first interface of the first application in a manner that the first interface of the second application is in equal proportion to the first interface of the first application.

9. The method according to claim 8, wherein before the receiving and responding to the second operation of the user, a first interface of a third application is displayed in a floating manner on the first interface of the first application; and
wherein the zooming out the first interface of the second application and the displaying the zoomed out first interface of the second application on the first interface of the first application in response to the second operation comprise:
automatically zooming out and displaying the first interface of the second application and the first interface of the third application on the first interface of the first application in response to the second operation.

10. The method according to claim 1, wherein the zooming out the first interface of the second application and the displaying the zoomed out first interface of the second application on the first interface of the first application in response to the second operation comprise:
in response to the second operation, displaying, on the first interface of the first application, the first interface of the second application in a minimized state.

11. The method according to claim 10, wherein the first interface of the first application comprises a first edit box, and the second operation is an operation acting on the first edit box; and
wherein the displaying, on the first interface of the first application, the first interface of the second application in response to the second operation comprises:
automatically displaying, on the first interface of the first application, the first interface of the second application in the minimized state in response to the second operation that enables the first edit box to obtain a focus.

12. The method according to claim 11, further comprising:
acquiring a fifth operation of the user, wherein the fifth operation indicates that the first edit box is out of focus; and
automatically zooming in and displaying the first interface of the second application in the minimized state in a floating manner on the first interface of the first application in response to the first edit box being out of focus.

13. The method according to claim 1, wherein the second application is an instant messaging application or a short message application, and the prompt information is of a new message of the second application.

14. The method according to claim 1, the first interface of the second application being transparent, the second operation further enabling the first interface of the first application to enter a focus obtaining state, the second operation being different from a resize drag operation, the receiving the second operation comprising:
receiving the second operation while the first interface of the second application is being displayed on the first interface of the first application.

15. An electronic device, comprising:
a processor, a memory, and a display screen;
wherein the memory is configured to store a computer executable instruction, and executing the computer executable instruction causes the electronic device to execute:
displaying a first interface of a first application and prompt information of a second application different from the first application, wherein the first interface of the first application is displayed in full screen, and the prompt information of the second application floats and displays on the first interface of the first application;
receiving a first operation performed by a user on the prompt information of the second application;
in response to the first operation, floating a first interface of the second application on the first interface of the first application, wherein the first interface of the second application displays content corresponding to the prompt information, and a size of the first interface of the second application is greater than a size of an interface of the second application to display the prompt information;
receiving a second operation performed by the user on the first interface of the first application, the second operation being different from the first operation; and
in response to the second operation, zooming out the first interface of the second application and displaying the zoomed out first interface of the second application on the first interface of the first application, the zoomed out first interface being smaller than the first interface of the second application before the zooming out.

16. The electronic device according to claim 15, wherein executing the computer executable instruction causes the electronic device to execute:
receiving a third operation of the user, wherein the third operation acts on the first interface of the second application that is displayed in zoom-out mode; and
in response to the third operation, zooming in and floatingly displaying the first interface of the second application on the first interface of the first application.

17. The electronic device according to claim 16, wherein executing the computer executable instruction causes the electronic device to execute:
receiving a fourth operation, wherein the fourth operation acts on the first interface of the second application that is displayed in enlargement in response to the third operation; and
in response to the fourth operation, displaying the first interface of the second application in full screen.

18. The electronic device according to claim 15, wherein executing the computer executable instruction causes the electronic device to execute:
before the receiving the second operation, receiving a fourth operation of the user, wherein the fourth operation acts on the first interface of the second application that is displayed in a floating manner; and
displaying the first interface of the second application in full screen in response to the fourth operation.

19. The electronic device according to claim 18, wherein the displaying the first interface of the second application in full screen in response to the fourth operation comprises:
displaying the first interface of the second application in full screen in response to the fourth operation; and
zooming out and displaying the first interface of the first application on the first interface of the second application.

20. The electronic device according to claim 19, wherein the first interface of the second application comprises a second edit box, and the fourth operation acts on the second edit box; and
wherein the displaying the first interface of the second application in full screen in response to the fourth operation, and the zooming out and displaying the first interface of the first application on the first interface of the second application comprise:
automatically displaying the first interface of the second application in full screen in response to the fourth operation that enables the second edit box to obtain a focus, and zooming out and displaying the first interface of the first application on the first interface of the second application.

21. The electronic device according to claim 19, wherein before the receiving and responding to the fourth operation of the user, a first interface of a third application is displayed in a floating manner on the first interface of the first application; and
wherein in response to the fourth operation, the displaying the first interface of the second application in full screen, and the zooming out and displaying the first interface of the first application on the first interface of the second application comprise:
displaying the first interface of the second application in full screen in response to the fourth operation, and zooming out and displaying the first interface of the first application and the first interface of the third application on the first interface of the second application.

22. The electronic device according to claim 15, wherein the zooming out the first interface of the second application and the displaying the zoomed out first interface of the second application on the first interface of the first application in response to the second operation comprise:
in response to the second operation, displaying the first interface of the second application on the first interface of the first application, wherein the first interface of the second application is displayed in equal proportion to the first interface of the first application.

23. The electronic device according to claim 22, wherein before the receiving and responding to the second operation, a first interface of a third application is displayed in a floating manner on the first interface of the first application; and
wherein the zooming out the first interface of the second application and the displaying the zoomed out first interface of the second application on the first interface of the first application in response to the second operation comprise:
automatically zooming out and displaying the first interface of the second application and the first interface of the third application on the first interface of the first application in response to the second operation.

24. The electronic device according to claim 15, wherein the zooming out the first interface of the second application and the displaying the zoomed out first interface of the second application on the first interface of the first application in response to the second operation comprises:

in response to the second operation, displaying, on the first interface of the first application, the first interface of the second application in a minimized state.

25. The electronic device according to claim 24, wherein the first interface of the first application comprises a first edit box, and the second operation acts on the first edit box; and wherein the displaying, on the first interface of the first application, the first interface of the second application in response to the second operation comprises:

automatically displaying, on the first interface of the first application, the first interface of the second application in the minimized state in response to the second operation that enables the first edit box to obtain a focus.

26. The electronic device according to claim 25, wherein executing the computer executable instruction causes the electronic device to execute:

acquiring a fifth operation of the user, wherein the fifth operation indicates that the first edit box is out of focus; and automatically zooming in and floatingly displaying the first interface of the second application in the minimized state on the first interface of the first application in response to the first edit box being out of focus.

27. The electronic device according to claim 15, wherein the second application is an instant messaging application or a short message application, and the prompt information is prompt information of a new message of the second application.

* * * * *